United States Patent
You et al.

(10) Patent No.: US 11,246,068 B2
(45) Date of Patent: Feb. 8, 2022

(54) COMMUNICATION METHOD BETWEEN A TERMINAL AND BASE STATIONS FOR CELL HANDOVER

(71) Applicant: HUAWEI TECHNOLOGIES CO., LTD., Guangdong (CN)

(72) Inventors: Chunhua You, Shanghai (CN); Hongping Zhang, Shanghai (CN); Qinghai Zeng, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/671,100

(22) Filed: Oct. 31, 2019

(65) Prior Publication Data
US 2020/0068457 A1  Feb. 27, 2020

Related U.S. Application Data

(63) Continuation of application No. PCT/CN2018/084905, filed on Apr. 27, 2018.

(30) Foreign Application Priority Data

May 3, 2017 (CN) .......................... 201710305974.4

(51) Int. Cl.
| | | |
|---|---|---|
| H04W 36/00 | (2009.01) | |
| H04W 76/11 | (2018.01) | |
| H04W 76/27 | (2018.01) | |
| H04L 1/00 | (2006.01) | |
| H04L 1/18 | (2006.01) | |

(Continued)

(52) U.S. Cl.
CPC ....... *H04W 36/0072* (2013.01); *H04L 1/0026* (2013.01); *H04L 1/1819* (2013.01);
(Continued)

(58) Field of Classification Search
CPC . H04W 36/0072; H04W 76/11; H04W 76/27; H04W 36/0058; H04W 16/28;
(Continued)

(56) References Cited

U.S. PATENT DOCUMENTS

2013/0044623 A1* 2/2013 Speight .............. H04B 7/15528
370/252
2014/0073329 A1  3/2014 Kang et al.
(Continued)

FOREIGN PATENT DOCUMENTS

| CN | 101366304 A | 2/2009 |
|---|---|---|
| CN | 102651910 A | 8/2012 |

(Continued)

OTHER PUBLICATIONS

R1-1705713 NTT Docomo et al: "Discussion on CSI-RS configuration for NR RRM measurement in CONNECTED mode",3GPP DRAFT; Apr. 2, 2017, total 6 pages.
(Continued)

*Primary Examiner* — Justin T Van Roie
(74) *Attorney, Agent, or Firm* — Womble Bond Dickinson (US) LLP

(57) ABSTRACT

This application provides a communication method, a terminal, and a base station, so that communication is performed between a terminal and a cell during cell handover. The method includes: receiving, by a terminal from a first base station, a cell identity of a first cell, at least one beam parameter of the first cell, and a resource associated with the at least one beam parameter, where the first cell belongs to a second base station; further, determining a target beam parameter, and sending information on a resource corresponding to the target beam parameter; and receiving a response to the information by using a receive beam associated with the target beam parameter, so that communication can be performed between the terminal and a cell during cell handover.

11 Claims, 15 Drawing Sheets

(51) Int. Cl.
  *H04L 5/00* (2006.01)
  *H04W 16/28* (2009.01)
  *H04W 24/10* (2009.01)
  *H04W 56/00* (2009.01)
  *H04W 74/08* (2009.01)
  *H04W 80/02* (2009.01)

(52) U.S. Cl.
  CPC ........... *H04L 5/0051* (2013.01); *H04W 16/28* (2013.01); *H04W 24/10* (2013.01); *H04W 36/0058* (2018.08); *H04W 56/001* (2013.01); *H04W 56/005* (2013.01); *H04W 74/0833* (2013.01); *H04W 76/11* (2018.02); *H04W 76/27* (2018.02); *H04W 80/02* (2013.01)

(58) Field of Classification Search
  CPC . H04W 24/10; H04W 56/001; H04W 56/005; H04W 74/0833; H04W 80/02; H04W 24/02; H04W 36/00; H04W 36/08; H04W 36/30; H04W 36/0083; H04L 1/0026; H04L 1/1819; H04L 5/0051
  See application file for complete search history.

(56) References Cited

U.S. PATENT DOCUMENTS

2016/0142959 A1   5/2016  Wang et al.
2017/0026938 A1*  1/2017  Onggosanusi ........ H04L 5/0051

FOREIGN PATENT DOCUMENTS

CN   104115419 A   10/2014
CN   106134250 A   11/2016

OTHER PUBLICATIONS

R1-1704440 Mediatek Inc: "Discussion on DL RRM Measurement",3GPP Draft; Apr. 2, 2017,total 6 pages.
R1-1705843 Nokia et al: "CSI-RS for mobility purposes",3GPP Draft; Apr. 2, 2017,total 6 pages.
R1-1704367 Zte et al: "Mobility procedure", 3GPP Draft; Apr. 2, 2017,total 4 pages.

* cited by examiner

COMMUNICATION METHOD BETWEEN A TERMINAL AND BASE STATIONS FOR CELL HANDOVER

CROSS-REFERENCE TO RELATED APPLICATIONS

This application is a continuation of International Application No. PCT/CN2018/084905, filed on Apr. 27, 2018, which claims priority to Chinese Patent Application No. 201710305974.4, filed on May 3, 2017. The disclosures of the aforementioned applications are hereby incorporated by reference in their entireties.

TECHNICAL FIELD

This application relates to the field of mobile communications technologies, and in particular, to a communication method, a terminal, and a base station.

BACKGROUND

A high frequency may be understood as a relatively high frequency band, for example, greater than or equal to 6 GHz. A high-frequency cell, for example, may be understood as a cell that operates on a frequency band greater than or equal to 6 GHz. When data is transmitted by using a high frequency technology, there is generally a relatively large transmission path loss. To ensure effective transmission of a service, a beamforming technology is introduced into the high frequency cell. The technology is used to concentrate energy of a signal in a required direction to form a beam, for example, to form a beam aiming at a terminal, so that a demodulation signal-to-noise ratio of the terminal can be improved, and user experience on a cell edge can be improved.

Due to movement of the terminal and the like, the terminal needs to be handed over. Currently, for a cell based on beam management, there is no better method for how to implement communication between the terminal and the cell during cell handover.

SUMMARY

This application provides a communication method, a terminal, and a base station, so that communication is performed between a terminal and a cell during cell handover.

According to a first aspect, this application provides a communication method, including:

receiving, by a terminal from a first base station, a cell identity of a first cell, at least one beam parameter of the first cell, and a resource associated with the at least one beam parameter, where the first cell belongs to a second base station;

sending, by the terminal, information on a resource corresponding to a target beam parameter, where the target beam parameter belongs to the at least one beam parameter; and receiving, by the terminal, a response to the information by using a receive beam associated with the target beam parameter.

In this application, the terminal receives, from the first base station, the cell identity of the first cell, the at least one beam parameter of the first cell, and the resource associated with the at least one beam parameter, where the first cell belongs to the second base station; further, the terminal may determine the target beam parameter, and send the information on the resource corresponding to the target beam parameter; and the terminal receives the response to the information by using the receive beam associated with the target beam parameter, so that communication can be performed between the terminal and a cell during cell handover.

In one embodiment, the beam parameter is an identifier of a CSI-RS.

In one embodiment, the terminal receives a first configuration sent by the first base station, where the first configuration includes a resource location and an identifier of at least one CSI-RS of the second base station;

the terminal measures the at least one CSI-RS; and the terminal sends identifiers of some or all CSI-RSs in the at least one CSI-RS to the first base station, where the identifiers of the some or all CSI-RSs in the at least one CSI-RS include the at least one beam parameter of the first cell.

In one embodiment, the terminal sends quality and/or power of the some or all CSI-RSs in the at least one CSI-RS to the first base station.

In one embodiment, the at least one beam parameter of the first cell is selected based on at least one of the identifiers, the quality, and/or the power of the some or all CSI-RSs.

In one embodiment, the terminal receives a second configuration sent by the first base station, where the second configuration includes a measurement frequency;

the terminal measures at least one synchronization signal on the frequency, where the at least one synchronization signal belongs to at least one cell, and the at least one cell includes the first cell; and the terminal sends, to the first base station, identities of some or all cells in the at least one cell, quality or power of the some or all cells, and an identifier of at least one SS block of each of the some or all cells.

In one embodiment, the terminal sends, to the first base station, quality and/or power of a synchronization signal associated with the at least one SS block of each of the some or all cells.

In one embodiment, the quality or the power of the synchronization signal associated with the at least one SS block meets a first condition.

In one embodiment, an SS block associated with the at least one CSI-RS of the second base station belongs to the at least one SS block of each of the some or all cells.

In one embodiment, the beam parameter is an identifier of an SS block.

In one embodiment, the terminal receives a third configuration sent by the first base station, where the third configuration includes a measurement frequency;

the terminal measures at least one synchronization signal on the frequency, where the at least one synchronization signal belongs to at least one cell, and the at least one cell includes the first cell; and the terminal sends, to the first base station, identities of some or all cells in the at least one cell, signal quality or power of the some or all cells, and an identifier of at least one SS block of each of the some or all cells, where the identifier of the at least one SS block of each of the some or all cells includes the at least one beam parameter of the first cell.

In one embodiment, the terminal sends quality and/or power of the at least one SS block of each of the some or all cells to the first base station.

In one embodiment, the beam parameter is selected based on at least one of the identifier, the quality, and/or the power of the at least one SS block of each of the some or all cells.

In one embodiment, quality or power of a synchronization signal associated with the at least one SS block of each of the some or all cells meets a first condition.

In one embodiment, the beam parameter is an identifier of an SS block or an identifier of a CSI-RS.

In one embodiment, the terminal receives a first configuration from the first base station, where the first configuration includes a resource location and an identifier of at least one CSI-RS of the first cell;

the terminal measures the at least one CSI-RS of the first cell and at least one synchronization signal of the first cell; and the terminal sends first quality and/or first power of the first cell and second quality and/or second power of the first cell to the first base station, where the first quality and/or the first power are/is obtained based on quality and/or power of some or all CSI-RSs in the at least one CSI-RS of the first cell, and the second quality and/or the second power are/is obtained based on quality and/or power of some or all synchronization signals in the at least one synchronization signal.

In one embodiment, the terminal receives a second instruction from the first base station;

the terminal measures at least one CSI-RS of a serving cell; and in response to the second instruction, the terminal sends third quality and/or third power of the serving cell to the first base station, where the third quality and/or the third power are/is obtained based on quality and/or power of some or all CSI-RSs in the at least one CSI-RS of the serving cell.

In one embodiment, the terminal receives a third instruction from the first base station;

the terminal measures at least one synchronization signal of the serving cell; and in response to the third instruction, the terminal sends fourth quality and/or fourth power of the serving cell to the first base station, where the fourth quality and/or the fourth power are/is obtained based on quality and/or power of some or all synchronization signals in the at least one synchronization signal of the serving cell.

In one embodiment, the resource is a random access resource, the information is a preamble sequence, and the response includes an uplink timing advance.

In one embodiment, the resource is an uplink resource, the information is uplink data, and the response is a HARQ feedback.

In one embodiment, the uplink data includes an RRC connection reconfiguration complete message.

According to a second aspect, an embodiment of this application provides a terminal, where the terminal may perform any method provided in the first aspect.

In one embodiment, the terminal has a function of implementing behavior of the terminal in any method in the first aspect. The function may be implemented by hardware, or may be implemented by executing corresponding software by hardware. The hardware or the software includes one or more modules corresponding to the foregoing function.

In one embodiment, a structure of the terminal includes a processor and a transceiver. The processor is configured to support the terminal in performing a corresponding function in any method in the first aspect, for example, generating, receiving, or processing data and/or information in the foregoing methods. The transceiver is configured to support the terminal in communicating with another entity, to send information or an instruction in any method in the first aspect to the another entity, or receive information or an instruction in any method in the first aspect from the another entity. The terminal may further include a memory. The memory is configured to be coupled to the processor, and stores a program instruction and data that are for the terminal.

According to a third aspect, this application provides a communication method, including:

receiving, by a first base station, identifiers of some or all CSI-RSs in the at least one CSI-RS from a terminal;

sending, by the first base station, the identifiers of the some or all CSI-RSs in the at least one CSI-RS to the second base station;

receiving, by the first base station from the second base station, a cell identity of a first cell, at least one beam parameter of the first cell, and a resource associated with the at least one beam parameter, where the first cell belongs to the second base station; and sending, by the first base station to the terminal, the cell identity of the first cell, the at least one beam parameter of the first cell, and the resource associated with the at least one beam parameter, where the at least one beam parameter of the first cell belongs to the identifiers of the some or all CSI-RSs in the at least one CSI-RS, and the beam parameter is an identifier of a CSI-RS.

In one embodiment, the first base station receives a resource location and an identifier of the at least one CSI-RS of the second base station; and the first base station sends a first configuration to the terminal, where the first configuration includes the resource location and the identifier of the at least one CSI-RS of the second base station.

In one embodiment, the first base station sends a measurement frequency to the terminal;

the first base station receives, from the terminal, identities of some or all cells in at least one cell associated with the measurement frequency, quality or power of the some or all cells, and an identifier of at least one SS block of each of the some or all cells; and the first base station sends, to the second base station, an identity of a cell that is associated with the second base station and that is in the some or all cells, and an identifier of at least one SS block of the cell associated with the second base station, where some or all SS blocks in the at least one SS block are associated with the at least one CSI-RS of the second base station.

According to a fourth aspect, an embodiment of this application provides a base station, where the base station may perform any method provided in the third aspect.

In one embodiment, the base station has a function of implementing behavior of the base station in any method in the third aspect. The function may be implemented by hardware, or may be implemented by executing corresponding software by hardware. The hardware or the software includes one or more modules corresponding to the foregoing function.

In one embodiment, a structure of the base station includes a processor and a transceiver. The processor is configured to support the base station in performing a corresponding function in any method in the third aspect, for example, generating, receiving, or processing data and/or information in the foregoing methods. The transceiver is configured to support the base station in communicating with another entity, to send information or an instruction in any method in the third aspect to the another entity, or receive information or an instruction in any method in the third aspect from the another entity. The base station may further include a memory. The memory is configured to be coupled to the processor, and stores a program instruction and data that are for the base station.

According to a fifth aspect, this application provides a communication method, including:

receiving, by a first base station from a terminal, identities of some or all cells in at least one cell and identifiers of SS blocks associated with the identities of the some or all cells;

sending, by the first base station to the second base station, an identity of a cell that is associated with the second base station and that is in the some or all cells, and an identifier of at least one SS block of the cell associated with the second base station;

receiving, by the first base station from the second base station, a cell identity of a first cell, at least one beam parameter of the first cell, and a resource associated with the at least one beam parameter, where the first cell belongs to the second base station; and sending, by the first base station to the terminal, the cell identity of the first cell, the at least one beam parameter of the first cell, and the resource associated with the at least one beam parameter, where the at least one beam parameter of the first cell belongs to the identifier of the at least one SS block, and the beam parameter is an identifier of an SS block.

In one embodiment, the first base station sends a measurement frequency to the terminal, where the measurement frequency is associated with the at least one cell.

According to a sixth aspect, an embodiment of this application provides a base station, where the base station may perform any method provided in the fifth aspect.

In one embodiment, the base station has a function of implementing behavior of the base station in any method in the fifth aspect. The function may be implemented by hardware, or may be implemented by executing corresponding software by hardware. The hardware or the software includes one or more modules corresponding to the foregoing function.

In one embodiment, a structure of the base station includes a processor and a transceiver. The processor is configured to support the base station in performing a corresponding function in any method in the fifth aspect, for example, generating, receiving, or processing data and/or information in the foregoing methods. The transceiver is configured to support the base station in communicating with another entity, to send information or an instruction in any method in the fifth aspect to the another entity, or receive information or an instruction in any method in the fifth aspect from the another entity. The base station may further include a memory. The memory is configured to be coupled to the processor, and stores a program instruction and data that are for the base station.

According to a seventh aspect, this application provides a communication method, including:

receiving, by a first base station from a second base station, an identity of at least one cell and an identifier and a resource location of a CSI-RS associated with the at least one cell;

sending, by the first base station to a terminal, the identity of the at least one cell and the identifier and the resource location of the CSI-RS associated with the at least one cell; and receiving, by the first base station from the terminal, identities of some or all cells in the at least one cell, identifiers of SS blocks associated with the some or all cells, and/or identifiers of CSI-RSs associated with the some or all cells.

In one embodiment, the first base station sends, to the second base station, the identities of the some or all cells in the at least one cell, the identifiers of the SS blocks associated with the some or all cells, and/or the identifiers of the CSI-RSs associated with the some or all cells;

the first base station receives, from the second base station, an identity of a first cell and at least one beam parameter associated with the first cell, where the at least one beam parameter belongs to the identifiers of the associated SS blocks and/or the identifiers of the associated CSI-RSs, and the first cell belongs to the at least one cell; and the first base station sends, to the terminal, the identity of the first cell and the at least one beam parameter associated with the first cell, where the at least one beam parameter belongs to the identifiers of the associated SS blocks and/or the identifiers of the associated CSI-RSs.

According to an eighth aspect, an embodiment of this application provides a base station, where the base station may perform any method provided in the seventh aspect.

In one embodiment, the base station has a function of implementing behavior of the base station in any method in the seventh aspect. The function may be implemented by hardware, or may be implemented by executing corresponding software by hardware. The hardware or the software includes one or more modules corresponding to the foregoing function.

In one embodiment, a structure of the base station includes a processor and a transceiver. The processor is configured to support the base station in performing a corresponding function in any method in the seventh aspect, for example, generating, receiving, or processing data and/or information in the foregoing methods. The transceiver is configured to support the base station in communicating with another entity, to send information or an instruction in any method in the seventh aspect to the another entity, or receive information or an instruction in any method in the seventh aspect from the another entity. The base station may further include a memory. The memory is configured to be coupled to the processor, and stores a program instruction and data that are for the base station.

According to a ninth aspect, this application provides a communication method, including:

sending, by a first base station, a second instruction to a terminal; and receiving, by the first base station, third quality and/or third power of a serving cell that are/is sent by the terminal in response to the second instruction, where the third quality and/or the third power are/is obtained based on quality and/or power of some or all CSI-RSs in at least one CSI-RS of the serving cell.

According to a tenth aspect, an embodiment of this application provides a base station, where the base station may perform any method provided in the ninth aspect.

In one embodiment, the base station has a function of implementing behavior of the base station in any method in the ninth aspect. The function may be implemented by hardware, or may be implemented by executing corresponding software by hardware. The hardware or the software includes one or more modules corresponding to the foregoing function.

In one embodiment, a structure of the base station includes a processor and a transceiver. The processor is configured to support the base station in performing a corresponding function in any method in the ninth aspect, for example, generating, receiving, or processing data and/or information in the foregoing methods. The transceiver is configured to support the base station in communicating with another entity, to send information or an instruction in any method in the ninth aspect to the another entity, or receive information or an instruction in any method in the ninth aspect from the another entity. The base station may further include a memory. The memory is configured to be coupled to the processor, and stores a program instruction and data that are for the base station.

According to an eleventh aspect, this application provides a communication method, including:

sending, by a first base station, a third instruction to a terminal; and receiving, by the first base station, fourth quality and/or fourth power of the serving cell that are/is sent by the terminal in response to the third instruction, where the fourth quality and/or the fourth power are/is obtained based on quality and/or power of some or all synchronization signals in at least one synchronization signal of the serving cell.

According to a twelfth aspect, an embodiment of this application provides a base station, where the base station may perform any method provided in the eleventh aspect.

In one embodiment, the base station has a function of implementing behavior of the base station in any method in the eleventh aspect. The function may be implemented by hardware, or may be implemented by executing corresponding software by hardware. The hardware or the software includes one or more modules corresponding to the foregoing function.

In one embodiment, a structure of the base station includes a processor and a transceiver. The processor is configured to support the base station in performing a corresponding function in any method in the eleventh aspect, for example, generating, receiving, or processing data and/or information in the foregoing methods. The transceiver is configured to support the base station in communicating with another entity, to send information or an instruction in any method in the eleventh aspect to the another entity, or receive information or an instruction in any method in the eleventh aspect from the another entity. The base station may further include a memory. The memory is configured to be coupled to the processor, and stores a program instruction and data that are for the base station.

According to a thirteenth aspect, an embodiment of this application provides a computer storage medium, configured to store a computer software instruction used by the terminal provided in the second aspect, where the computer storage medium includes a program designed for executing the first aspect.

According to a fourteenth aspect, an embodiment of this application provides a computer storage medium, configured to store a computer software instruction used by the base station provided in the fourth aspect, where the computer storage medium includes a program designed for executing the third aspect; or configured to store a computer software instruction used by the base station provided in the sixth aspect, where the computer storage medium includes a program designed for executing the fifth aspect; or configured to store a computer software instruction used by the base station provided in the eighth aspect, where the computer storage medium includes a program designed for executing the seventh aspect; or configured to store a computer software instruction used by the base station provided in the tenth aspect, where the computer storage medium includes a program designed for executing the ninth aspect; or configured to store a computer software instruction used by the base station provided in the twelfth aspect, where the computer storage medium includes a program designed for executing the eleventh aspect.

According to a fifteenth aspect, this application further provides a computer program product that includes an instruction. When the computer program product runs on a computer, the computer is enabled to perform the method in the first aspect. The computer program product includes a computer executable instruction, and the computer executable instruction is stored in a computer readable storage medium. A processor of a terminal may read the computer executable instruction from the computer readable storage medium. The processor executes the computer executable instruction, so that the terminal performs the steps performed by the terminal in the foregoing method provided in the embodiments of this application, or the terminal deploys function units corresponding to the steps.

According to a sixteenth aspect, this application further provides a computer program product that includes an instruction. When the computer program product runs on a computer, the computer is enabled to perform the method in the third aspect, the fifth aspect, the seventh aspect, the ninth aspect, or the eleventh aspect. The computer program product includes a computer executable instruction, and the computer executable instruction is stored in a computer readable storage medium. A processor of a base station may read the computer executable instruction from the computer readable storage medium. The processor executes the computer executable instruction, so that the base station performs the steps performed by the base station in the foregoing method provided in the embodiments of this application, or the base station deploys function units corresponding to the steps.

According to a seventeenth aspect, this application further provides a chip system. The chip system includes a processor that is configured to support a terminal in implementing functions in the foregoing aspects, for example, generating, receiving, or processing data and/or information in the foregoing methods. In one embodiment, the chip system further includes a memory. The memory is configured to store a program instruction and data that are for the terminal. The chip system may include a chip, or may include a chip and another discrete device.

According to an eighteenth aspect, this application further provides a chip system. The chip system includes a processor that is configured to support a base station in implementing functions in the foregoing aspects, for example, generating, receiving, or processing data and/or information in the foregoing methods. In one embodiment, the chip system further includes a memory. The memory is configured to store a program instruction and data that are for the base station. The chip system may include a chip, or may include a chip and another discrete device.

In any one of the foregoing aspects, when sending a measurement configuration (for example, the first configuration, the second configuration, or the third configuration) to the terminal by the first base station, a group identifier of the beam parameter is carried in the measurement configuration, so that when reporting a measurement result, the terminal can report the group identifier and quality and/or power corresponding to the group identifier. The quality and/or the power corresponding to the group identifier is obtained based on quality and/or power corresponding to at least one beam parameter in the group, for example, may be an average value of quality and/or power corresponding to the at least one beam parameter in the group.

In any one of the foregoing aspects, when sending a measurement configuration (for example, the first configuration, the second configuration, or the third configuration) to the terminal by the first base station, a gap (a measurement gap) may be carried into the measurement configuration, to indicate a measurement occasion of the terminal.

This application further provides another ten aspects, including a beam management method, a terminal device, and a network device, to manage a beam sent by a network device to a terminal device.

According to a first aspect, this application provides a beam management method, including:

measuring, by a terminal device, a beam of a network device; and sending, by the terminal device, an identifier of a first beam to the network device by using physical layer control signaling or media access control MAC layer control signaling, where the first beam is a beam on which beam failure occurs or a beam that meets a first condition.

In this application, the terminal device measures the beam of the network device, for example, periodically measures the beam, or measures the beam based on an instruction of the network device. Further, the terminal device sends the identifier of the first beam to the network device. The first beam is a beam on which beam failure occurs or a beam that meets the first condition. In one embodiment, the beam on which beam failure occurs may be a beam on which reference signal received strength or reference signal received quality is lower than a first threshold. Alternatively, the beam on which beam failure occurs may be understood as a beam on which reference signal received strength or reference signal received quality is relatively poor. In one embodiment, the beam that meets the first condition may be a beam on which reference signal received strength or reference signal received quality is higher than a second threshold. Alternatively, the beam that meets the first condition may be understood as a beam on which reference signal received strength or reference signal received quality is relatively good. In one embodiment, the identifier of the first beam is sent to the network device by using the physical layer control signaling. In one embodiment, the identifier of the first beam is sent to the network device by using the MAC layer control signaling. For example, a media access control control element (MAC CE). After performing beam measurement, the terminal device may send the identifier of the first beam to the network device. Therefore, the network device can further perform beam management, for example, re-adjust a beam that provides a service for the terminal device. In addition, the identifier of the first beam is sent to the network device by using the physical layer control signaling or the MAC layer control signaling, so that it can be ensured that a beam with relatively poor quality or relatively good quality is quickly reported to the network device in a timely manner, thereby facilitating beam management.

In one embodiment, the terminal device sends the identifier of the first beam to the network device only when a condition is met. For example, when the terminal device determines, after performing beam measurement, that beam failure occurs, the terminal device may send the identifier of the first beam to the network device by using the physical layer control signaling or the MAC layer control signaling. For another example, a first timer is set, and when the first timer expires, the terminal device sends the identifier of the first beam to the network device by using the physical layer control signaling or the MAC layer control signaling. In one embodiment, after expiring, the first timer may be restarted and perform timing again. For another example, a second timer is set. When the second timer expires and no response to an identifier of a second beam is received, the terminal device sends the identifier of the first beam to the network device by using the physical layer control signaling or the MAC layer control signaling. The second beam is a beam that on which beam failure occurs or a beam that meets the first condition, and the first beam and the second beam may be the same or different. In one embodiment, the terminal device sends the identifier of the second beam to the network device. When the terminal device does not receive the response to the identifier of the second beam before the second timer expires, the terminal device may report the second beam (herein, the second beam is the same as the first beam) again, or the terminal device performs beam measurement again, and report, to the network device, the first beam obtained through measurement.

In one embodiment, if the terminal device currently has no available uplink resource, the terminal device sends a first request to the network device, where the first request is used to request an uplink resource. Further, the terminal device receives, from the network device, second indication information used to indicate the uplink resource. In one embodiment, the uplink resource is used to transmit the physical layer control signaling or the MAC layer control signaling, and the physical layer control signaling or the MAC layer control signaling includes the identifier of the first beam. In one embodiment, the first request is a random access preamble sequence, and is sent to the network device by using a physical random access channel. In one embodiment, the first request is uplink control signaling, and is sent to the network device by using a physical uplink control channel.

In one embodiment, data (including control plane data and user plane data) in the terminal device has a sending priority. The terminal device performs resource allocation based on the uplink resource and preset sending priorities, and preferably allocates a resource to data with a higher sending priority according to order of sending priorities. In one embodiment, the preset sending priority may be specified in a protocol in advance, or may be preconfigured by the network device. In one embodiment, at a MAC layer of the terminal device, a resource is preferably allocated to data with a higher sending priority in descending order of sending priorities. In one embodiment, a sending priority of the MAC layer control signaling is greater than a sending priority of a buffer status report (BSR). In one embodiment, the sending priority of the MAC layer control signaling is less than a sending priority of control signaling of an identifier of the terminal device.

In one embodiment, if the terminal device cannot receive an identifier of a beam that serves the terminal device, the terminal device sends a connection re-establishment request to the network device. In the following case, the terminal device may consider that the identifier of the beam that serves the terminal device cannot be received. For example, when the terminal device sends the identifier of the first beam to the network device, if the terminal device does not receive a response message to the identifier of the first beam and the terminal device determines that no current beam is available, the terminal device determines that radio link failure occurs, and sends the connection re-establishment request to the network device. In one embodiment, the connection re-establishment request may be a radio resource control (RRC) connection re-establishment request. For another example, when the terminal device sends the first request to the network device, where the first request is used to request an uplink resource, if the terminal device does not receive a response message to the first request within specified duration and the terminal device sends the first request for more than a preset quantity of times, the terminal device determines that radio link failure occurs, and sends the connection re-establishment request to the network device. In one embodiment, the connection re-establishment request may be an RRC connection re-establishment request. The RRC connection re-establishment request is used to re-establish an RRC connection.

In one embodiment, the terminal device further receives a first configuration sent by the network device, where the first configuration includes a window period and window duration. The measuring, by a terminal device, a beam of a network device includes: measuring, by the terminal device, the beam of the network device based on the window period and the window duration. According to the measurement method, the terminal device can be prevented from continuously performing beam measurement, thereby reducing power consumption of the terminal device and saving power.

According to a second aspect, an embodiment of this application provides a terminal device, where the terminal device may perform any method provided in the first aspect.

In one embodiment, the terminal device has a function of implementing behavior of the terminal device in any method in the first aspect. The function may be implemented by hardware, or may be implemented by executing corresponding software by hardware. The hardware or the software includes one or more modules corresponding to the foregoing function. In one embodiment, the terminal device may be user equipment. The terminal device may be configured to measure a beam of a network device, for example, periodically measure the beam, or measure the beam based on an instruction of the network device. Further, the terminal device sends an identifier of a first beam to the network device. The first beam is a beam on which beam failure occurs or a beam that meets a first condition. In one embodiment, the beam on which beam failure occurs may be a beam on which reference signal received strength or reference signal received quality is lower than a first threshold. Alternatively, the beam on which beam failure occurs may be understood as a beam on which reference signal received strength or reference signal received quality is relatively poor. In one embodiment, the beam that meets the first condition may be a beam on which reference signal received strength or reference signal received quality is higher than a second threshold. Alternatively, the beam that meets the first condition may be understood as a beam on which reference signal received strength or reference signal received quality is relatively good. In one embodiment, the identifier of the first beam is sent to the network device by using physical layer control signaling. In one embodiment, the identifier of the first beam is sent to the network device by using MAC layer control signaling. For example, a MAC layer is a MAC CE. After performing beam measurement, the terminal device may send the identifier of the first beam to the network device. Therefore, the network device can further perform beam management, for example, re-adjust a beam that provides a service for the terminal device. In addition, the identifier of the first beam is sent to the network device by using the physical layer control signaling or the MAC layer control signaling, so that it can be ensured that the identifier of the first beam is quickly reported to the network device in a timely manner.

In one embodiment, a structure of the terminal device includes a processor and a transceiver. The processor is configured to support the terminal device in performing a corresponding function in any method in the first aspect, for example, generating, receiving, or processing data and/or information in the foregoing methods. The transceiver is configured to support the terminal device in communicating with another entity, to send information or an instruction in any method in the first aspect to the another entity, or receive information or an instruction in any method in the first aspect from the another entity. The terminal device may further include a memory. The memory is configured to be coupled to the processor, and stores a program instruction and data that are for the terminal device.

According to a third aspect, this application provides a beam management method, including:

receiving, by a network device, physical layer control signaling or MAC layer control signaling that is sent by a terminal device, where the physical layer control signaling or the MAC layer control signaling includes an identifier of a first beam, and the first beam is a beam on which beam failure occurs or a beam that meets a first condition; and sending, by the network device to the terminal device, a response message to the identifier of the first beam, where the response message is used to indicate an identifier of a beam that serves the terminal device.

In this application, the terminal device measures a beam of the network device, for example, periodically measures the beam, or measures the beam based on an instruction of the network device. Further, the terminal device sends the identifier of the first beam to the network device. The first beam is a beam on which beam failure occurs or a beam that meets the first condition. In one embodiment, the beam on which beam failure occurs may be a beam on which reference signal received strength or reference signal received quality is lower than a first threshold. Alternatively, the beam on which beam failure occurs may be understood as a beam on which reference signal received strength or reference signal received quality is relatively poor. In one embodiment, the beam that meets the first condition may be a beam on which reference signal received strength or reference signal received quality is higher than a second threshold. Alternatively, the beam that meets the first condition may be understood as a beam on which reference signal received strength or reference signal received quality is relatively good. In one embodiment, the identifier of the first beam is sent to the network device by using the physical layer control signaling. In one embodiment, the identifier of the first beam is sent to the network device by using the MAC layer control signaling. For example, a MAC layer is a MAC CE. After performing beam measurement, the terminal device may send the identifier of the first beam to the network device by using the physical layer control signaling or the MAC layer control signaling. After receiving the physical layer control signaling or the MAC layer control signaling, the network device parses out the identifier of the first beam from the physical layer control signaling or the MAC layer control signaling. Further, the network device reconfigures, for the terminal device based on the identifier of the first beam, the beam that serves the terminal device, and sends the response message to the terminal device, where the response message is used to indicate the identifier of the beam that serves the terminal device.

In one embodiment, the terminal device sends the identifier of the first beam to the network device only when a condition is met. For example, when the terminal device determines, after performing beam measurement, that beam failure occurs, the terminal device may send the identifier of the first beam to the network device by using the physical layer control signaling or the MAC layer control signaling. In one embodiment, the physical layer control signaling or the MAC layer control signaling is sent to the network device when the terminal device determines that beam failure occurs. For another example, a first timer is set, and when the first timer expires, the terminal device sends the identifier of the first beam to the network device by using the physical layer control signaling or the MAC layer control signaling. In one embodiment, after expiring, the first timer may be restarted and perform timing again. In one embodiment, the physical layer control signaling or the MAC layer control signaling is sent to the network device when the terminal device determines that the first timer expires. For another example, a second timer is set. When the second timer expires and no response to an identifier of a second beam is received, the terminal device sends the identifier of the first beam to the network device by using the physical layer control signaling or the MAC layer control signaling. The second beam is a beam that on which beam failure occurs or a beam that meets the first condition, and the first beam and the second beam may be the same or different. In one embodiment, the terminal device sends the identifier of the second beam to the network device. When the terminal device does not receive the response to the identifier of the second beam before the second timer expires, the terminal device may report the second beam (herein, the second beam is the same as the first beam) again, or the terminal device performs beam measurement again, and report, to the network device, the first beam obtained through measurement. In one embodiment, the physical layer control signaling or the MAC layer control signaling is sent to the network device when the terminal device determines that the second timer expires and does not receive the response to the identifier of the second beam.

In one embodiment, if the terminal device currently has no available uplink resource, the terminal device sends a first request to the network device. The network device receives the first request sent by the terminal device. The first request is used to request an uplink resource. Further, the network device sends, to the terminal device, second indication information used to indicate the uplink resource, and the terminal device receives, from the network device, the second indication information used to indicate the uplink resource. In one embodiment, the uplink resource is used to transmit the physical layer control signaling or the MAC layer control signaling, and the physical layer control signaling or the MAC layer control signaling includes the identifier of the first beam. In one embodiment, the first request is a random access preamble sequence, and is sent to the network device by using a physical random access channel. In one embodiment, the first request is uplink control signaling, and is sent to the network device by using a physical uplink control channel.

In one embodiment, data (including control plane data and user plane data) in the terminal device has a sending priority. The terminal device performs resource allocation based on the uplink resource and preset sending priorities, and preferably allocates a resource to data with a higher sending priority in descending order of sending priorities. In one embodiment, the preset sending priority may be specified in a protocol in advance, or may be preconfigured by the network device. In one embodiment, at a MAC layer of the terminal device, a resource is preferably allocated to data with a higher sending priority in descending order of sending priorities. In one embodiment, a sending priority of the MAC layer control signaling is greater than a sending priority of a buffer status report (BSR). In one embodiment, the sending priority of the MAC layer control signaling is less than a sending priority of control signaling of an identifier of the terminal device.

In one embodiment, if the terminal device cannot receive the identifier of the beam that serves the terminal device, the terminal device sends a connection re-establishment request to the network device, and the network device receives the connection re-establishment request sent by the terminal device. In the following case, the terminal device may consider that the identifier of the beam that serves the terminal device cannot be received. For example, when the terminal device sends the identifier of the first beam to the network device, if the terminal device does not receive the response message to the identifier of the first beam and the terminal device determines that no current beam is available, the terminal device determines that radio link failure occurs, and sends the connection re-establishment request to the network device. In one embodiment, the connection re-establishment request may be a radio resource control (RRC) connection re-establishment request. For another example, when the terminal device sends the first request to the network device, where the first request is used to request an uplink resource, if the terminal device does not receive a response message to the first request within specified duration and the terminal device sends the first request for more than a preset quantity of times, the terminal device determines that radio link failure occurs, and sends the connection re-establishment request to the network device. In one embodiment, the connection re-establishment request may be an RRC connection re-establishment request.

In one embodiment, the network device sends a first configuration to the terminal device, and the terminal device receives the first configuration sent by the network device, where the first configuration includes a window period and window duration. The measuring, by a terminal device, a beam of the network device includes: measuring, by the terminal device, the beam of the network device based on the window period and the window duration. According to the measurement method, the terminal device can be prevented from continuously performing beam measurement, thereby reducing power consumption of the terminal device and saving power.

According to a fourth aspect, an embodiment of this application provides a network device, where the network device may perform any method provided in the third aspect.

In one embodiment, the network device has a function of implementing behavior of the network device in any method in the third aspect. The function may be implemented by hardware, or may be implemented by executing corresponding software by hardware. The hardware or the software includes one or more modules corresponding to the foregoing function. In one embodiment, the network device may be a base station, a transmission point, or the like. The network device may be configured to: after receiving physical layer control signaling or MAC layer control signaling, parse out an identifier of a first beam from the physical layer control signaling or the MAC layer control signaling. Further, the network device reconfigures, for a terminal device based on the identifier of the first beam, a beam that serves the terminal device, and sends a response message to the terminal device, where the response message is used to indicate an identifier of the beam that serves the terminal device.

In one embodiment, a structure of the network device includes a processor and a transceiver. The processor is configured to support the network device in performing a corresponding function in any method in the third aspect, for example, generating, receiving, or processing data and/or information in the foregoing methods. The transceiver is configured to support the network device in communicating with another entity, to send information or an instruction in any method in the third aspect to the another entity, or receive information or an instruction in any method in the third aspect from the another entity. The network device may further include a memory. The memory is configured to be coupled to the processor, and stores a program instruction and data that are for the network device.

According to a fifth aspect, an embodiment of this application provides a computer storage medium, configured to store a computer software instruction used by the terminal device provided in the second aspect, where the computer storage medium includes a program designed for executing the first aspect.

According to a sixth aspect, an embodiment of this application provides a computer storage medium, configured to store a computer software instruction used by the network device provided in the fourth aspect, where the computer storage medium includes a program designed for executing the third aspect.

According to a seventh aspect, this application further provides a computer program product that includes an instruction. When the computer program product runs on a computer, the computer is enabled to perform the method in the first aspect. The computer program product includes a computer executable instruction, and the computer executable instruction is stored in a computer readable storage medium. A processor of a terminal device may read the computer executable instruction from the computer readable storage medium. The processor executes the computer executable instruction, so that the terminal device performs the steps performed by the terminal device in the foregoing method provided in the embodiments of this application, or the terminal device deploys function units corresponding to the steps.

According to an eighth aspect, this application further provides a computer program product that includes an instruction. When the computer program product runs on a computer, the computer is enabled to perform the method in the third aspect. The computer program product includes a computer executable instruction, and the computer executable instruction is stored in a computer readable storage medium. A processor of a network device may read the computer executable instruction from the computer readable storage medium. The processor executes the computer executable instruction, so that the network device performs the steps performed by the network device in the foregoing method provided in the embodiments of this application, or the network device deploys function units corresponding to the steps.

According to a ninth aspect, this application further provides a chip system. The chip system includes a processor that is configured to support a terminal device in implementing functions in the foregoing aspects, for example, generating, receiving, or processing data and/or information in the foregoing methods. In one embodiment, the chip system further includes a memory. The memory is configured to store a program instruction and data that are for the terminal device. The chip system may include a chip, or may include a chip and another discrete device.

According to a tenth aspect, this application further provides a chip system. The chip system includes a processor that is configured to support a network device in implementing functions in the foregoing aspects, for example, generating, receiving, or processing data and/or information in the foregoing methods. In one embodiment, the chip system further includes a memory. The memory is configured to store a program instruction and data that are for the network device. The chip system may include a chip, or may include a chip and another discrete device.

Content of the ten aspects including the beam management method, the terminal device, and the network device that are further provided in this application may be combined with content of the eighteen aspects including the communication method, the terminal, and the base station that are provided above. For example, in the ten aspects including the beam management method, the terminal device, and the network device, when determining that cell measurement and handover need to be performed, the terminal device may perform cell handover based on the content of the eighteen aspects including the communication method, the terminal, and the base station that are provided above.

DESCRIPTION OF EMBODIMENTS

Figure 1:
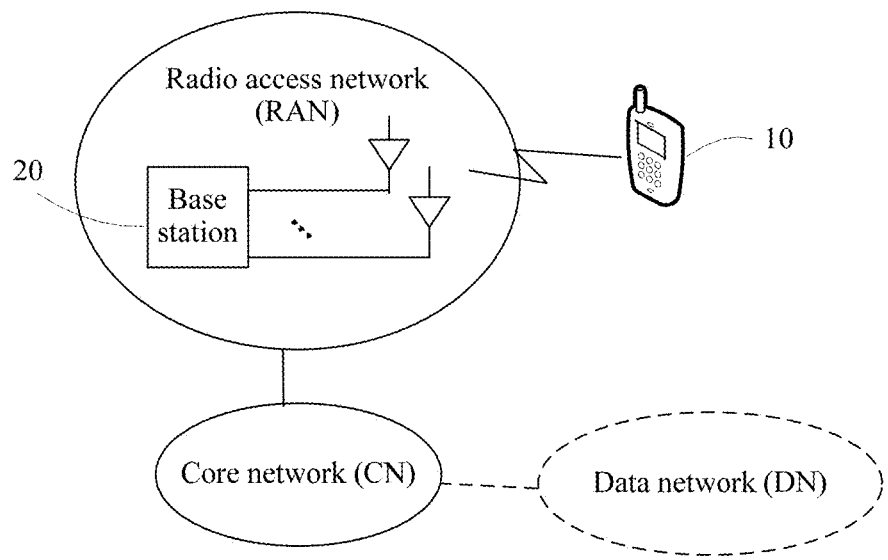
FIG. 1 is a schematic diagram of an application scenario according to this application.

The following clearly describes the technical solutions in the embodiments of this application with reference to the accompanying drawings in the embodiments of this application.

Network architectures and service scenarios that are described in the embodiments of this application are intended to describe the technical solutions in the embodiments of this application more clearly, and do not constitute a limitation on the technical solutions provided in the embodiments of this application. A person of ordinary skill in the art may know that, as the network architectures evolve and a new service scenario emerges, the technical solutions provided in the embodiments of this application are also applicable to a similar technical problem.

This application may be applied to an existing cellular communications system, for example, a system such as a global system for mobile communications (GSM), wideband code division multiple access (WCDMA), or long term evolution (LTE); is applicable to a fifth-generation mobile communications system (5G), for example, a communications system such as an access network using new radio (NR) or a cloud radio access network (CRAN); may also be extended to a similar wireless communications system, such as wireless fidelity (wifi), worldwide interoperability for microwave access (WiMAX), and another cellular system related to the 3rd Generation Partnership Project (3GPP); is also applicable to another wireless communications system using an orthogonal frequency division multiplexing (OFDM) access technology; and is further applicable to a future wireless communications system.

In this application, a beam identifier may be expressed in the following manners:

1. Logical number: A logical number may correspond to a transmit and receive beam pair that dynamically changes. The logical number may be mapping of a reduced CSI-RS resource number/antenna port number. In one embodiment, a base station may use many CSI-RS resources/antenna ports in total. However, for UE, a CSI-RS resource/antenna port that is measured and used by the UE is only a subset thereof. Therefore, a manner that is more reduced than a manner in which a CSI-RS resource/antenna port is directly indicated may be used to indicate a CSI-RS that is previously used by the UE, to indicate a receive beam of the UE.

2. BPL number: The BPL number is an indication used to indicate a transmit and receive beam pair.

3. CSI-RS resource number/antenna port number: This means that a number of a previously used/measured CSI-RS resource/antenna port is used to notify the UE of a receive beam used for receiving.

4. SS block time index: SS is a synchronization signal. In one embodiment, a time number of an SS block received by the UE may be used to notify the UE of a receive beam used for receiving.

Network architectures and service scenarios that are described in this application are intended to describe the technical solutions in this application more clearly, and do not constitute a limitation on the technical solutions provided in this application. A person of ordinary skill in the art may know that, as the network architectures evolve and a new service scenario emerges, the technical solutions provided in this application are also applicable to a similar technical problem.

FIG. 1 is a schematic diagram of a possible application scenario according to this application. The application scenario includes at least one terminal 10 that communicates with a radio access network (RAN) through a radio interface. The RAN includes at least one base station 20. Only one base station and only one terminal are shown in the figure. The terminal 10 may further communicate with another terminal 10, for example, communication in a device-to-device (D2D) or machine-to-machine (M2M) scenario. The base station 20 may communicate with the terminal 10, or may communicate with another base station 20, for example, communication between a macro base station and an access point. The RAN is connected to a core network (CN). In one embodiment, the CN may be coupled to one or more data networks (DN) such as the Internet and a public switched telephone network (PSTN).

In this application, nouns "network" and "system" are usually interchangeably used, but meanings of the nouns may be understood by a person skilled in the art.

For ease of understanding, some nouns in this application are described below.

(1) A terminal is also referred to as user equipment (UE), or is referred to as a terminal device), or is referred to as a device that provides voice and/or data connectivity for a user, for example, a handheld device having a wireless connection function or a wireless communication function, a vehicle-mounted device, a wearable device, a computing device, a control device, or another processing device connected to a wireless modem, and mobile stations (MS) in various forms, and the like. Common terminals include a mobile phone (phone), a tablet computer (pad), a notebook computer (notebook), a palmtop computer, a mobile internet device (MID), and a wearable device such as a smartwatch, a smart band, or a pedometer. For ease of description, in this application, the devices mentioned above are collectively referred to as terminals.

(2) A base station is a device that connects the terminal to a wireless network, and includes but is not limited to an evolved NodeB (eNB), a radio network controller (RNC), a NodeB (NB), a base station controller (BSC), a base transceiver station (BTS), a home eNodeB (a home NodeB, HNB), a baseband Unit (BBU), a gNodeB (gNB), a transmission and reception point (TRP), a transmission point (TP), a mobile switching center, and the like. In addition, the base station may further include a Wi-Fi access point (AP) and the like. An apparatus that directly communicates with the terminal through a radio channel is usually a base station. The base station may include a macro base station, a micro base station, a relay node, an access point, a remote radio unit (RRU), or the like in various forms. Certainly, another base station that has a wireless communication function may perform wireless communication with the terminal. This is not limited in this application. In different systems, a device having a base station function may have different names. For example, in an LTE network, the device is referred to as an evolved NodeB (eNB or eNodeB). In a 3G (network, the device is referred to as a NodeB.

The term "and/or" in this application describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

The following explains some common concepts or definitions in the embodiments of this application. It should be noted that some English abbreviations in an LTE system are used as examples in this specification to describe the embodiments of this application, and may vary with network evolution. For evolution, refer to descriptions in a corresponding standard.

In this application, MR means a measurement report. HO means handover, namely, handover. A UL beam means an uplink beam. A DL beam means a downlink beam. RRM means radio resource measurement.

In this application, a beam may be understood as a spatial resource, and may be a transmit or receive precoding vector having energy transmission directivity. In addition, the transmit or receive precoding vector can be identified by using index information. The energy transmission directivity may mean that the precoding vector is used to perform precoding processing on a signal that needs to be sent, so that the signal obtained after precoding processing is performed has spatial directivity, and that a received signal obtained after precoding processing is performed by using the precoding vector has relatively good received power, for example, meets a received demodulation signal-to-noise ratio. The energy transmission directivity may also mean that same signals sent from different spatial locations and received by using the precoding vector have different received power. In one embodiment, a same communications device (such as a terminal or a base station) may have different precoding vectors, and different communications devices may also have different precoding vectors, that is, correspond to different beams. The beam may have a plurality of names, for example, the beam may be referred to as a spatial resource, a spatial weight, a spatial direction, or a spatial orientation. With development of a technology, the beam may have different names in different scenarios in different time periods. This is not limited in this application.

For a configuration or a capability of a communications device, one communications device may use one or more of a plurality of different precoding vectors at a same moment, that is, may form one or more beams at the same time. Beam information may be identified by using index information. In one embodiment, the index information may correspond to a configured resource identifier (ID) of the terminal. For example, the index information may correspond to an ID, an index, or a resource of a configured channel state information-reference signal (CSI-RS), or may correspond to an ID or a resource of a configured uplink sounding reference signal (SRS). Alternatively, in one embodiment, the index information may be index information explicitly or implicitly carried by using a signal or a channel carried on a beam. For example, the index information may include but is not limited to index information that is of a beam and that is indicated by a synchronization signal or a broadcast channel sent by using the beam. A high-frequency cell, for example, may be understood as a cell that operates on a frequency band greater than or equal to 6 GHz. When data is transmitted by using a high frequency, there is generally a relatively large transmission path loss. To ensure effective transmission of a service, a beamforming technology is introduced into the high frequency cell. The technology is used to concentrate energy of a signal in a required direction or beam, to form a beam aiming at the terminal and aim transmission energy at the terminal, thereby improving a demodulation signal-to-noise ratio of the terminal and improving user experience on a cell edge. A beam pair may be used for high-frequency data transmission. A sending party aims at a direction or a beam to send data, and a receiving party also needs to aim at a corresponding direction or a beam to receive data. The terminal and the base station may be in a same time unit, and data may be transmitted by using a Tx beam in at least one beam pair. The beam pair includes a transmit beam (Tx beam) and a receive beam (Rx beam). For example, the base station (for example, a gNB) may use the Tx beam, and the terminal (for example, UE) may use the Rx beam; or the terminal (for example, UE) uses the Tx beam, and the base station (for example, a gNB) uses the Rx beam.

Due to movement of the terminal and the like, the terminal needs to be handed over from a serving cell to a cell of a neighboring base station. In this case, during cell handover, normal communication between the base station and the terminal also needs to be ensured. This application provides a method for communication between the terminal and the base station during cell handover. With reference to the accompanying drawings, the following describes in more detail the solutions provided in the embodiments of this application.

Figure 2:
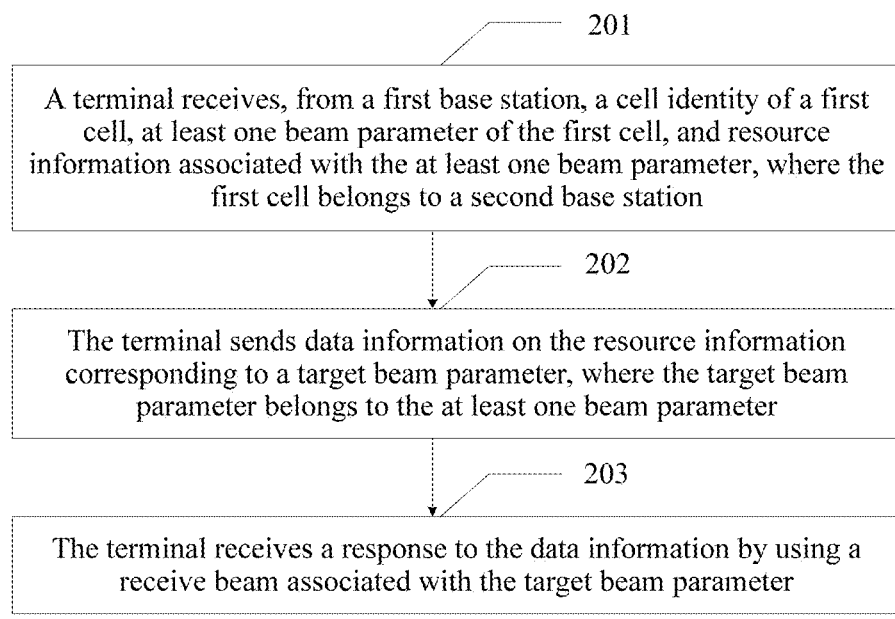
FIG. 2 is a flowchart of a communication method according to this application.

FIG. 2 is a flowchart of a communication method according to this application. The method includes the following steps:

Operation 201: A terminal receives, from a first base station, a cell identity of a first cell, at least one beam parameter of the first cell, and a resource associated with the at least one beam parameter, where the first cell belongs to a second base station.

Operation 202: The terminal sends information on a resource corresponding to a target beam parameter, where the target beam parameter belongs to the at least one beam parameter.

Operation 203: The terminal receives a response to the information by using a receive beam associated with the target beam parameter.

In operation 201, when the terminal needs to be handed over from a serving cell of the first base station (which may be understood as a serving base station of the terminal) to the first cell of the second base station (where the second base station is a neighboring base station of the first base station), the terminal receives, from the first base station, the cell identity of the first cell, the at least one beam parameter of the first cell, and the resource associated with the at least one beam parameter. In one embodiment, the beam parameter may be an identifier of a CSI-RS or an identifier of an SS block. The identifier of the CSI-RS may also be understood as an identifier or an index of a CSI-RS configuration, that is, CSI-RSs sent on a resource of a same CSI-RS configuration have a same CSI-RS identifier, and the identifier is an identifier of the CSI-RS configuration. For example, if a sending period is 2 ms, CSI-RSs sent every 2 ms have a same CSI-RS identifier or index, that is, the identifier or the index is an identifier or an index of a CSI-RS configuration to which the sent CSI-RSs belong. In this application, the identifier may also be understood as an index or a number.

The resource may be a random access resource or an uplink resource.

In operation 202, the terminal sends the information on the resource corresponding to the target beam parameter.

The target beam parameter belongs to the at least one beam parameter of the first cell.

In one embodiment, when the resource associated with the at least one beam parameter is a random access resource, the information sent by the terminal on the resource corresponding to the target beam parameter is a preamble sequence. In one embodiment, the random access resource includes a time-frequency resource and an index number of the preamble sequence.

In one embodiment, when the resource associated with the at least one beam parameter is an uplink resource, the information sent by the terminal on the resource corresponding to the target beam parameter is uplink data. In one embodiment, the uplink data includes an RRC connection reconfiguration complete message.

In operation 203, the terminal receives the response to the information by using the receive beam associated with the target beam parameter.

In one embodiment, when the resource is a random access resource and the information is a preamble sequence, the response includes an uplink timing advance. In this case, reference may be made to a handover procedure in FIG. 4(b).

When the resource is an uplink resource and the information is uplink data, the response is a HARQ feedback. In this case, reference may be made to a handover procedure in FIG. 4(c).

In this application, before performing a cell handover operation in operation 201 to operation 203, the terminal further needs to measure a cell, for example, measure the serving base station (namely, the first base station) and the neighboring base station (for example, the second base station) of the serving base station. Through measurement performed by the terminal, the first base station can select a cell to which the terminal is to be handed over, and a base station (which is the second base station in this application) of the cell to which the terminal is to be handed over can select a beam parameter for communicating with the terminal and a resource associated with the selected beam parameter.

The following describes several methods in which the terminal performs measurement.

Method 1. Measurement is performed based on a CSI-RS.

Operation 1: The terminal receives a first configuration sent by the first base station.

The first configuration includes a resource location and an identifier of at least one CSI-RS of the second base station.

In one embodiment, the first configuration carries a to-be-measured cell list and one or more resource locations and one or more identifiers of one or more CSI-RS of each cell. The cell list includes an identity of a cell of the second base station.

In one embodiment, an identifier of each CSI-RS is associated with one SS block. In other words, there is at least one SS block in one cell, and each SS block is associated with at least one CSI-RS.

Operation 2: The terminal measures the at least one CSI-RS.

In one embodiment, the terminal measures the at least one CSI-RS to obtain quality and/or power of each CSI-RS.

Operation 3: The terminal sends identifiers of some or all CSI-RSs in the at least one CSI-RS to the first base station.

In one embodiment, the identifier that is of the CSI-RS and that is sent by the terminal to the first base station is an identifier of a CSI-RS that meets a condition, for example, may be an identifier of a measured CSI-RS whose received strength or received quality is greater than a threshold, or identifiers of CSI-RSs that have relatively good received strength or received quality on N beams, where N is greater than or equal to 1.

Operation 4: The first base station selects the at least one beam parameter based on at least the received identifiers of the CSI-RSs.

In one embodiment, the first base station selects the at least one beam parameter based on at least one of the received identifiers, the quality, and/or the power of the CSI-RSs. The beam parameter is an identifier of a CSI-RS.

In one embodiment, identifiers of one or more CSI-RS, selected by the first base station includes the at least one beam parameter of the first cell that is sent by the first base station to the terminal.

In one embodiment, according to the foregoing method 1, the terminal measures CSI-RSs of all cells, and reports identifiers of all or some measured CSI-RSs, and may further report quality and/or power of the all or some CSI-RSs. The first base station selects identifiers of some CSI-RSs based on the received identifiers, quality, and/or power of the CSI-RSs, to send the selected identifiers of the CSI-RSs to the second base station. The second base station may determine, based on the received identifiers of the CSI-RSs, one or more CSI-RS for communicating with the terminal. Further, the second base station sends, to the first base station, the cell identity of the first cell, the at least one beam parameter of the first cell, and the resource associated with the at least one beam parameter. The at least one beam parameter of the first cell is identifiers that are of some or all CSI-RSs and that are in the identifiers, of the CSI-RSs, received by the second base station from the first base station.

In the method 1, from a perspective of the first base station, operations that need to be performed on the first base station side include the following:

Operation 1: The first base station receives identifiers of some or all CSI-RSs in the at least one CSI-RS from the terminal.

Operation 2: The first base station sends the identifiers of the some or all CSI-RSs in the at least one CSI-RS to the second base station.

Operation 3: The first base station receives, from the second base station, the cell identity of the first cell, the at least one beam parameter of the first cell, and the resource associated with the at least one beam parameter, where the first cell belongs to the second base station.

Operation 4: The first base station sends, to the terminal, the cell identity of the first cell, the at least one beam parameter of the first cell, and the resource associated with the at least one beam parameter, where the at least one beam parameter of the first cell belongs to the identifiers of the some or all CSI-RSs in the at least one CSI-RS, and the beam parameter is an identifier of a CSI-RS.

In one embodiment, the method further includes: receiving, by the first base station, a resource location and an identifier of the at least one CSI-RS of the second base station; and sending, by the first base station, a first configuration to the terminal, where the first configuration includes the resource location and the identifier of the at least one CSI-RS of the second base station.

In one embodiment, the method further includes: sending, by the first base station, a measurement frequency to the terminal; receiving, by the first base station from the terminal, identities of some or all cells in at least one cell associated with the measurement frequency, quality or power of the some or all cells, and an identifier of at least one SS block of each of the some or all cells; and sending, by the first base station to the second base station, an identity of a cell that is associated with the second base station and that is in the some or all cells, and an identifier of at least one SS block of the cell associated with the second base station. Some or all SS blocks in the at least one SS block are associated with the at least one CSI-RS of the second base station.

Method 2: Measurement is performed first based on an SS block and then based on a CSI-RS.

In the method 2, measurement is performed first based on an SS block, and the method includes the following steps:

Operation 1: The terminal receives a second configuration sent by the first base station.

The second configuration includes a measurement frequency.

In one embodiment, the measurement frequency is frequency information of the first base station and frequency information of the neighboring base station (for example, the second base station) of the first base station.

Operation 2: The terminal measures at least one synchronization signal on the frequency.

The at least one synchronization signal belongs to at least one cell, and the at least one cell includes the first cell of the first base station.

Operation 3: The terminal sends, to the first base station, identities of some or all cells in the at least one cell, quality or power of the some or all cells, and an identifier of at least one SS block of each of the some or all cells.

In one embodiment, the terminal further sends, to the first base station, quality and/or power of a synchronization signal associated with the at least one SS block of each of the some or all cells. In one embodiment, the quality or the power of the synchronization signal associated with the at least one SS block meets a first condition. The first condition may be that quality or power is greater than a threshold, that is, the quality that is of the synchronization signal and that is reported by the terminal to the first base station is greater than a threshold, and/or the power that is of the synchronization signal and that is reported by the terminal to the first base station is greater than a threshold.

In the foregoing steps, the first base station may select identifiers of some SS blocks, and send, to the second base station, one or more identifiers of one or more SS blocks that belongs to the second base station. The second base station determines at least one CSI-RS associated with the received identifiers of the one or more SS blocks, and sends a resource location and an identifier of the determined at least one CSI-RS to the first base station. According to the foregoing method 1, the first base station further adds, into a first configuration, the resource location and the identifier of the at least one CSI-RS that are received from the second base station, and sends the first configuration to the terminal. The terminal measures the at least one CSI-RS in the first configuration, and reports identifiers of some or all CSI-RSs based on a measurement result.

In the method 2, the terminal first measures at least one synchronization signal based on an SS block, and reports part of the SS blocks. The first base station selects a cell (for example, selects the first cell of the second base station) based on the received SS blocks, and sends, to the second base station, received at least one SS block that belongs to the cell. The second base station determines, based on the received at least one SS block, at least one CSI-RS associated with the received at least one SS block, and further sends these CSI-RSs to the terminal by using the first base station. The terminal further measures the received CSI-RSs.

Method 3: Measurement is performed based on an SS block.

Operation 1: The terminal receives a third configuration sent by the first base station.

The third configuration includes a measurement frequency.

Operation 2: The terminal measures at least one synchronization signal on the frequency.

The at least one synchronization signal belongs to at least one cell, and the at least one cell includes the first cell.

Operation 3: The terminal sends, to the first base station, identities of some or all cells in the at least one cell, signal quality or power of the some or all cells, and an identifier of at least one SS block of each of the some or all cells.

In one embodiment, the terminal further sends quality and/or power of the at least one SS block of each of the some or all cells to the first base station, and the first base station selects at least one SS block based on at least one of the identifier, the quality, and/or the power of the at least one SS block of each of the some or all cells.

In one embodiment, quality or power of a synchronization signal associated with the at least one SS block of each of the some or all cells meets a first condition.

Based on the method 3, the terminal may measure and report at least one SS block. The first base station sends one or more received identifiers of the one or more SS blocks to the second base station. The second base station may send, to the first base station based on the one or more received identifiers of the one or more SS blocks, the identity of the first cell, the at least one beam parameter of the first cell (the beam parameter is some or all of the identifiers which are of the one or more SS blocks and which are received by the second base station), and the resource associated with the at least one beam parameter.

In the method 3, from a perspective of the first base station, operations that need to be performed on the first base station side include the following:

Operation 1: The first base station receives, from the terminal, identities of some or all cells in at least one cell and identifiers of SS blocks associated with the identities of the some or all cells.

Operation 2: The first base station sends, to the second base station, an identity of a cell that is associated with the second base station and that is in the some or all cells, and an identifier of at least one SS block of the cell associated with the second base station.

Operation 3: The first base station receives, from the second base station, the cell identity of the first cell, the at least one beam parameter of the first cell, and the resource associated with the at least one beam parameter, where the first cell belongs to the second base station.

Operation 4: The first base station sends, to the terminal, the cell identity of the first cell, the at least one beam parameter of the first cell, and the resource associated with the at least one beam parameter, where the at least one beam parameter of the first cell belongs to the identifier of the at least one SS block, and the beam parameter is an identifier of an SS block.

In one embodiment, the first base station sends a measurement frequency to the terminal, where the measurement frequency is associated with the at least one cell.

Method 4: Measurement is performed based on a CSI-RS and an SS block at the same time.

Operation 1: The terminal receives a first configuration from the first base station, where the first configuration includes a resource location and an identifier of at least one CSI-RS of the first cell and at least one synchronization signal of the first cell.

Operation 2: The terminal measures the at least one CSI-RS of the first cell and the at least one synchronization signal of the first cell.

Operation 3: The terminal sends first quality and/or first power of the first cell and second quality and/or second power of the first cell to the first base station.

The first quality and/or the first power are/is obtained based on quality and/or power of some or all CSI-RSs in the at least one CSI-RS of the first cell. The second quality and/or the second power are/is obtained based on quality and/or power of some or all synchronization signals in the at least one synchronization signal.

In the method 4, the terminal measures at least one SS block and at least one CSI-RS at the same time, and reports identifiers of some or all SS blocks and identifiers of some or all CSI-RSs to the first base station. The first base station sends the received identifiers of the SS blocks and the received identifiers of the CSI-RSs to the second base station. The second base station selects a beam parameter for communicating with the terminal. The beam parameter is a CSI-RS or an SS block.

In the method 4, from a perspective of the first base station, operations that need to be performed on the first base station side include the following:

Operation 1: The first base station receives, from the second base station, an identity of at least one cell and an identifier and a resource location of a CSI-RS associated with the at least one cell.

Operation 2: The first base station sends, to the terminal, the identity of the at least one cell and the identifier and the resource location of the CSI-RS associated with the at least one cell.

The first base station receives, from the terminal, identities of some or all cells in the at least one cell, identifiers of SS blocks associated with the some or all cells, and/or identifiers of CSI-RSs associated with the some or all cells.

In one embodiment, the first base station sends, to the second base station, the identities of the some or all cells in the at least one cell, the identifiers of the SS blocks associated with the some or all cells, and/or the identifiers of the CSI-RSs associated with the some or all cells.

The first base station receives, from the second base station, the identity of the first cell and the at least one beam parameter associated with the first cell, where the at least one beam parameter belongs to the identifiers of the associated SS blocks and/or the identifiers of the associated CSI-RSs, and the first cell belongs to the at least one cell.

The first base station sends, to the terminal, the identity of the first cell and the at least one beam parameter associated with the first cell, where the at least one beam parameter belongs to the identifiers of the associated SS blocks and/or the identifiers of the associated CSI-RSs.

In one embodiment, in this application, the terminal may further measure the serving cell of the first base station, for example, measure a CSI-RS of the serving cell and measure a synchronization signal of the serving cell.

In one embodiment, that the terminal measures the CSI-RS of the serving cell includes the following:

Operation 1: The first base station sends a second instruction to the terminal.

Operation 2: The terminal receives the second instruction from the first base station.

Operation 3: The terminal measures at least one CSI-RS of the serving cell.

Operation 4: In response to the second instruction, the terminal sends third quality and/or third power of the serving cell to the first base station.

The third quality and/or the third power are/is obtained based on quality and/or power of some or all CSI-RSs in the at least one CSI-RS of the serving cell.

Operation 5: The first base station receives the third quality and/or the third power of the serving cell that are/is sent by the terminal in response to the second instruction.

In one embodiment, that the terminal measures the synchronization signal of the serving cell includes the following:

Operation 1: The first base station sends a third instruction to the terminal.

Operation 2: The terminal receives the third instruction from the first base station.

Operation 3: The terminal measures at least one synchronization signal of the serving cell.

Operation 4: In response to the third instruction, the terminal sends fourth quality and/or fourth power of the serving cell to the first base station.

The fourth quality and/or the fourth power are/is obtained based on quality and/or power of some or all synchronization signals in the at least one synchronization signal of the serving cell.

Operation 5: The first base station receives the fourth quality and/or the fourth power of the serving cell that are/is sent by the terminal in response to the third instruction.

The following describes the foregoing measurement process in detail.

NR supports two types of measurement reference signals: an NR-SS (namely, a synchronization signal) and a CSI-RS. The NR-SS is cell-level, and is not related to UE or is the same for all UEs. A measurement result obtained by the UE through measurement is relatively coarse. The CSI-RS is UE-level, and is sent for UE. A base station needs to configure a CSI-RS resource for the UE by using RRC dedicated signaling. The UE performs measurement based on the configured CSI-RS resource. A measurement result obtained by the UE by measuring the CSI-RS is relatively precise. Certainly, the CSI-RS may be cell-level, and is the same for all UEs.

For UE in a connected mode, a gNB (the first base station is used as an example in this application) requests, from a neighboring base station (the second base station is used as an example in this application), CSI-RS configurations corresponding to one or more SS blocks (or referred to as beams) in the first cell of the neighboring base station. The gNB sends, to the terminal, the obtained CSI-RS configurations corresponding to the SS blocks, so that the terminal performs CSI-RS measurement in the neighboring cell.

In one embodiment, a request message sent by the first base station to the second base station carries a cell identity of a first cell of the second base station. In one embodiment, the request message carries identifiers (for example, SS block time index indications) of one or more SS blocks of the firstcell, to request to obtain CSI-RS configurations corresponding to the SS blocks, or the information is used for reference, for example, the first base station also adds information such as a movement direction and a movement speed of the terminal into the request message. The second base station comprehensively considers the information to determine CSI-RS configurations corresponding to measured SS blocks.

In one embodiment, the request message may also include measurement bandwidth capability information supported by the terminal, so that the CSI-RS configuration of the first cell that is sent by the second base station is not beyond a measurement bandwidth capability of the terminal.

In one embodiment, a CSI-RS configuration corresponds to an identifier of a CSI-RS configuration or an identifier of an SS block. The CSI-RS configuration may be an offset performed based on a corresponding SS block resource location, or may be a configuration based on a frame number, a subframe number, a symbol, or the like.

After measuring reference signals corresponding to all CSI-RS configurations, the terminal combines a plurality of obtained measurement values to generate a cell measurement value. In addition to carrying the cell measurement value of the CSI-RSs, a reported measurement report further carries measurement information (for example, detected identifiers of the CSI-RS configurations, and sorting of measurement values of CSI-RS resources corresponding to the identifiers or identifiers of the CSI-RS resources) corresponding to the CSI-RS configurations.

Considering that a CSI-RS may be related to a UE ID, the second base station may further need to allocate a UE ID to current UE, and send the UE ID to the first base station, so that the terminal can derive a resource location of a CSI-RS.

The following describes how the first base station determines SS blocks for which CSI-RS resource configurations need to be requested.

Figure 3:
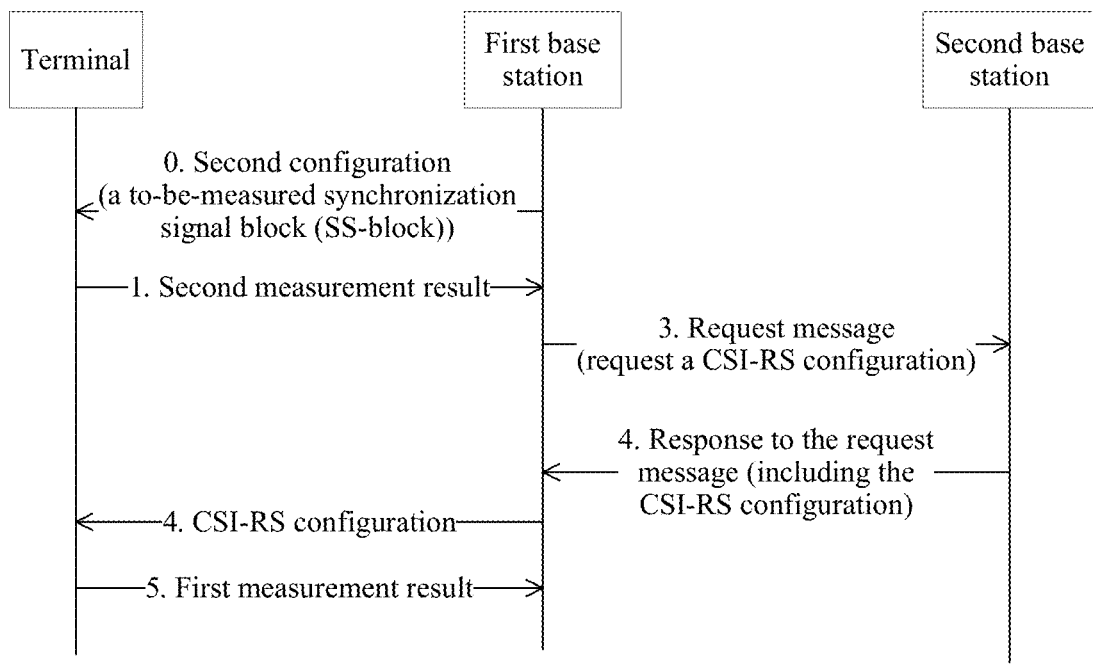
FIG. 3 is a schematic diagram of a measurement method according to this application.

In a possible method, two-level neighboring cell measurement is performed. The terminal first measures a synchronization signal of a neighboring cell, and sends, to the first base station, a measurement value of a detected synchronization signal that meets a condition and an SS block associated with the synchronization signal. The first base station obtains information about an SS block that is obtained by the terminal through measurement and that has relatively good signal quality. The first base station requests, from the second base station, a CSI-RS configuration corresponding to an SS block that is reported by the UE and that is of the cell of the second base station. In addition, the cell of the second base station sends a CSI-RS on a resource corresponding to the CSI-RS configuration. Therefore, a CSI-RS may not need to be sent to the terminal on all SS blocks, thereby saving resources. In one embodiment, FIG. 3 is a schematic diagram of a measurement method according to this application. The first base station sends a second configuration to the terminal, where the second configuration includes an SS block that needs to be measured. The terminal sends a second measurement result to the first base station. The first base station selects, based on the second measurement result, an SS block with a relatively good measurement result and a cell corresponding to the SS block with a relatively good measurement result, for example, the cell of the second base station. The first base station sends a request message to the second base station to request to obtain a CSI-RS configuration, where the CSI-RS configuration that the first base station requests to obtain is CSI-RS configurations corresponding to some or all SS blocks in SS blocks in the second measurement result. The second base station sends, to the first base station, a response to the request message, where the response includes the CSI-RS configurations. The first base station sends, to the terminal, the CSI-RS configuration sent by the second base station. The terminal further measures the received CSI-RS configurations to obtain a first measurement result, and sends the first measurement result to the first base station, so that the first base station can determine a CSI-RS with relatively good quality, or the first base station sends the first measurement result to the second base station, and the second base station determines a CSI-RS with relatively good quality.

Figure 4:
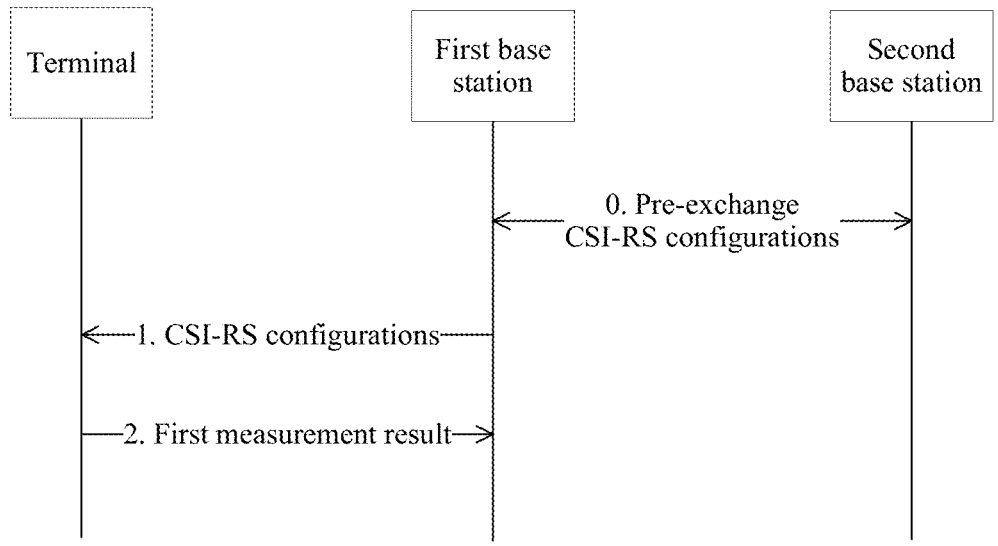
FIG. 4 is a schematic diagram of a measurement method according to this application.

In another possible method, the first base station sends CSI-RS configurations corresponding to all SS blocks of the neighboring cell to the terminal, so that the terminal measures the received CSI-RSs and reports a measurement result. In one embodiment, the terminal does not need to measure the SS block. In one embodiment, FIG. 4 is a schematic diagram of a measurement method according to this application. Pre-interaction is performed between the second base station and the first base station, so that the first base station obtains the CSI-RS configurations corresponding to all the SS blocks of the second base station, and sends the obtained CSI-RS configurations to the terminal. The terminal measures the received CSI-RS configurations to obtain a first measurement result, and then sends the first measurement result to the first base station, so that the first base station can select a CSI-RS with relatively good quality based on the first measurement result, or the first base station sends the first measurement result to the second base station, and the second base station selects a CSI-RS with relatively good quality.

The following describes in detail the measurement method provided in this application.

1. The terminal device receives first measurement task configuration information sent by the first base station, where the first measurement task configuration information is used to configure the terminal device to measure a synchronization signal (for example, a PSS (primary synchronization signal) and/or an SSS (secondary synchronization signal)) and/or a first CSI-RS.

The first measurement task configuration information includes a measurement object, and the measurement object carries a to-be-measured cell list and CSI-RS information corresponding to one or more SS blocks in each cell.

The first measurement task configuration information includes a measurement event configuration. The measurement event configuration includes a first threshold that is indicated as an NR-SS type, and is used to trigger measurement and report of the synchronization signal of the cell of the second base station. Alternatively, the measurement event configuration includes a third threshold that is indicated as a CSI-RS type, and is used to trigger measurement and report of the first CSI-RS of the cell of the second base station. Alternatively, one measurement event configuration includes both a first threshold and a third threshold, and measurement and report are triggered when either of the two types of thresholds is met.

In one embodiment, the first threshold and the third threshold may be used for a decision condition of a same measurement event, for example, A1 to A6. For example, both a threshold of the NR-SS type and a threshold of the CSI-RS type may be configured for A3.

A measurement result of a (each) serving cell is reported in a measurement report. The measurement event configuration may further include reporting measurement result indication information of a type of reference signal of the serving cell, for example, whether to report an SS measurement result, whether to report a CSI-RS measurement result, or whether to report both an SS measurement result and a CSI-RS measurement result. Alternatively, no configuration is required. Instead, an NR-SS cell measurement value and a CSI-RS cell measurement value of a serving cell are always reported in a measurement report. In addition, the measurement event configuration may further include whether to report an SS block measurement value of the serving cell. If the measurement event configuration indicates that the SS block measurement value of the serving cell needs to be reported, a measurement value of one or more SS blocks corresponding to an NR-SS is reported, and a measurement value corresponding to one or more CSI-RS configurations is also reported.

The measurement event configuration may further include reporting measurement result indication information of a type of reference signal of a neighboring cell, for example, whether to report an SS measurement result, whether to report a CSI-RS measurement result, or whether to report both an SS measurement result and a CSI-RS measurement result. Alternatively, no configuration is required. Instead, an NR-SS cell measurement value and a CSI-RS cell measurement value of a neighboring cell are always reported in a measurement report.

In one embodiment, the measurement object further includes a beam quantity N, used to combine measurement values of a maximum of N beams to obtain a cell measurement value, where N is configured based on a frequency, that is, a same value is used for measurement on the frequency. A same N value may be used for synchronization-signal-based measurement and CSI-RS-based measurement. In addition to configuring, in the measurement object, the beam quantity N for UE in a connected mode, UE in an idle mode also needs to use an N value in measurement performed by the UE. The N value may be broadcast in system information, or may be indicated by a network to the UE when the UE enters the idle mode. Similar to the foregoing description, N may be configured based on a frequency, and one N value is configured for each frequency. A same N value is used for synchronization-signal-based measurement and CSI-RS-based measurement. Alternatively, the N value is specified in a protocol.

2. The terminal device sends a first measurement result to the first base station, where the first measurement result is RSRP and/or RSRQ based on the synchronization signal and/or the first CSI-RS.

The first measurement result may further include a cell identity.

In one embodiment, the first measurement result may further include identifier information of a first beam in a cell corresponding to the cell identity, such as an SS block or CSI-RS resource identifier.

In one embodiment, the RSRQ and/or the RSRQ based on the synchronization signal may be cell-level and/or beam-level.

In one embodiment, the RSRQ and/or the RSRQ based on the first CSI-RS may be cell-level and/or beam-level.

In one embodiment, if both CSI-RS-based measurement and SS block-based measurement are configured for the terminal device, provided that synchronization-signal-based measurement and/or CSI-RS-based measurement meet/ meets a decision condition of a corresponding measurement event, the terminal device needs to report RSRP and/or RSRQ based on a CSI-RS and a synchronization signal.

3. In one embodiment, the first base station sends a first request to the second base station, where the first request is used to request the second base station to configure second CSI-RS measurement in the second base station for the terminal device.

In one embodiment, the first request further includes the first measurement result.

4. In one embodiment, the second base station configures a second CSI-RS for the terminal device based on the first request. The CSI-RS is used to perform measurement based on N ports of a plurality of antennas.

5. In one embodiment, the first base station receives a response message that is to the first request and that is sent by the second base station, where the response message to the first request includes configuration information of the second CSI-RS, and the configuration information of the second CSI-RS is used by the terminal device to measure (for example, perform RRM measurement) the second CSI-RS.

In one embodiment, the response message further includes an identifier information of a second beam of the second base station, and the identifier information of the second beam is used by the terminal device to measure the second CSI-RS based on the second beam.

6. In one embodiment, the first base station sends second configuration information to the terminal device, where the second configuration information includes the configuration information of the second CSI-RS.

In one embodiment, the second configuration information further includes the identifier message of the second beam of the second base station.

7. In one embodiment, the terminal device receives the second configuration information sent by the first base station, and measures the second CSI-RS.

In one embodiment, the second configuration information further includes a second threshold, used to trigger measurement and report of the second CSI-RS of the cell of the second base station.

8. In one embodiment, the terminal device sends a second measurement result to the first base station, where the second measurement result includes RSRP and/or RSRQ based on the second CSI-RS.

In one embodiment, the second measurement result may further include the identifier information of the second beam. Coverage of the second beam is a subset of coverage of the first beam.

In one embodiment, the first beam may be the second beam.

In one embodiment, the RSRQ and/or the RSRQ based on the second CSI-RS may be cell-level and/or beam-level.

In one embodiment, if both CSI-RS-based measurement and SS block-based measurement are configured for the terminal device, provided that synchronization-signal-based measurement and/or CSI-RS-based measurement meet/ meets a decision condition of a corresponding measurement event, the terminal device needs to report RSRP and/or RSRQ based on a CSI-RS and a synchronization signal.

9. The first base station receives the second measurement result or the first measurement result that is sent by the terminal device.

In one embodiment, if receiving the second measurement result or the first measurement result that is sent by the terminal device, the first base station determines whether to initiate a handover process, for example, sends a handover request to the second base station.

In one embodiment, if both CSI-RS-based measurement and SS block-based measurement are configured for the terminal device, provided that synchronization-signal-based measurement and/or CSI-RS-based measurement meet/ meets a decision condition of a corresponding measurement event, the terminal device needs to report RSRP and/or RSRQ based on a CSI-RS and a synchronization signal.

10. The second base station sends a response message to the handover request to the first base station, where the response message includes a handover command. The handover command includes a cell identity, a terminal identifier C-RNTI of the cell, N PRACH configurations (RACH time-frequency resources, and in one embodiment, a preamble root sequence and a preamble index that are used to generate a preamble), and identifier information of DL beams associated with the N PRACH resources. The associated downlink beam may be a downlink beam used to send a CSI-RS and/or a downlink beam used to send an SS block. In one embodiment, the first base station sends the handover command to the terminal device.

11. In one embodiment, the terminal device receives the handover command sent by the first base station, and initiates a random access process to a target base station. In one embodiment, the terminal device performs beam measurement based on an instruction of the second base station or the first base station and the associated DL beam used to send a CSI-RS and/or an SS block, and selects a PRACH configuration associated with a DL beam that is used to send a CSI-RS and/or an SS block and on which signal strength and/or channel quality is greater than a threshold or on which signal strength and/or channel quality is the best, to perform the random access process. For a random access process, refer to the previous descriptions.

12. In one embodiment, the terminal device sends a handover complete message to the second base station.

Figure 4A:
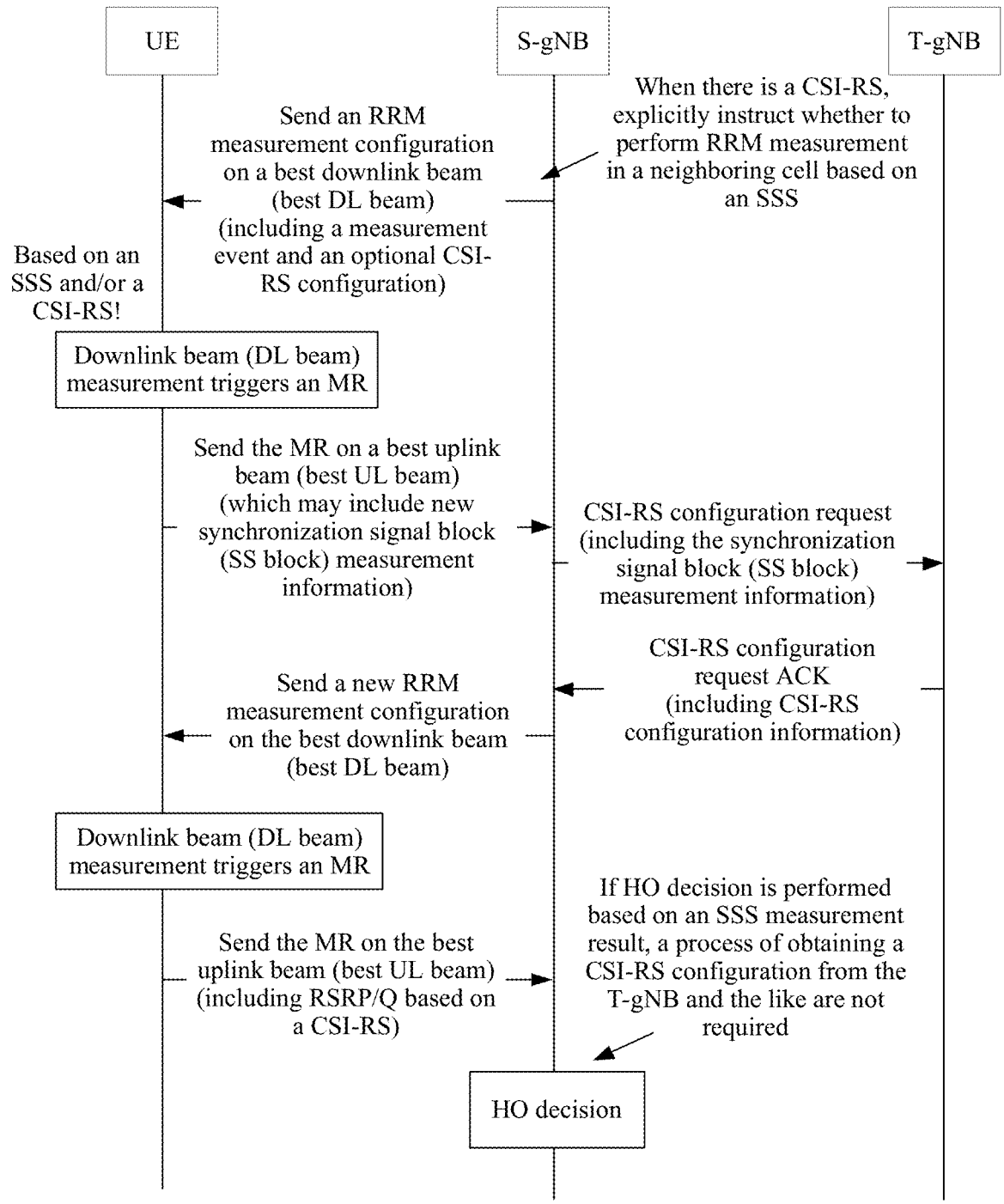
FIG. 4(a) is a flowchart of a measurement method according to this application.
Figure 4B:
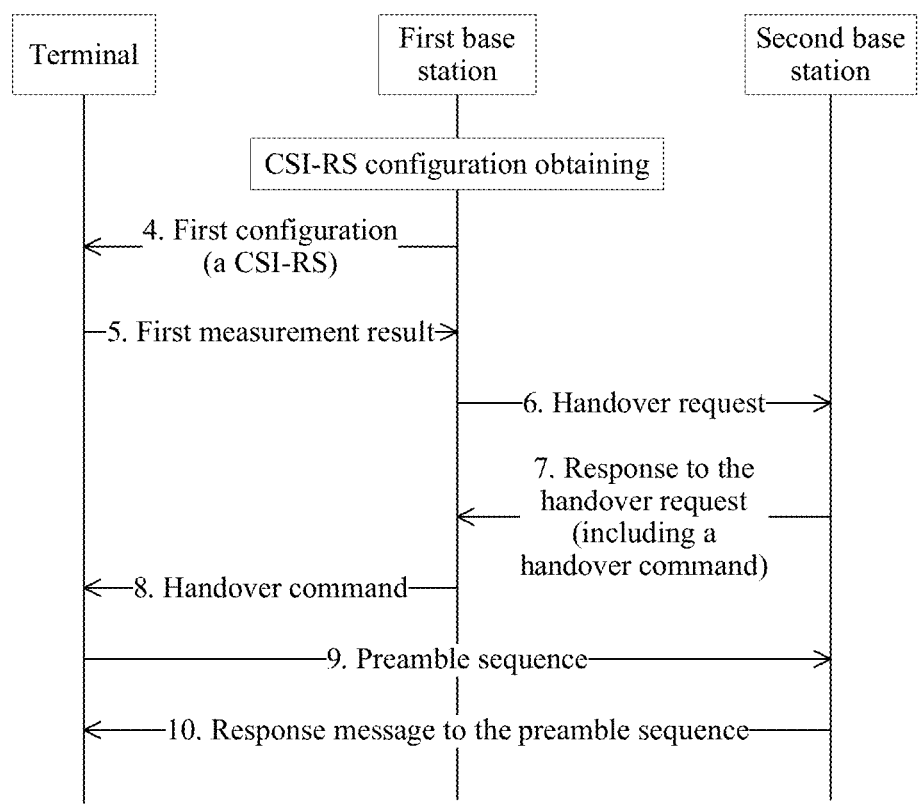
FIG. 4(b) is a flowchart of a handover method according to this application.
Figure 4C:
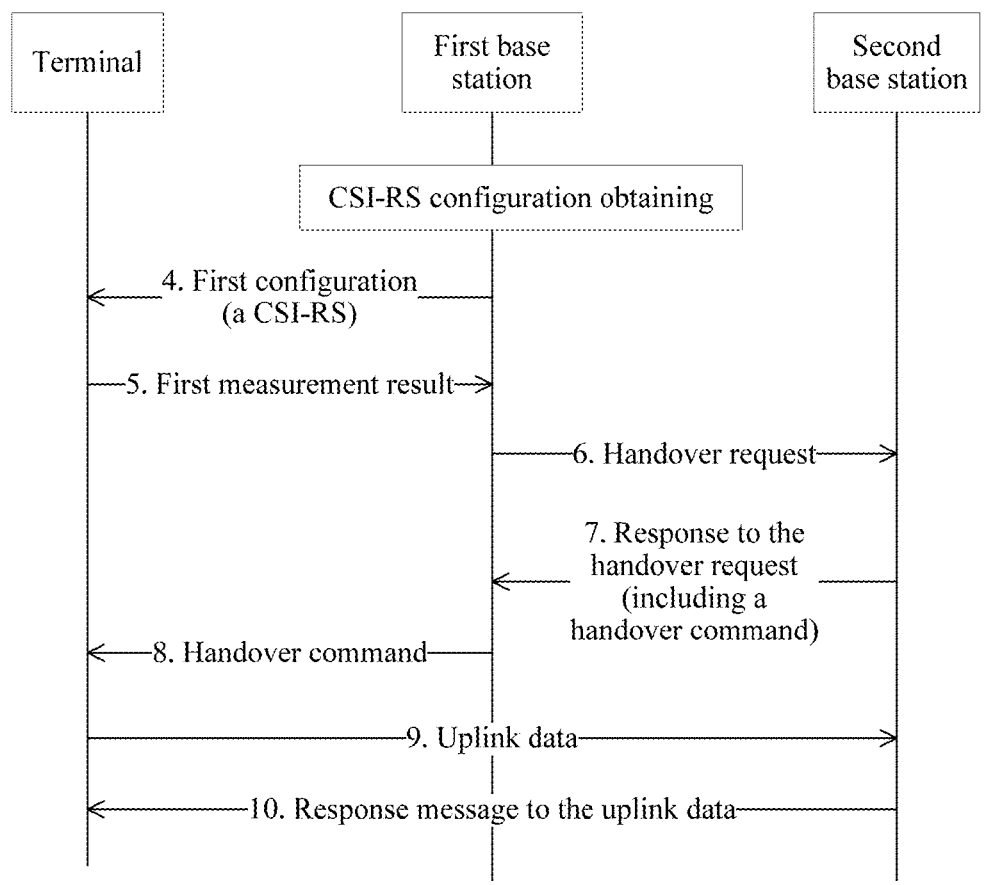
FIG. 4(c) is a flowchart of a handover method according to this application.

For content of steps 1 to 12, refer to the descriptions in FIG. 4(a). FIG. 4(a) is a flowchart of a measurement method according to this application.

In the foregoing embodiments provided in this application, the communication method provided in the embodiments of this application is described separately from a perspective of each network element and from a perspective of interaction between network elements. It may be understood that, to implement the foregoing functions, each network element such as the terminal (for example, the UE) or the base station includes a corresponding hardware structure and/or software module for performing each function. A person of ordinary skill in the art should be easily aware that, units and algorithms steps in the examples described with reference to the embodiments disclosed in this specification may be implemented in a form of hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 5:
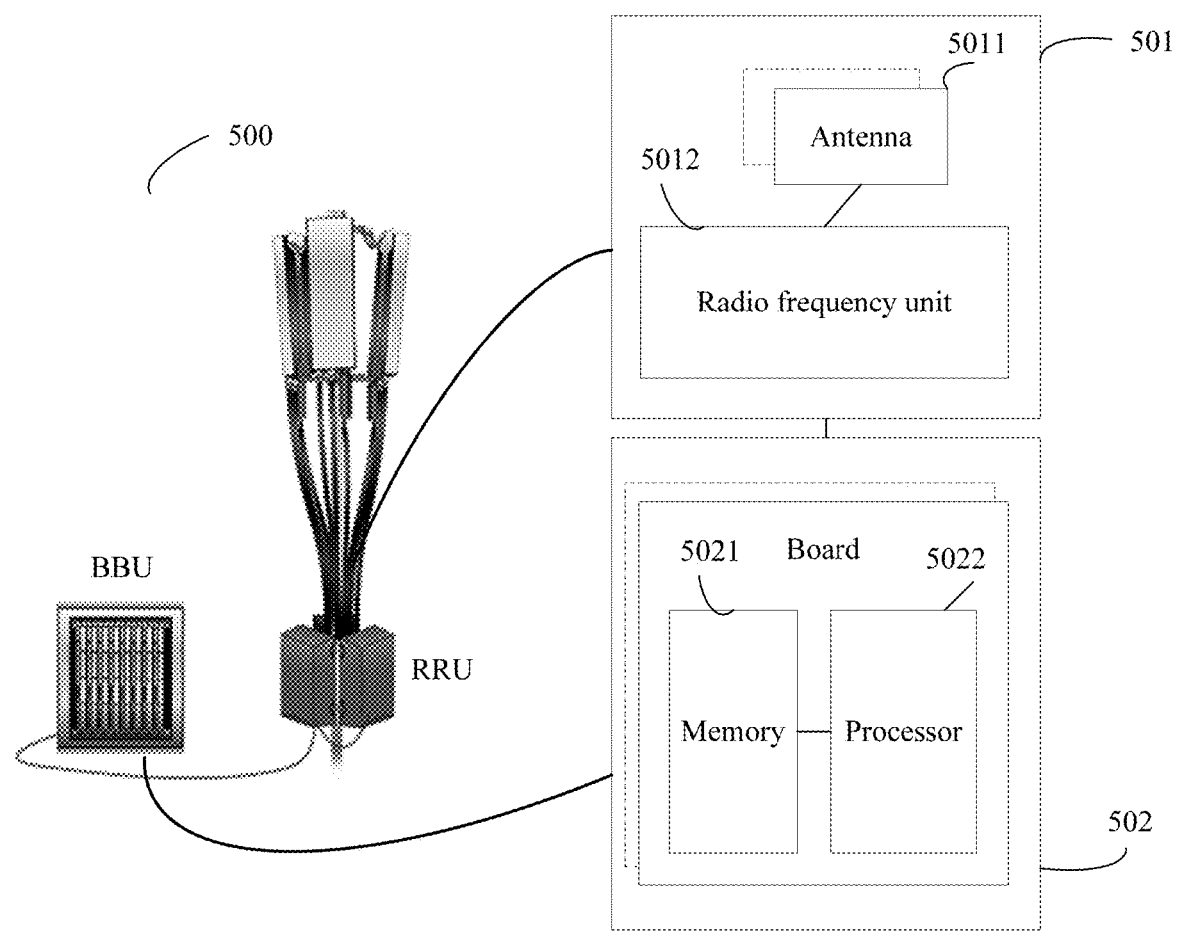
FIG. 5 is a schematic diagram of a base station according to this application.

Based on a same concept, an embodiment of this application further provides a base station 500. As shown in FIG. 5, the base station 500 may be used to perform the method performed by the base station in any one of the foregoing embodiments. The base station 500 includes one or more remote radio units (RRU) 501 and one or more baseband units (BBU) 502. The RRU 501 may be referred to as a transceiver unit, a transceiver, a transceiver circuit, a transceiver, or the like, and may include at least one antenna 5011 and a radio frequency unit 5012. The RRU 501 is mainly configured to: receive/send a radio frequency signal, and perform conversion between a radio frequency signal and a baseband signal. The BBU 502 is mainly configured to: perform baseband processing, control the base station, and the like. The RRU 501 and the BBU 502 may be physically disposed together, or may be physically separated, that is, in a distributed base station.

The BBU 502 is a control center of the base station, may also be referred to as a processing unit, and is mainly configured to complete a baseband processing function such as channel coding, multiplexing, modulation, or spreading. For example, the BBU (the processing unit) may be configured to control the base station to perform the method performed by the base station in any of the foregoing embodiments.

In an example, the BBU 502 may include one or more boards, and a plurality of boards may jointly support a radio access network (such as an LTE network) of a single access standard, or may separately support radio access networks of different access standards. The BBU 502 further includes a memory 5021 and a processor 5022. The memory 5021 is configured to store an instruction and data. The processor 5022 is configured to control the base station to perform an action, for example, configured to control the base station to perform the method performed by the base station in any one of the foregoing embodiments. The memory 5021 and the processor 5022 may serve one or more boards. In other words, a memory and a processor may be disposed on each board. Alternatively, a plurality of boards may use a same memory and processor. In addition, a circuit is further disposed on each board.

In an uplink, an uplink signal (including data or the like) sent by a terminal is received by using the antenna 5011. In a downlink, a downlink signal (including data and/or control information) is sent to the terminal by using the antenna 5011. The processor 5022 processes service data and a signaling message. These units perform processing based on a radio access technology (for example, an access technology in LTE, NR, and another evolved system) used by a radio access network. The processor 5022 is further configured to control and manage an action of the base station, and is configured to perform processing performed by the base station in the foregoing embodiments. The processor 5022 is further configured to support the base station in performing the processing processes of the base station in FIG. 2 to FIG. 4.

It may be understood that FIG. 5 shows only a simplified design of the base station. In actual application, the base station may include any quantity of antennas, memories, processors, radio frequency units, RRUs, BBUs, and the like, and all base stations that can implement this application fall within the protection scope of this application.

In one embodiment, in this application, that the RRU 501 is referred to as a transceiver is used as an example. In this case, the transceiver and the processor in the base station 500 may be configured to perform the following operations.

The transceiver is configured to receive identifiers of some or all CSI-RSs in the at least one CSI-RS from a terminal.

The transceiver is further configured to send the identifiers of the some or all CSI-RSs in the at least one CSI-RS to the second base station.

The transceiver is further configured to receive, from the second base station, a cell identity of a first cell, at least one beam parameter of the first cell, and a resource associated with the at least one beam parameter, where the first cell belongs to the second base station.

The transceiver is further configured to send, to the terminal, the cell identity of the first cell, the at least one beam parameter of the first cell, and the resource associated with the at least one beam parameter, where the at least one beam parameter of the first cell belongs to the identifiers of the some or all CSI-RSs in the at least one CSI-RS, and the beam parameter is an identifier of a CSI-RS.

In one embodiment, the transceiver is further configured to receive a resource location and an identifier of the at least one CSI-RS of the second base station.

The transceiver is further configured to send a first configuration to the terminal, where the first configuration includes the resource location and the identifier of the at least one CSI-RS of the second base station.

In one embodiment, the transceiver is further configured to send a measurement frequency to the terminal.

The transceiver is further configured to receive, from the terminal, identities of some or all cells in at least one cell associated with the measurement frequency, quality or power of the some or all cells, and an identifier of at least one SS block of each of the some or all cells.

The transceiver is further configured to send, to the second base station, an identity of a cell that is associated with the second base station and that is in the some or all cells, and an identifier of at least one SS block of the cell associated with the second base station.

Some or all SS blocks in the at least one SS block are associated with the at least one CSI-RS of the second base station.

In another example, the transceiver is configured to receive, from a terminal, identities of some or all cells in at least one cell and identifiers of SS blocks associated with the identities of the some or all cells.

The transceiver is further configured to send, to the second base station, an identity of a cell that is associated with the second base station and that is in the some or all cells, and an identifier of at least one SS block of the cell associated with the second base station.

The transceiver is further configured to receive, from the second base station, a cell identity of a first cell, at least one beam parameter of the first cell, and a resource associated with the at least one beam parameter, where the first cell belongs to the second base station.

The transceiver is further configured to send, to the terminal, the cell identity of the first cell, the at least one beam parameter of the first cell, and the resource associated with the at least one beam parameter, where the at least one beam parameter of the first cell belongs to the identifier of the at least one SS block, and the beam parameter is an identifier of an SS block.

In one embodiment, the transceiver is further configured to send a measurement frequency to the terminal, where the measurement frequency is associated with the at least one cell.

In another example, the transceiver is configured to receive, from a second base station, an identity of at least one cell and an identifier and a resource location of a CSI-RS associated with the at least one cell.

The transceiver is further configured to send, to a terminal, the identity of the at least one cell and the identifier and the resource location of the CSI-RS associated with the at least one cell.

The transceiver is further configured to receive, from the terminal, identities of some or all cells in the at least one cell, identifiers of SS blocks associated with the some or all cells, and/or identifiers of CSI-RSs associated with the some or all cells.

In one embodiment, the transceiver is further configured to send, to the second base station, the identities of the some or all cells in the at least one cell, the identifiers of the SS blocks associated with the some or all cells, and/or the identifiers of the CSI-RSs associated with the some or all cells.

The transceiver is further configured to receive, from the second base station, an identity of a first cell and at least one beam parameter associated with the first cell, where the at least one beam parameter belongs to the identifiers of the associated SS blocks and/or the identifiers of the associated CSI-RSs, and the first cell belongs to the at least one cell.

The transceiver is further configured to send, to the terminal, the identity of the first cell and the at least one beam parameter associated with the first cell, where the at least one beam parameter belongs to the identifiers of the associated SS blocks and/or the identifiers of the associated CSI-RSs.

In another example, the transceiver is further configured to send a second instruction to a terminal.

The transceiver is further configured to receive third quality and/or third power of a serving cell that are/is sent by the terminal in response to the second instruction, where the third quality and/or the third power are/is obtained based on quality and/or power of some or all CSI-RSs in at least one CSI-RS of the serving cell.

In another example, the transceiver is configured to send a third instruction to a terminal.

The transceiver is further configured to receive fourth quality and/or fourth power of the serving cell that are/is sent by the terminal in response to the third instruction, where the fourth quality and/or the fourth power are/is obtained based on quality and/or power of some or all synchronization signals in at least one synchronization signal of the serving cell.

Figure 6A:
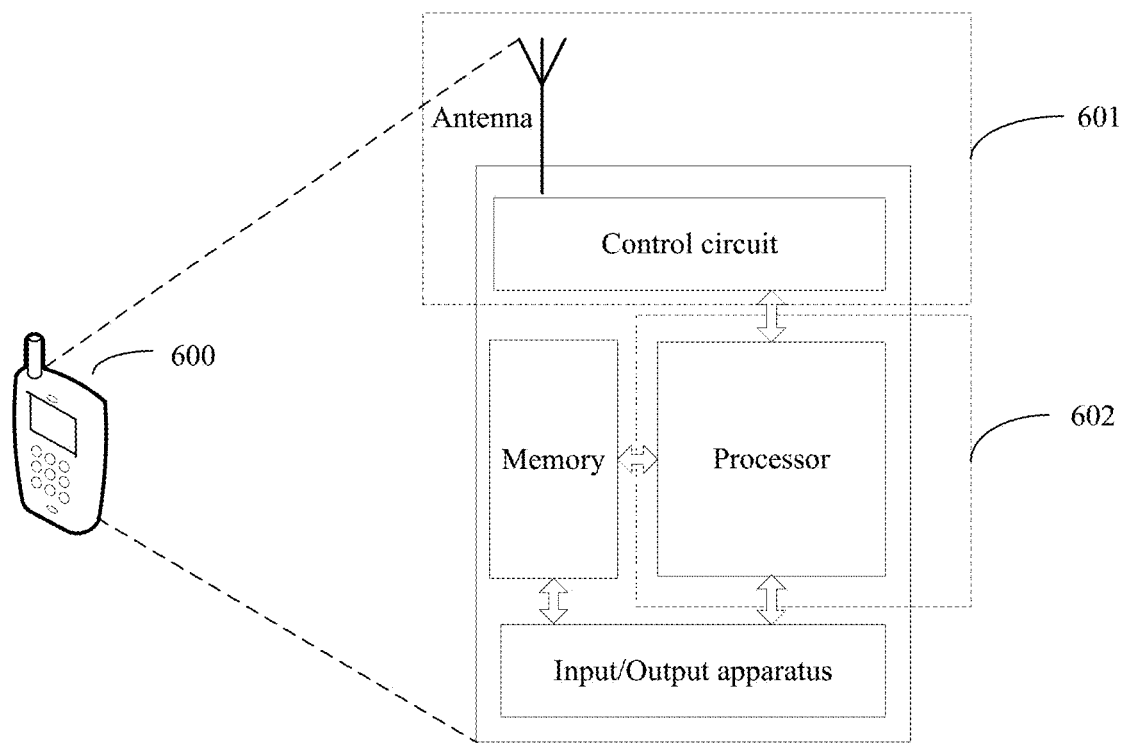
FIG. 6(a) is a schematic diagram of a terminal according to this application.

Based on a same concept, an embodiment of this application further provides a terminal 600. As shown in FIG. 6(*a*), for ease of description, FIG. 6(*a*) shows only main components of the terminal. As shown in FIG. 6(*a*), the terminal 600 includes a processor, a memory, a control circuit, an antenna, and an input/output apparatus. The processor is mainly configured to: process a communication protocol and communication data, control the entire terminal, execute a software program, and process data of the software program, for example, is configured to support the terminal 600 in performing the method performed by the terminal in any one of the foregoing embodiments. The memory is mainly configured to store a software program and data. The control circuit is mainly configured to: perform conversion between a baseband signal and a radio frequency signal, and process a radio frequency signal. The control circuit, together with the antenna, may also be referred to as a transceiver that is mainly configured to receive/send a radio frequency signal in an electromagnetic wave form. The input/output apparatus, such as a touchscreen, a display screen, or a keyboard, is mainly configured to receive data entered by a user and output data to the user.

After the terminal is powered on, the processor may read the software program in the memory, interpret and execute an instruction of the software program, and process the data of the software program. When data needs to be sent wirelessly, the processor performs baseband processing on the to-be-sent data, and then outputs the baseband signal to a radio frequency circuit. The radio frequency circuit performs radio frequency processing on the baseband signal, and then sends the radio frequency signal by using the antenna in an electromagnetic wave form. When data is sent to the terminal 600, the radio frequency circuit receives a radio frequency signal by using the antenna, converts the radio frequency signal into a baseband signal, and outputs the baseband signal to the processor. The processor converts the baseband signal into data, and processes the data.

A person skilled in the art may understand that, for ease of description, FIG. 6(*a*) shows only one memory and only one processor. Actually, the terminal may have a plurality of processors and a plurality of memories. The memory may also be referred to as a storage medium, a storage device, or the like. This is not limited in this application.

In one embodiment, the processor may include a baseband processor and a central processing unit. The baseband processor is mainly configured to process the communication protocol and the communication data. The central processing unit is mainly configured to: control the entire terminal 600, execute the software program, and process the data of the software program. Functions of the baseband processor and the central processing unit are integrated into the processor in FIG. 6(*a*). A person skilled in the art may understand that the baseband processor and the central processing unit each may be an independent processor, and are interconnected by using a technology such as a bus. A person skilled in the art may understand that the terminal may include a plurality of baseband processors to adapt to different network standards, and the terminal 600 may include a plurality of central processing units to enhance a processing capability of the terminal 600. The components of the terminal 600 may be connected by using various buses. The baseband processor may also be expressed as a baseband processing circuit or a baseband processing chip. The central processing unit may also be expressed as a central processing circuit or a central processing chip. A function of processing the communication protocol and the communication data may be embedded into the processor, or may be stored in the storage unit in a form of a software program, so that the processor executes the software program to implement a baseband processing function.

For example, in this application, the antenna and the control circuit that have receiving and sending functions may be considered as a transceiver unit 601 of the terminal 600, and the processor having a processing function may be considered as a processing unit 602 of the terminal 600. As shown in FIG. 6(*a*), the terminal 600 includes the transceiver unit 601 and the processing unit 602. The transceiver unit may also be referred to as a transceiver, a transceiver, a transceiver apparatus, or the like. In one embodiment, a component that is in the transceiver unit 601 and is configured to implement the receiving function may be considered as a receiving unit, and a component that is in the transceiver unit 601 and is configured to implement the sending function may be considered as a sending unit, that is, the transceiver unit 601 includes the receiving unit and the sending unit. For example, the receiving unit may also be referred to as a receiver, a receiver, a receiver circuit, or the like, and the sending unit may be referred to as a transmitter, a transmitter, a transmit circuit, or the like.

In a downlink, a downlink signal (including data/or control information) sent by a base station is received by using the antenna. In an uplink, an uplink signal (including data and/or control information) is sent to the base station by using the antenna. The processor processes service data and a signaling message. These units perform processing based on a radio access technology (for example, an access technology in LTE, NR, and another evolved system) used by a radio access network. The processor is further configured to control and manage an action of the terminal, and is configured to perform processing performed by the terminal in the foregoing embodiments. The processor is further configured to support the terminal in performing the processing processes of the terminal in FIG. 2 to FIG. 4.

It may be understood that FIG. 6(*a*) shows only a simplified design of the terminal. In actual application, the terminal may include any quantity of antennas, memories, processors, and the like, and all terminals that can implement this application fall within the protection scope of this application.

In one embodiment, in this application, that the transceiver unit is referred to as a transceiver and the processing unit is referred to as a processor is used as an example. In this case, the transceiver and the processor in the terminal 600 may be configured to perform the following operations.

The transceiver is configured to receive, from a first base station, a cell identity of a first cell, at least one beam parameter of the first cell, and a resource associated with the at least one beam parameter, where the first cell belongs to a second base station.

The transceiver is further configured to send information on a resource corresponding to a target beam parameter, where the target beam parameter belongs to the at least one beam parameter.

The transceiver is further configured to receive a response to the information by using a receive beam associated with the target beam parameter.

In one embodiment, the beam parameter is an identifier of a CSI-RS.

In one embodiment, the transceiver is further configured to receive a first configuration sent by the first base station, where the first configuration includes a resource location and an identifier of at least one CSI-RS of the second base station.

The processor is configured to measure the at least one CSI-RS.

The transceiver is further configured to send identifiers of some or all CSI-RSs in the at least one CSI-RS to the first base station.

The identifiers of the some or all CSI-RSs in the at least one CSI-RS include the at least one beam parameter of the first cell.

In one embodiment, the transceiver is further configured to send quality and/or power of the some or all CSI-RSs in the at least one CSI-RS to the first base station.

In one embodiment, the at least one beam parameter of the first cell is selected based on at least one of the identifiers, the quality, and/or the power of the some or all CSI-RSs.

In one embodiment, the transceiver is further configured to receive a second configuration sent by the first base station, where the second configuration includes a measurement frequency.

The terminal measures at least one synchronization signal on the frequency, where the at least one synchronization signal belongs to at least one cell, and the at least one cell includes the first cell.

The transceiver is further configured to send, to the first base station, identities of some or all cells in the at least one cell, quality or power of the some or all cells, and an identifier of at least one SS block of each of the some or all cells.

In one embodiment, the transceiver is further configured to send, to the first base station, quality and/or power of a synchronization signal associated with the at least one SS block of each of the some or all cells.

In one embodiment, the quality or the power of the synchronization signal associated with the at least one SS block meets a first condition.

In one embodiment, an SS block associated with the at least one CSI-RS of the second base station belongs to the at least one SS block of each of the some or all cells.

In one embodiment, the beam parameter is an identifier of an SS block.

In one embodiment, the transceiver is further configured to receive a third configuration sent by the first base station, where the third configuration includes a measurement frequency.

The processor is further configured to measure at least one synchronization signal on the frequency, where the at least one synchronization signal belongs to at least one cell, and the at least one cell includes the first cell.

The transceiver is further configured to send, to the first base station, identities of some or all cells in the at least one cell, signal quality or power of the some or all cells, and an identifier of at least one SS block of each of the some or all cells.

The identifier of the at least one SS block of each of the some or all cells includes the at least one beam parameter of the first cell.

In one embodiment, the transceiver is further configured to send quality and/or power of the at least one SS block of each of the some or all cells to the first base station.

In one embodiment, the beam parameter is selected based on at least one of the identifier, the quality, and/or the power of the at least one SS block of each of the some or all cells.

In one embodiment, quality or power of a synchronization signal associated with the at least one SS block of each of the some or all cells meets a first condition.

In one embodiment, the beam parameter is an identifier of an SS block or an identifier of a CSI-RS.

In one embodiment, the transceiver is configured to receive a first configuration from the first base station, where the first configuration includes a resource location and an identifier of at least one CSI-RS of the first cell.

The processor is further configured to measure the at least one CSI-RS of the first cell and at least one synchronization signal of the first cell.

The transceiver is configured to send first quality and/or first power of the first cell and second quality and/or second power of the first cell to the first base station, where the first quality and/or the first power are/is obtained based on quality and/or power of some or all CSI-RSs in the at least one CSI-RS of the first cell, and the second quality and/or the second power are/is obtained based on quality and/or power of some or all synchronization signals in the at least one synchronization signal.

In one embodiment, the transceiver is configured to receive a second instruction from the first base station.

The processor is configured to measure at least one CSI-RS of a serving cell.

In response to the second instruction, the transceiver is configured to send third quality and/or third power of the serving cell to the first base station, where the third quality and/or the third power are/is obtained based on quality and/or power of some or all CSI-RSs in the at least one CSI-RS of the serving cell.

In one embodiment, the transceiver is configured to receive a third instruction from the first base station.

The processor is configured to measure at least one synchronization signal of the serving cell.

In response to the third instruction, the transceiver is configured to send fourth quality and/or fourth power of the serving cell to the first base station, where the fourth quality and/or the fourth power are/is obtained based on quality and/or power of some or all synchronization signals in the at least one synchronization signal of the serving cell.

In one embodiment, the resource is a random access resource, the information is a preamble sequence, and the response includes an uplink timing advance.

In one embodiment, the resource is an uplink resource, the information is uplink data, and the response is a HARQ feedback.

In one embodiment, the uplink data includes an RRC connection reconfiguration complete message.

Figure 6B:
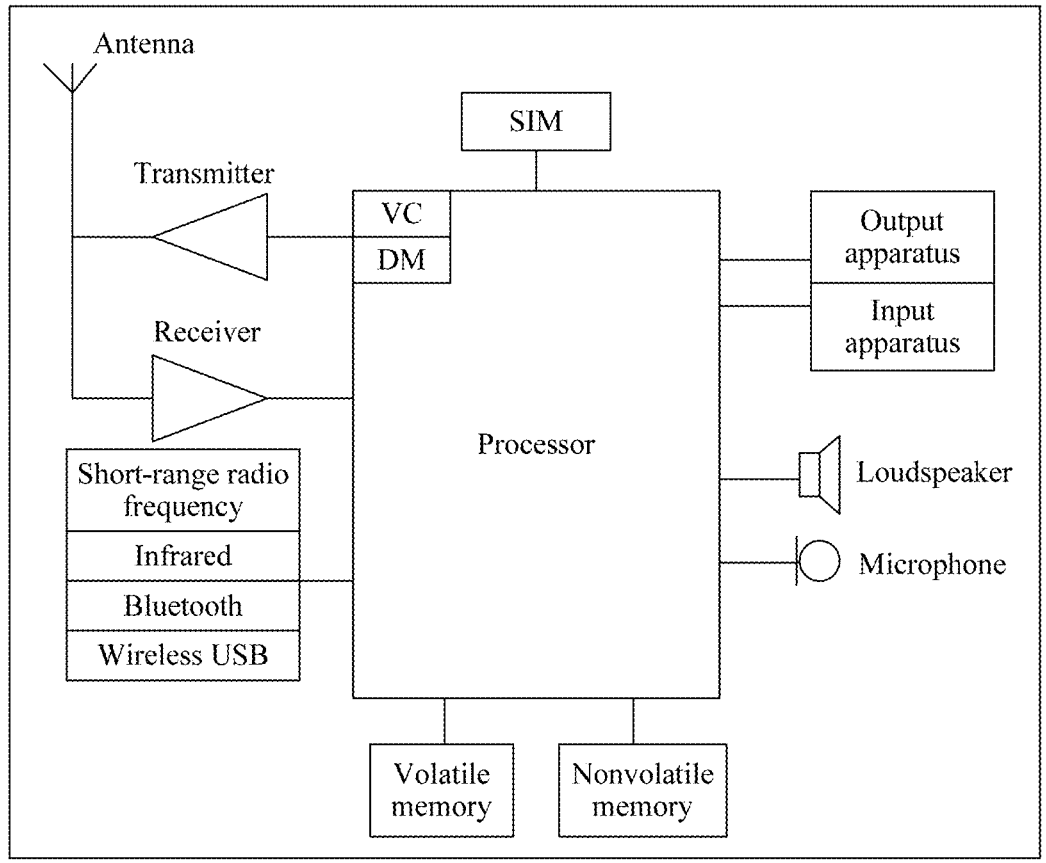
FIG. 6(b) is a schematic diagram of a terminal according to this application.

FIG. 6(b) is a schematic diagram of another terminal according to this application. A processor may include a circuit used for audio/video and logical functions of the terminal. For example, the processor may include a digital signal processor device, a microprocessor device, an analog-to-digital converter, and a digital-to-analog converter. Control and signal processing functions of the mobile device may be allocated between these devices based on respective capabilities of the devices. The processor may further include an internal voice coder VC, an internal data modem DM, and the like. In addition, the processor may include functions for operating one or more software programs, and the software programs may be stored in a memory. Usually, the processor and the stored software instruction may be configured to enable the terminal to perform an action. For example, the processor can operate a connection program.

The terminal may further include a user interface. The user interface may include, for example, a headset or loudspeaker, a microphone, an output apparatus (for example, a display), and an input apparatus. The user interface is operably coupled to the processor. In this case, the processor may include a user interface circuit, configured to control at least some functions of one or more elements (for example, the loudspeaker, the microphone, and the display) of the user interface. The processor and/or the user interface circuit in the processor may be configured to control one or more functions of the one or more elements of the user interface by using a computer program instruction (for example, software and/or firmware) stored in the memory accessible to the processor. Although not shown, the terminal may include a battery configured to supply power to various circuits related to the mobile device. The circuit is, for example, a circuit that provides mechanical vibration as detectable output. The input apparatus may include a device that allows the apparatus to receive data, for example, a keypad, a touch display, a joystick, and/or at least one another input device.

The terminal may further include one or more connection circuit modules configured to share and/or obtain data. For example, the terminal may include a short-range radio frequency RF transceiver and/or detector, to share data with and/or obtain data from an electronic device based on an RF technology. The terminal may include other short-range transceivers, such as an infrared IR transceiver, a Bluetooth transceiver, and a wireless universal serial bus USB transceiver. The Bluetooth transceiver can perform an operation based on a low-power or ultra-low-power Bluetooth technology. In this case, the terminal, and in one embodiment, the short-range transceiver can send data to and/or receive data from an electronic device near the apparatus (for example, within 10 meters). Although not shown, the terminal can send data to and/or receive data from the electronic device based on various wireless networking technologies, and these technologies include: Wi-Fi, Wi-Fi low power consumption, and a WLAN technology such as an IEEE 802.11 technology, an IEEE 802.15 technology, or an IEEE 802.16 technology.

The terminal may include a memory that can store an information element related to a mobile user, such as a subscriber identity module SIM. In addition to the SIM, the apparatus may further include another removable and/or fixed memory. The terminal may include a volatile memory and/or a nonvolatile memory. For example, the volatile memory may include a random access memory RAM, and the RAM includes a dynamic RAM and/or a static RAM, an on-chip and/or off-chip cache, and the like. The nonvolatile memory may be embedded and/or removable. The nonvolatile memory may include, for example, a read-only memory, a flash memory, a magnetic storage device such as a hard disk, a floppy disk drive, or a magnetic tape, an optical disc drive and/or a medium, and a nonvolatile random access memory NVRAM. Similar to the volatile memory, the nonvolatile memory may include a cache area used to temporarily store data. At least a part of the volatile memory and/or the nonvolatile memory may be embedded into the processor. The memory may store one or more software programs, instructions, information blocks, data, and the like. The memory may be used by the terminal to perform a function of a mobile terminal. For example, the memory may include an identifier that can uniquely identify the terminal, such as an international mobile equipment identity IMEI code.

Figure 7:
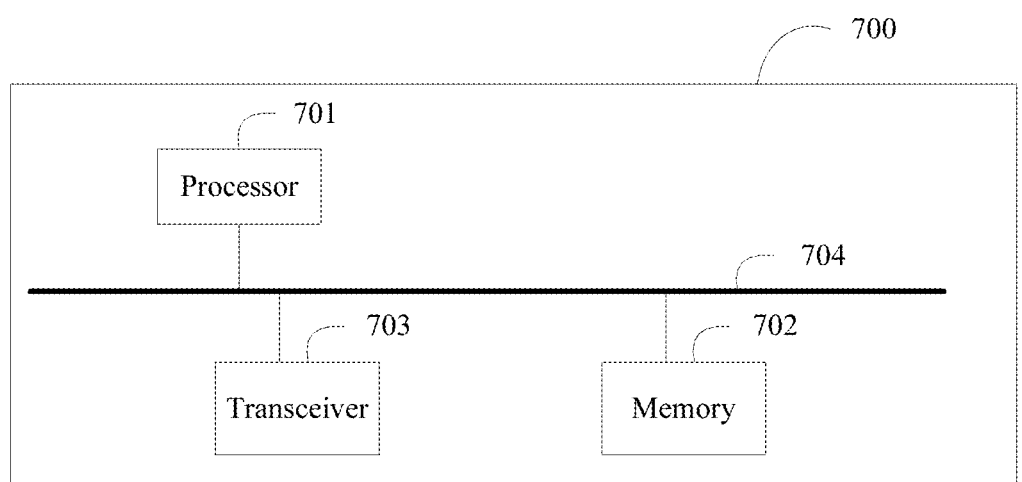
FIG. 7 is a schematic diagram of an apparatus according to this application.

Based on a same concept, an embodiment of this application further provides an apparatus 700. The apparatus 700 may be a base station or a terminal. As shown in FIG. 7, the apparatus 700 includes at least a processor 701 and a memory 702, may further include a transceiver 703, and may further include a bus 704.

The processor 701, the memory 702, and the transceiver 703 are all connected by using the bus 704.

The memory 702 is configured to store a computer executable instruction.

The processor 701 is configured to execute the computer executable instruction stored in the memory 702.

When the apparatus 700 is a base station, the processor 701 executes the computer executable instruction stored in the memory 702, so that the apparatus 700 performs the steps performed by the base station in any one of the foregoing embodiments provided in the embodiments of this application, or the base station deploys function units corresponding to the steps.

When the apparatus 700 is a terminal, the processor 701 executes the computer executable instruction stored in the memory 702, so that the apparatus 700 performs the steps performed by the terminal in any one of the foregoing embodiments provided in the embodiments of this application, or the terminal deploys function units corresponding to the steps.

The processor 701 may include different types of processors 701 or a same type of processor 701. The processor 701 may be any one of the following: a central processing unit (CPU for short), an ARM processor (where an English full name of AMR is Advanced RISC Machines, and an English full name of RISC is Reduced Instruction Set Computing), a field programmable gate array (FPGA for short), a dedicated processor, and another device having a computing processing capability. In one embodiment, the processor 701 may be integrated as a many-core processor.

The memory 702 may be any one or any combination of the following: a random access memory (RAM), a read-only memory (ROM), a nonvolatile memory (NVM), a solid state drive (SSD), a mechanical hard disk, a magnetic disk, a disk array, or another storage medium.

The transceiver 703 is used by the apparatus 700 to exchange data with another device. For example, if the apparatus 700 is a base station, the base station may perform the method perform by the base station in any one of the foregoing embodiments. The base station exchanges data with a terminal by using the transceiver 703. If the apparatus 700 is a terminal, the terminal may perform the method performed by the terminal in any one of the foregoing embodiments. The terminal exchanges data with a base station by using the transceiver 703. The transceiver 703 may be any one or any combination of the following: a network interface (for example, an Ethernet interface), a wireless network interface card, or another device that has a network access function.

The bus 704 may include an address bus, a data bus, a control bus, and the like. For ease of representation, the bus is represented by using a thick line in FIG. 7. The bus 704 may be any one or any combination of the following: an industry standard architecture (ISA) bus, a peripheral component interconnect (PCI) bus, an extended industry standard architecture (EISA) bus, or another component used for wired data transmission.

An embodiment of this application provides a computer readable storage medium. The computer readable storage medium stores a computer executable instruction. A processor of a terminal executes the computer executable instruction, so that the terminal performs the steps performed by the terminal in the communication method provided in this application, or the terminal deploys function units corresponding to the steps.

An embodiment of this application provides a computer readable storage medium. The computer readable storage medium stores a computer executable instruction. A processor of a base station executes the computer executable instruction, so that the base station performs the steps performed by the base station in the communication method provided in this application, or the base station deploys function units corresponding to the steps.

An embodiment of this application provides a computer program product. The computer program product includes a computer executable instruction, and the computer executable instruction is stored in a computer readable storage medium. A processor of a terminal may read the computer executable instruction from the computer readable storage medium. The processor executes the computer executable instruction, so that the terminal performs the steps performed by the terminal in the foregoing method provided in the embodiments of this application, or the terminal deploys function units corresponding to the steps.

An embodiment of this application provides a computer program product. The computer program product includes a computer executable instruction, and the computer executable instruction is stored in a computer readable storage medium. A processor of a base station may read the computer executable instruction from the computer readable storage medium. The processor executes the computer executable instruction, so that the base station performs the steps performed by the base station in the foregoing method provided in the embodiments of this application, or the base station deploys function units corresponding to the steps.

This application further provides a chip system. The chip system includes a processor that is configured to support a terminal in implementing functions in the foregoing aspects, for example, generating, receiving, or processing data and/or information in the foregoing methods. In one embodiment, the chip system further includes a memory. The memory may be configured to store a program instruction and data that are for the terminal. The chip system may include a chip, or may include a chip and another discrete device.

This application further provides a chip system. The chip system includes a processor that is configured to support a base station in implementing functions in the foregoing aspects, for example, generating, receiving, or processing data and/or information in the foregoing methods. In one embodiment, the chip system further includes a memory. The memory is configured to store a program instruction and data that are for the data receiving device. The chip system may include a chip, or may include a chip and another discrete device.

Figure 8:
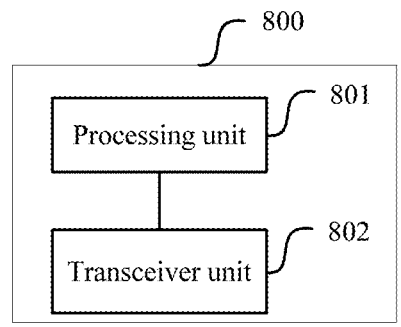
FIG. 8 is a schematic diagram of a terminal according to this application.

Based on a same concept, this application further provides a terminal 800. As shown in FIG. 8, the terminal 800 includes a processing unit 801 and a transceiver unit 802, and may be configured to perform the method performed by the terminal in any one of the foregoing embodiments. In one embodiment, the processing unit 801 and the transceiver unit 802 are configured to perform the following operations.

The transceiver unit 802 is configured to receive, from a first base station, a cell identity of a first cell, at least one beam parameter of the first cell, and a resource associated with the at least one beam parameter, where the first cell belongs to a second base station.

The transceiver unit 802 is further configured to send information on a resource corresponding to a target beam parameter, where the target beam parameter belongs to the at least one beam parameter.

The transceiver unit 802 is further configured to receive a response to the information by using a receive beam associated with the target beam parameter.

In one embodiment, the beam parameter is an identifier of a CSI-RS.

In one embodiment, the transceiver unit 802 is further configured to receive a first configuration sent by the first base station, where the first configuration includes a resource location and an identifier of at least one CSI-RS of the second base station.

The processing unit 801 is configured to measure the at least one CSI-RS.

The transceiver unit 802 is further configured to send identifiers of some or all CSI-RSs in the at least one CSI-RS to the first base station.

The identifiers of the some or all CSI-RSs in the at least one CSI-RS include the at least one beam parameter of the first cell.

In one embodiment, the transceiver unit 802 is further configured to send quality and/or power of the some or all CSI-RSs in the at least one CSI-RS to the first base station.

In one embodiment, the at least one beam parameter of the first cell is selected based on at least one of the identifiers, the quality, and/or the power of the some or all CSI-RSs.

In one embodiment, the transceiver unit 802 is further configured to receive a second configuration sent by the first base station, where the second configuration includes a measurement frequency.

The terminal measures at least one synchronization signal on the frequency, where the at least one synchronization signal belongs to at least one cell, and the at least one cell includes the first cell.

The transceiver unit 802 is further configured to send, to the first base station, identities of some or all cells in the at least one cell, quality or power of the some or all cells, and an identifier of at least one SS block of each of the some or all cells.

In one embodiment, the transceiver unit 802 is further configured to send, to the first base station, quality and/or power of a synchronization signal associated with the at least one SS block of each of the some or all cells.

In one embodiment, the quality or the power of the synchronization signal associated with the at least one SS block meets a first condition.

In one embodiment, an SS block associated with the at least one CSI-RS of the second base station belongs to the at least one SS block of each of the some or all cells.

In one embodiment, the beam parameter is an identifier of an SS block.

In one embodiment, the transceiver unit 802 is further configured to receive a third configuration sent by the first base station, where the third configuration includes a measurement frequency.

The processing unit 801 is further configured to measure at least one synchronization signal on the frequency, where the at least one synchronization signal belongs to at least one cell, and the at least one cell includes the first cell.

The transceiver unit 802 is further configured to send, to the first base station, identities of some or all cells in the at least one cell, signal quality or power of the some or all cells, and an identifier of at least one SS block of each of the some or all cells.

The identifier of the at least one SS block of each of the some or all cells includes the at least one beam parameter of the first cell.

In one embodiment, the transceiver unit 802 is further configured to send quality and/or power of the at least one SS block of each of the some or all cells to the first base station.

In one embodiment, the beam parameter is selected based on at least one of the identifier, the quality, and/or the power of the at least one SS block of each of the some or all cells.

In one embodiment, quality or power of a synchronization signal associated with the at least one SS block of each of the some or all cells meets a first condition.

In one embodiment, the beam parameter is an identifier of an SS block or an identifier of a CSI-RS.

In one embodiment, the transceiver unit 802 is configured to receive a first configuration from the first base station, where the first configuration includes a resource location and an identifier of at least one CSI-RS of the first cell.

The processing unit 801 is further configured to measure the at least one CSI-RS of the first cell and at least one synchronization signal of the first cell.

The transceiver unit 802 is configured to send first quality and/or first power of the first cell and second quality and/or second power of the first cell to the first base station, where the first quality and/or the first power are/is obtained based on quality and/or power of some or all CSI-RSs in the at least one CSI-RS of the first cell, and the second quality and/or the second power are/is obtained based on quality and/or power of some or all synchronization signals in the at least one synchronization signal.

In one embodiment, the transceiver unit 802 is configured to receive a second instruction from the first base station.

The processing unit 801 is configured to measure at least one CSI-RS of a serving cell.

In response to the second instruction, the transceiver unit 802 is configured to send third quality and/or third power of the serving cell to the first base station, where the third quality and/or the third power are/is obtained based on quality and/or power of some or all CSI-RSs in the at least one CSI-RS of the serving cell.

In one embodiment, the transceiver unit 802 is configured to receive a third instruction from the first base station.

The processing unit 801 is configured to measure at least one synchronization signal of the serving cell.

In response to the third instruction, the transceiver unit 802 is configured to send fourth quality and/or fourth power of the serving cell to the first base station, where the fourth quality and/or the fourth power are/is obtained based on quality and/or power of some or all synchronization signals in the at least one synchronization signal of the serving cell.

In one embodiment, the resource is a random access resource, the information is a preamble sequence, and the response includes an uplink timing advance.

In one embodiment, the resource is an uplink resource, the information is uplink data, and the response is a HARQ feedback.

In one embodiment, the uplink data includes an RRC connection reconfiguration complete message.

Figure 9:
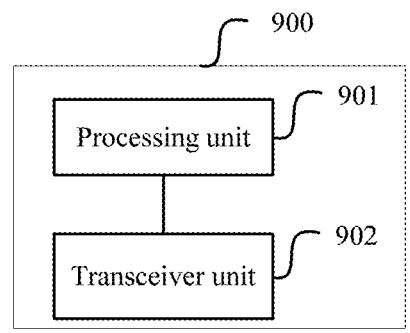
FIG. 9 is a schematic diagram of a base station according to this application.

Based on a same concept, this application further provides a base station 900. As shown in FIG. 9, the base station 900 includes a processing unit 901 and a transceiver unit 902, and may be configured to perform the method performed by the base station in any one of the foregoing embodiments. In one embodiment, the processing unit 901 and the transceiver unit 902 are configured to perform the following operations.

The transceiver unit 902 is configured to receive identifiers of some or all CSI-RSs in the at least one CSI-RS from a terminal.

The transceiver unit 902 is further configured to send the identifiers of the some or all CSI-RSs in the at least one CSI-RS to the second base station.

The transceiver unit 902 is further configured to receive, from the second base station, a cell identity of a first cell, at least one beam parameter of the first cell, and a resource associated with the at least one beam parameter, where the first cell belongs to the second base station.

The transceiver unit 902 is further configured to send, to the terminal, the cell identity of the first cell, the at least one beam parameter of the first cell, and the resource associated with the at least one beam parameter, where the at least one beam parameter of the first cell belongs to the identifiers of the some or all CSI-RSs in the at least one CSI-RS, and the beam parameter is an identifier of a CSI-RS.

In one embodiment, the transceiver unit 902 is further configured to receive a resource location and an identifier of the at least one CSI-RS of the second base station.

The transceiver unit 902 is further configured to send a first configuration to the terminal, where the first configuration includes the resource location and the identifier of the at least one CSI-RS of the second base station.

In one embodiment, the transceiver unit 902 is further configured to send a measurement frequency to the terminal.

The transceiver unit 902 is further configured to receive, from the terminal, identities of some or all cells in at least one cell associated with the measurement frequency, quality or power of the some or all cells, and an identifier of at least one SS block of each of the some or all cells.

The transceiver unit 902 is further configured to send, to the second base station, an identity of a cell that is associated with the second base station and that is in the some or all cells, and an identifier of at least one SS block of the cell associated with the second base station.

Some or all SS blocks in the at least one SS block are associated with the at least one CSI-RS of the second base station.

In another example, the transceiver unit 902 is configured to receive, from a terminal, identities of some or all cells in at least one cell and identifiers of SS blocks associated with the identities of the some or all cells.

The transceiver unit 902 is further configured to send, to the second base station, an identity of a cell that is associated with the second base station and that is in the some or all cells, and an identifier of at least one SS block of the cell associated with the second base station.

The transceiver unit 902 is further configured to receive, from the second base station, a cell identity of a first cell, at least one beam parameter of the first cell, and a resource associated with the at least one beam parameter, where the first cell belongs to the second base station.

The transceiver unit 902 is further configured to send, to the terminal, the cell identity of the first cell, the at least one beam parameter of the first cell, and the resource associated with the at least one beam parameter, where the at least one beam parameter of the first cell belongs to the identifier of the at least one SS block, and the beam parameter is an identifier of an SS block.

In one embodiment, the transceiver unit 902 is further configured to send a measurement frequency to the terminal, where the measurement frequency is associated with the at least one cell.

In another example, the transceiver unit 902 is configured to receive, from a second base station, an identity of at least one cell and an identifier and a resource location of a CSI-RS associated with the at least one cell.

The transceiver unit 902 is further configured to send, to a terminal, the identity of the at least one cell and the identifier and the resource location of the CSI-RS associated with the at least one cell.

The transceiver unit 902 is further configured to receive, from the terminal, identities of some or all cells in the at least one cell, identifiers of SS blocks associated with the some or all cells, and/or identifiers of CSI-RSs associated with the some or all cells.

In one embodiment, the transceiver unit 902 is further configured to send, to the second base station, the identities of the some or all cells in the at least one cell, the identifiers of the SS blocks associated with the some or all cells, and/or the identifiers of the CSI-RSs associated with the some or all cells.

The transceiver unit 902 is further configured to receive, from the second base station, an identity of a first cell and at least one beam parameter associated with the first cell, where the at least one beam parameter belongs to the identifiers of the associated SS blocks and/or the identifiers of the associated CSI-RSs, and the first cell belongs to the at least one cell.

The transceiver unit 902 is further configured to send, to the terminal, the identity of the first cell and the at least one beam parameter associated with the first cell, where the at least one beam parameter belongs to the identifiers of the associated SS blocks and/or the identifiers of the associated CSI-RSs.

In another example, the transceiver unit 902 is further configured to send a second instruction to a terminal.

The transceiver unit 902 is further configured to receive third quality and/or third power of a serving cell that are/is sent by the terminal in response to the second instruction, where the third quality and/or the third power are/is obtained based on quality and/or power of some or all CSI-RSs in at least one CSI-RS of the serving cell.

In another example, the transceiver unit 902 is configured to send a third instruction to a terminal.

The transceiver unit 902 is further configured to receive fourth quality and/or fourth power of the serving cell that are/is sent by the terminal in response to the third instruction, where the fourth quality and/or the fourth power are/is obtained based on quality and/or power of some or all synchronization signals in at least one synchronization signal of the serving cell.

Figure 10:
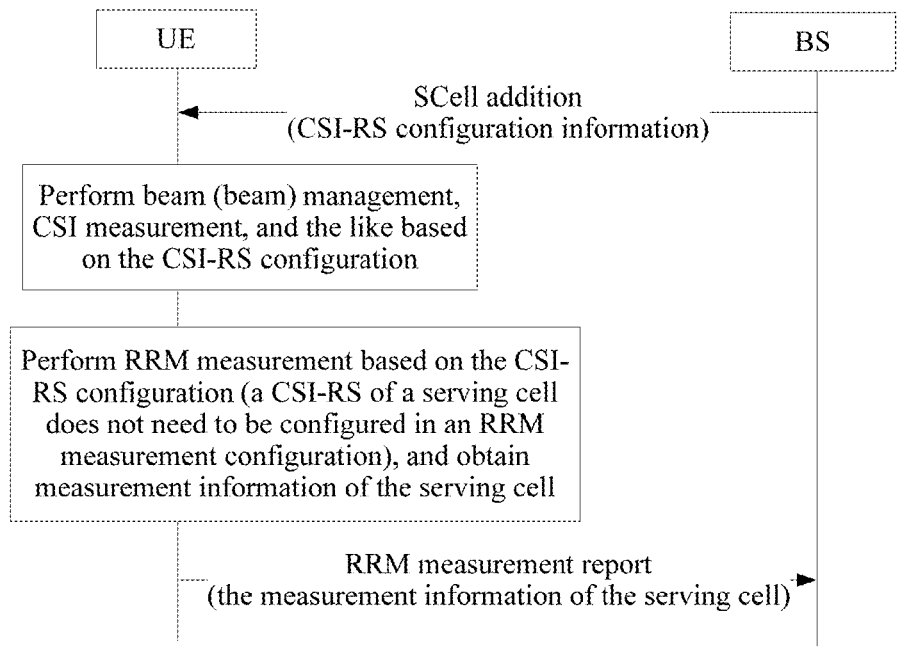
FIG. 10 shows a group (group)-based beam management method.

This application further provides a group-based beam management method. Referring to FIG. 10, the method includes the following content.

In a serving cell, a network may need to perform beam management, CSI obtaining, and the like based on a CSI-RS. CSI-RS resources used for these operations may need to be more intensive than CSI-RS resources used for RRM measurement.

Therefore, a possible method is as follows: When UE performs access or a serving cell is added, a CSI-RS resource used in the serving cell is configured for the UE. The CSI-RS resource is used for beam management and CSI obtaining, and is also used for RRM measurement and the like.

An RRM measurement configuration does not need to carry a CSI-RS configuration of the serving cell. The UE performs RRM measurement by using a CSI-RS resource configured during cell addition or initial access.

For beam management, a base station configures L1/L2 measurement by using an RRC message, and the UE (periodically) reports a measurement result by using L1 or L2 signaling. To reduce signaling overheads, an RRC message may be used to group SS blocks or CSI-RS that need to be measured. Each group has a group number. The UE reports a measurement value based on the group number for beam management. Each group number corresponds to a measurement value. The measurement value may be generated by combining a plurality of SS blocks corresponding to this group number, for example, may be a sum or an average value of measurement values of the SS blocks corresponding to the group number. Beam management is performed on a group basis, for example, a group is added or a group is deleted instead of adding or deleting an SS block. When a group is added, the UE needs to add each SS block in the group as a serving SS block. Similarly, when a group is deleted, the UE deletes each SS block in the group. The beam grouping method may also be used for RRM measurement.

The foregoing group-based beam management method may be applied to the foregoing measurement process. For example, a configuration sent by the first base station to the terminal includes a group identifier, where the group identifier is used for beam parameter grouping, and the terminal may obtain quality and/or power information of the group based on the group identifier.

Figure 11:
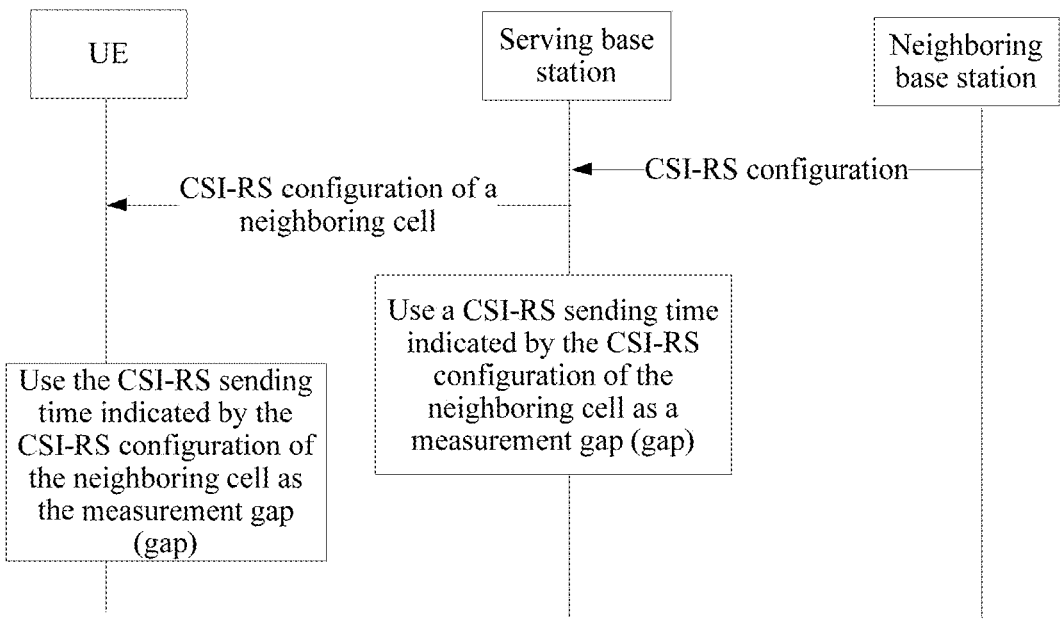
FIG. 11 shows a method for measuring a gap.

This application further provides a method for measuring a gap. Referring to FIG. 11, the method includes the following content.

Due to a limitation of a capability of UE, the UE may not be capable of receiving data of a serving cell and performing neighboring cell measurement at the same time. Based on the capability of the UE, a base station may need to configure a measurement gap for the UE. For example, in an LTE system, it may be configured that a gap of 6 ms exists every 40 ms or 80 ms. During the measurement gap, the UE measures a neighboring cell instead of receiving/sending data in a current serving cell.

For NR, in a high frequency scenario, a reference signal is not sent in a sweeping manner instead of an omnidirectional manner. Therefore, the following case may occur: The UE measures a neighboring cell during the measurement gap, but the neighboring cell does not send a reference signal in a direction of the UE. Therefore, an original measurement gap mechanism may not work well.

A method is as follows: Locations (time locations) occupied by CSI-RS resources of the neighboring cell that are configured for the UE are all used as measurement gaps. The serving cell does not schedule the UE at these locations, and the UE measures the neighboring cell. In one embodiment, no measurement gap is separately configured. This method is simple, but may cause relatively scattered measurement gaps and relatively low efficiency.

The method is also applicable to measuring an NR-SS of the neighboring cell, that is, scheduling information of the NR-SS of the neighboring cell is sent to the UE, and time locations of these configurations serve as measurement gaps. In one embodiment, the NR-SS is sent frequently, and the UE does not need to perform measurement each time. Therefore, the scheduling information that is of the NR-SS of the neighboring cell and that is sent to the UE may be a subset of real scheduling information of the neighboring cell, or frequency that is indicated by the base station and at which measurement needs to be performed, for example, only one of N times of measurement is required.

Another method is as follows: When a CSI-RS configuration is requested from a neighboring base station, a measurement gap configuration of current UE is carried. The measurement gap configuration may be one or more configurations. The neighboring base station generates CSI-RS resource configurations of the UE based on these measurement gap configurations, that is, these CSI-RS resources are located in a measurement gap of the current UE. In one embodiment, if the neighboring base station cannot generate the CSI-RS resources based on these measurement gap configurations, the neighboring base station rejects the request, or the neighboring base station generates a CSI-RS resource and a gap configuration required by the resource, and sends the CSI-RS resource and the gap configuration to a current serving base station. The current serving base station sends the CSI-RS resource and the new gap configuration to the UE. For example, the current serving base station adds, into a measurement object, a measurement gap configuration required by a frequency corresponding to the measurement object or a measurement gap configuration required by a cell corresponding to the corresponding frequency.

The foregoing method for measuring a gap may be applied to the foregoing measurement process, and the measurement gap is used to indicate a measurement occasion of the terminal.

This application further provides a beam management method, a terminal device, and a network device. The following describes the beam management method, the terminal device, and the network device with reference to FIG. 12 to FIG. 21.

The following clearly and completely describes the technical solutions in the embodiments of this application with reference to the accompanying drawings in the embodiments of this application.

Network architectures and service scenarios that are described in the embodiments of this application are intended to describe the technical solutions in the embodiments of this application more clearly, and do not constitute a limitation on the technical solutions provided in the embodiments of this application. A person of ordinary skill in the art may know that, as the network architectures evolve and a new service scenario emerges, the technical solutions provided in the embodiments of this application are also applicable to a similar technical problem.

This application may be applied to an existing cellular communications system, for example, a system such as a global system for mobile communications (GSM), wideband code division multiple access (WCDMA), or long term evolution (LTE); is applicable to a fifth-generation mobile communications system (5G), for example, a communications system such as an access network using new radio (NR) or a cloud radio access network (CRAN); may also be extended to a similar wireless communications system, such as wireless fidelity (wifi), worldwide interoperability for microwave access (WiMAX), and another cellular system related to the 3rd Generation Partnership Project (3GPP); is also applicable to another wireless communications system using an orthogonal frequency division multiplexing (OFDM) access technology; and is further applicable to a future wireless communications system.

One embodiment is applicable to a multi-beam operation system, and is also applicable to a single-beam operation system. In the single-beam system, different beam parameters correspond to sending parameters related to different synchronization signals, CSI-RSs, or other reference signals, and the sending parameter usually includes a sending period, a time offset, a sequence or a pattern corresponding to a signal.

Network architectures and service scenarios that are described in this application are intended to describe the technical solutions in this application more clearly, and do not constitute a limitation on the technical solutions provided in this application. A person of ordinary skill in the art may know that, as the network architectures evolve and a new service scenario emerges, the technical solutions provided in this application are also applicable to a similar technical problem.

Figure 12:
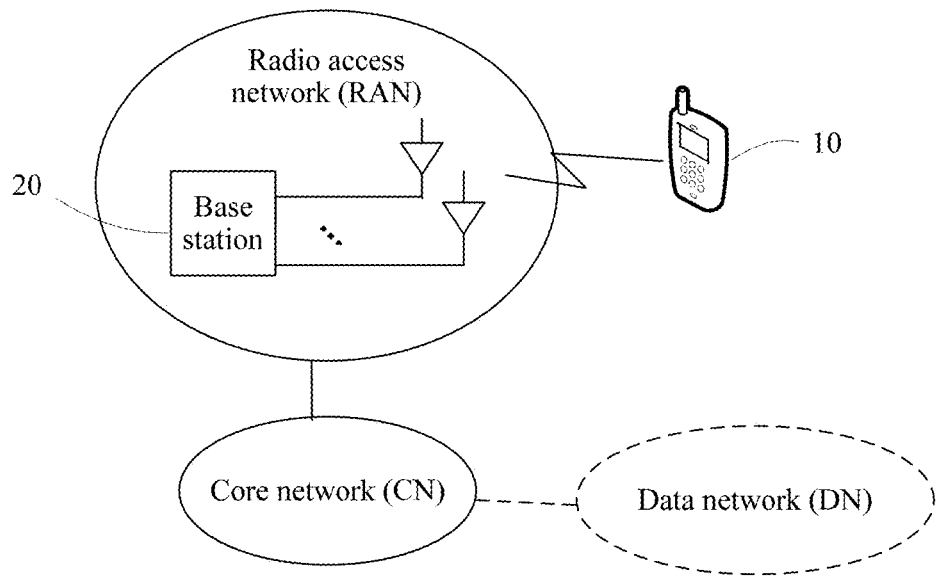
FIG. 12 is a schematic diagram of an application scenario according to this application.

FIG. 12 is a schematic diagram of a possible application scenario according to this application. The application scenario includes at least one terminal device 10 that communicates with a radio access network (RAN) through a radio interface. The RAN includes at least one network device 20, and an example of the network device is a base station. For clarity, only one base station and only one terminal device are shown in the figure. The terminal device 10 may further communicate with another terminal device 10, for example, communication in a device-to-device (D2D) or machine-to-machine (M2M) scenario. The network device 20 may communicate with the terminal device 10, or may communicate with another network device 20, for example, communication between a macro base station and an access point. The RAN is connected to a core network (CN). In one embodiment, the CN may be coupled to one or more data networks (DN) such as the Internet and a public switched telephone network (PSTN).

In this application, nouns "network" and "system" are usually interchangeably used, but meanings of the nouns may be understood by a person skilled in the art.

For ease of understanding, some nouns in this application are described below.

(1) A terminal device (Terminal Equipment) is also referred to as user equipment (UE), or is referred to as a terminal, and is a device that provides voice and/or data connectivity for a user, for example, a handheld device having a wireless connection function or a wireless communication function, a vehicle-mounted device, a wearable device, a computing device, a control device, or another processing device connected to a wireless modem, and mobile stations (MS) in various forms, and the like. Common terminal devices include a mobile phone (phone), a tablet computer (pad), a notebook computer (notebook), a palmtop computer, a mobile internet device (MID), and a wearable device such as a smartwatch, a smart band, or a pedometer. For ease of description, in this application, the devices mentioned above are collectively referred to as terminal devices.

(2) A network device may be, for example, a base station. The base station is also referred to as a RAN device, is a device that connects the terminal device to a wireless network, and includes but is not limited to an evolved NodeB (eNB), a radio network controller (RNC), a NodeB (NB), a base station controller (BSC), a base transceiver station (BTS), a home eNodeB (for example, a home evolved NodeB or HNB), a baseband Unit (BBU), a gNodeB (gNB), a transmission and reception point (TRP), a transmission point (TP), a mobile switching center, and the like. In addition, the base station may further include a Wi-Fi access point (AP) and the like. An apparatus that directly communicates with the terminal device through a radio channel is usually a base station. The base station may include a macro base station, a micro base station, a relay node, an access point, a remote radio unit (RRU), or the like in various forms. Certainly, another network device that has a wireless communication function may perform wireless communication with the terminal device. This is not limited in this application. In different systems, a device having a base station function may have different names. For example, in an LTE network, the device is referred to as an evolved NodeB (eNB or eNodeB). In a 3G network, the device is referred to as a NodeB.

The following explains some common concepts or definitions in the embodiments of this application. It should be noted that some English abbreviations in an LTE system are used as examples in this specification to describe the embodiments of this application, and may vary with network evolution. For evolution, refer to descriptions in a corresponding standard.

In this application, a beam may be understood as a spatial resource, and may be a transmit or receive precoding vector having energy transmission directivity. In addition, the transmit or receive precoding vector can be identified by using index information. The energy transmission directivity may mean that the precoding vector is used to perform precoding processing on a signal that needs to be sent, so that the signal obtained after precoding processing is performed has spatial directivity, and that a received signal obtained after precoding processing is performed by using the precoding vector has relatively good received power, for example, meets a received demodulation signal-to-noise ratio. The energy transmission directivity may also mean that same signals sent from different spatial locations and received by using the precoding vector have different received power. In one embodiment, a same communications device (such as a terminal device or a network device) may have different precoding vectors, and different communications devices may also have different precoding vectors, that is, correspond to different beams. The beam may have a plurality of names, for example, the beam may be referred to as a spatial resource, a spatial weight, a spatial direction, or a spatial orientation. With development of a technology, the beam may have different names in different scenarios in different time periods. This is not limited in this application.

For a configuration or a capability of a communications device, one communications device may use one or more of a plurality of different precoding vectors at a same moment, that is, may form one or more beams at the same time. Beam information may be identified by using index information. In one embodiment, the index information may correspond to a configured resource identifier (ID) of the terminal device. For example, the index information may correspond to an ID, an index, or a resource of a configured channel state information-reference signal (CSI-RS), or may correspond to an ID or a resource of a configured uplink sounding reference signal (SRS). Alternatively, in one embodiment, the index information may be index information explicitly or implicitly carried by using a signal or a channel carried on a beam. For example, the index information may include but is not limited to index information that is of a beam and that is indicated by a synchronization signal or a broadcast channel sent by using the beam. A high-frequency cell, for example, may be understood as a cell that operates on a frequency band greater than or equal to 6 GHz. When data is transmitted by using a high frequency, there is generally a relatively large transmission path loss. To ensure effective transmission of a service, a beamforming technology is introduced into the high frequency cell. The technology is used to concentrate energy of a signal in a required direction or beam, to form a beam aiming at the terminal device and aim transmission energy at the terminal device, thereby improving a demodulation signal-to-noise ratio of the terminal device and improving user experience on a cell edge. A beam pair may be used for high-frequency data transmission. A sending party aims at a direction or a beam to send data, and a receiving party also needs to aim at a corresponding direction or a beam to receive data. The terminal device and the network device may be in a same time unit, and data may be transmitted by using a Tx beam in at least one beam pair. The beam pair includes a transmit beam (Tx beam) and a receive beam (Rx beam). For example, the network device (for example, a gNB) may use the Tx beam, and the terminal device (for example, UE) may use the Rx beam; or the terminal device (for example, UE) uses the Tx beam, and the network device (for example, a gNB) uses the Rx beam.

In NR, to improve transmission robustness, connections of a plurality of downlink and/or uplink serving beam pairs of one cell may be maintained between UE and at least one TRP. The serving beam pair is a beam pair that provides a radio resource for UE in a connected mode or an active state. The UE in the connected mode is UE that maintains an RRC connection between the UE and an access network device and a connection between the access network device and a core network device. The UE in the active state is UE that maintains a connection between an access network device and a core network device and has no RRC connection between the UE and the access network device. UE in an idle mode is UE that has no connection between an access network device and a core network device and has no RRC connection between the UE and the access network device. The at least one TRP may be located at different geographical locations, to expand cell coverage. Therefore, in some scenarios, channel conditions in which downlink serving beam pairs between different TRPs and UEs are connected may be independent of each other. In this case, when the UE moves to a new location, channel quality such as path losses of some serving beam pairs may decrease due to some temporary blockages such as a tree blockage, and consequently, beam failure (beam failure) occurs. However, channel quality of some other serving beams is still good. A serving beam or a serving beam pair is a beam or a beam pair that may provide a radio resource for the UE in the connected mode or the UE in the active state, and the serving beam includes an uplink serving beam and/or a downlink serving beam.

For a downlink beam, the terminal device and the network device maintain a same downlink serving beam set. The downlink serving beam set is used to indicate an available downlink serving beam between the terminal device and the network device. The downlink serving beam is a beam that can be used by the network device to provide a service for the terminal device in a downlink direction. For example, the network device may send downlink control signaling and the like to the terminal device on the downlink serving beam.

Due to movement of the terminal device and the like, some beams in the downlink serving beam set fail, so that the terminal device can measure, in a timely manner, a beam on which beam failure occurs, and report the beam to the network device. Based on a measurement result reported by the terminal device, the network device configures a beam for the terminal device again, to ensure communication quality between the network device and the terminal device.

With reference to the accompanying drawings, the following describes in more detail the solutions provided in the embodiments of this application.

Figure 13:
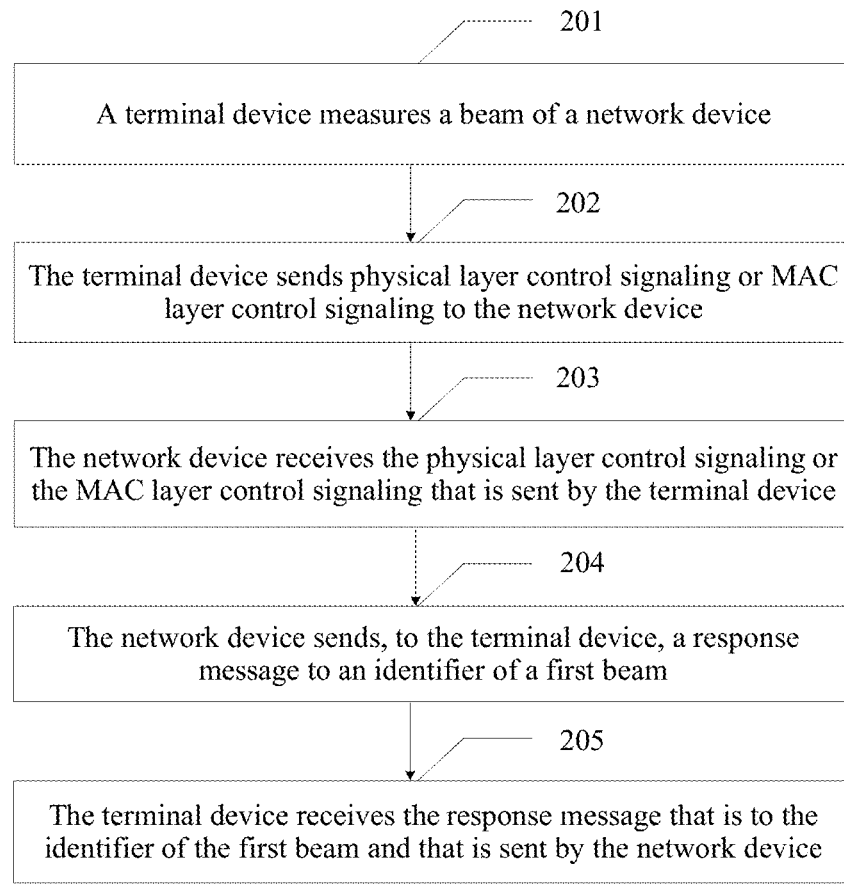
FIG. 13 is a flowchart of a beam management method according to this application.

FIG. 13 is a flowchart of a beam management method according to this application. The method includes the following steps.

Operation 201: A terminal device measures a beam of a network device.

In one embodiment, the terminal device may periodically measure the beam or measure the beam based on an instruction of the network device. In one embodiment, the terminal device may obtain, through measurement, a beam on which beam failure occurs. The beam on which beam failure occurs may be a beam on which reference signal received strength RSRP or reference signal received quality RSRQ is lower than a first threshold, or a beam on which reference signal received strength RSRP or reference signal received quality RSRQ is always lower than a first threshold within a preset time period. Alternatively, the beam on which beam failure occurs may be understood as a beam on which reference signal received strength or reference signal received quality is relatively poor. In one embodiment, the terminal device may further obtain, through measurement, a beam that meets a first condition. The beam that meets the first condition may be a beam on which reference signal received strength or reference signal received quality is higher than a second threshold. Alternatively, the beam that meets the first condition may be understood as N beams on which reference signal received strength or reference signal received quality is relatively good. N is greater than or equal to 1. The first condition may also be referred to as a quality condition or a quality requirement.

Operation 202: The terminal device sends physical layer control signaling or MAC layer control signaling to the network device.

For content included in the physical layer control signaling or the MAC layer control signaling, the following optional solutions may exist:

In one embodiment, the terminal device sends physical layer control signaling to the network device, where the physical layer control signaling includes an identifier of a first beam, and the first beam is a beam on which beam failure occurs.

In one embodiment, the terminal device sends physical layer control signaling to the network device, where the physical layer control signaling includes an identifier of a first beam, and the first beam is a beam that meets the first condition.

In one embodiment, the terminal device sends physical layer control signaling to the network device, where the physical layer control signaling includes an identifier of a first beam, and the first beam is a beam on which beam failure occurs and a beam that meets the first condition.

In one embodiment, the terminal device sends MAC layer control signaling to the network device, where the MAC layer control signaling includes an identifier of a first beam, and the first beam is a beam on which beam failure occurs.

In one embodiment, the terminal device sends MAC layer control signaling to the network device, where the MAC layer control signaling includes an identifier of a first beam, and the first beam is a beam that meets the first condition.

In one embodiment, the terminal device sends MAC layer control signaling to the network device, where the MAC layer control signaling includes an identifier of a first beam, and the first beam is a beam on which beam failure occurs and a beam that meets the first condition.

In one embodiment, when determining that an uplink resource exists, the terminal device generates physical layer control signaling or MAC layer control signaling based on the uplink resource, where the physical layer control signaling or the MAC layer control signaling includes the identifier of the first beam, and sends the identifier of the first beam to the network device.

In one embodiment, the first beam is at least one beam.

In one embodiment, that the physical layer control signaling or the MAC layer control signaling includes the identifier of the first beam may further mean that the physical layer control signaling or the MAC layer control signaling includes a beam report or a beam recovery report, where the beam report or the beam recovery report includes the identifier of the first beam, or may mean that the identifier of the first beam is reported in a form of a measurement report.

In one embodiment, the uplink resource may include some or all of the following content: a transport block size, a physical time-frequency resource block (for example, a quantity) information indicating new transmission or retransmission, a modulation and coding scheme, or a hybrid automatic repeat request (HARQ) process ID, and a redundancy version. The uplink resource may be a dynamically scheduled uplink resource, or may be a semi-statically scheduled uplink resource, or may be a contention-based uplink resource (an uplink resource shared by a plurality of terminals, such as a grant free resource).

In one embodiment, the uplink resource may be used to indicate an uplink transmission resource of a primary cell or a secondary cell. The primary cell (PCell) is a cell that operates on a primary frequency, in which the terminal device may perform an initial connection establishment process or initiate a connection re-establishment process, or that is indicated as a primary cell in a handover process. The secondary cell (SCell) is a cell that operates on a secondary frequency and provides an additional radio resource for UE in a connected mode.

Operation 203: The network device receives the physical layer control signaling or the MAC layer control signaling that is sent by the terminal device.

The network device may obtain the identifier of the first beam by parsing the physical layer control signaling or the MAC layer control signaling, to learn of at least one downlink serving beam on which beam failure occurs and/or a beam that meets the first condition.

The network device may delete, from a downlink serving beam set of the network device based on the identifier of the first beam, the at least one downlink serving beam on which beam failure occurs. In one embodiment, the network device may further add the downlink beam that meets the first condition into the downlink serving beam set.

In one embodiment, the identifier of the first beam may be a beam identifier or an identifier of an SS block. The identifier of the SS block may further be a time index (time index) of the SS block, and the time index is carried on a PBCH of the SS block. The SS block may include at least one of the following: a primary synchronization signal (PSS), a secondary synchronization signal SSS for short), and a physical broadcast channel (PBCH).

In one embodiment, after operation 203, the method further includes operation 204, where the network device sends, to the terminal device, a response message to the identifier of the first beam.

The response message is used to indicate an identifier of a beam that serves the terminal device. In one embodiment, the beam that is indicated by the response message and that serves the terminal device may include the beam that meets the first condition and that is reported by the terminal device, or may not include the beam that meets the first condition and that is reported by the terminal device. In one embodiment, the response message further includes an identifier of a beam that needs to be deleted, and the beam that needs to be deleted is at least one beam in the beam on which beam failure occurs. In one embodiment, the response message to the identifier of the first beam may be further understood as a response message to the beam report or a response message to the beam recovery report.

In one embodiment, after operation 204, the method further includes operation 205, where the terminal device receives the response message that is to the identifier of the first beam and that is sent by the network device.

In one embodiment, when receiving the response message, the terminal device may or may not modify or adjust a beam in a downlink serving beam set of the terminal device, so that the terminal device can correctly or effectively receive data sent by the network device on at least one downlink beam. The at least one downlink beam is indicated by the network device by using the response message. In one embodiment, the data includes downlink control plane data and/or user plane data.

The modification or adjustment operation includes the following: (1) If the identifier, of the beam, that is indicated by the response message and that serves the terminal device is different from identifiers of some beams in the downlink serving beam set of the terminal device, the terminal device partially adjusts (adds or deletes) the some beams in the downlink serving beam set based on the response message, for example, modifies angles or phases of the some beams in the downlink serving beam set. (2) If the identifier, of the beam, that is indicated by the response message and that serves the terminal device is different from identifiers of all beams in the downlink serving beam set of the terminal device, the terminal device adjusts (adds or deletes) some or all of all the beams in the downlink serving beam set based on the response message, for example, modifies phases or angles of receive beams. (3) If the identifier, of the beam, that is indicated by the response message and that serves the terminal device is the same as identifiers of all beams in the downlink serving beam set of the terminal device, the terminal device does not adjust all the beams in the downlink serving beam set based on the response message. It should be understood that the three cases are only used as an example for description herein. In practice, there may be another proper adjustment or modification operation. This is not limited in this embodiment of this application.

In one embodiment, the response message sent by the network device may include an identifier of at least one downlink beam, to notify the terminal device of a downlink beam used to serve the terminal device. Herein, the at least one downlink beam may be understood as a beam that is used by the terminal device to update the downlink serving beam set of the terminal device.

In one embodiment, the response message may be an uplink grant (UL grant) or a downlink assignment (DL assignment).

In one embodiment, the response message sent by the network device may also be sent by using physical layer signaling or a MAC CE.

In one embodiment, operation 202 needs to be performed to meet a condition, that is, only when a condition is met, the terminal device is triggered to send the identifier of the first beam to the network device. For example, after the terminal device performs beam measurement and determines that beam failure occurs, the terminal device may be triggered to send the identifier of the first beam to the network device by using the physical layer control signaling or the MAC layer control signaling. In one embodiment, if reference signal received strength or reference signal received quality of a serving beam of the terminal device is lower than the first threshold within preset duration, the terminal device determines that beam failure occurs. In one embodiment, a reference signal of the serving beam may be a reference signal of a control channel and/or a data channel. In one embodiment, if M serving beams are configured for the terminal device and reference signal received strength or quality of N DL beams is lower than a preset threshold within preset duration, the terminal device determines that beam failure occurs. M is greater than N, and M and N are integers and may be configured by a network. The reference signal may be at least one of the following: a synchronization signal (PSS/SSS), a CSI-RS, a cell-specific reference signal (CRS), a beam reference signal (BRS for short), and a demodulation reference signal (DMRS). For another example, a first timer is started or restarted. When the first timer expires, the terminal device is triggered to send the identifier of the first beam to the network device by using the physical layer control signaling or the MAC layer control signaling. In one embodiment, when the MAC layer control signaling is generated, the first timer may be restarted and perform timing again.

For another example, a second timer is started or restarted. When the second timer expires and no response to an identifier of a second beam is received, the terminal device is triggered to send the identifier of the first beam to the network device by using the physical layer control signaling or the MAC layer control signaling. In one embodiment, when the MAC layer control signaling is generated, the second timer may be restarted and perform timing again. The second beam is a beam on which beam failure occurs or a beam that meets the first condition. The first beam and the second beam may be the same or different. In one embodiment, the terminal device sends the identifier of the second beam to the network device. When the terminal device does not receive the response to the identifier of the second beam before the second timer expires, the terminal device may report the second beam (herein, the second beam is the same as the first beam) again, or the terminal device performs beam measurement again, and report, to the network device, the first beam obtained through measurement.

In one embodiment, after operation 201, if the terminal device determines that there is no available uplink resource, before the terminal device performs operation 202, the method further includes the following: The terminal device sends a first request to the network device, where the first request is used to request an uplink resource. Further, the terminal device receives, from the network device, second indication information used to indicate the uplink resource. In one embodiment, the uplink resource is used to transmit the physical layer control signaling or the MAC layer control signaling, and the physical layer control signaling or the MAC layer control signaling includes the identifier of the first beam. In one embodiment, the first request is a random access preamble sequence, and is sent to the network device by using a physical random access channel, and a response message that is sent by the network device and that is to the random access preamble sequence includes the second indication information used to indicate the uplink resource. In one embodiment, the first request is uplink control signaling, and is sent to the network device by using a physical uplink control channel.

The following describes the foregoing method steps with reference to an example.

It is assumed that the terminal device maintains two serving beams that are a beam 1 and a beam 2, that is, a downlink serving beam set of the terminal device is {beam 1, beam 2}. Similarly, a downlink serving beam set of the network device for the terminal device is also {beam 1, beam 2}.

The terminal device listens on a PDCCH on the beam 1 and the beam 2, to obtain possible downlink control signaling, such as a downlink assignment or an uplink grant UL grant. The terminal device moves to a new location, and the terminal device determines, through measurement, that signal quality or strength of the beam 1 and the beam 2 becomes relatively poor (for example, the signal quality or strength of the beam 1 and the beam 2 is less than a threshold). Therefore, the terminal device determines that beam failure occurs, and the terminal device determines that signal quality or strength of a beam 3 is relatively good. Therefore, the terminal device may consider adding the beam 3 as a new serving beam.

Because the terminal device determines that beam failure occurs, in this case, measurement of a high frequency cell includes two cases:

(1) If the terminal device receives a UL grant sent by the network device, the terminal device generates physical layer control signaling or MAC layer control signaling based on the UL grant. The physical layer control signaling or the MAC layer control signaling includes an identifier of a first beam. The identifier of the first beam is an identifier of the beam 1 and an identifier of the beam 2, or is an identifier of the beam 1, an identifier of the beam 2, and an identifier of the beam 3, or is an identifier of the beam 3. The terminal device sends the physical layer control signaling or the MAC layer control signaling to the network device. The physical layer control signaling or the MAC layer control signaling may be used to notify the network device that the signal strength or quality of the beam 1 and the beam 2 is relatively poor and the signal quality of the beam 3 is good. The network device determines, based on the physical layer control signaling or the MAC layer control signaling, not to send downlink control signaling to the terminal device by using the beam 1 and the beam 2 any longer, and adds the beam 3 as a beam 3 that serves the terminal device. Subsequently, the network device sends the downlink control signaling to the terminal device by using the beam 3. After receiving a response that is sent by the network device and that is to the physical layer control signaling or the MAC layer control signaling, the terminal device no longer listens on the PDCCH on the beam 1 and the beam 2, but listens on the PDCCH on the beam 3. In addition, both the terminal device and the network device adjust respective downlink serving beam sets to {beam 3}.

(2) If the terminal device does not receive a UL grant sent by the network device, the terminal device is triggered to send a first request to the network device by using a physical uplink control channel (PUCCH) or a physical random access channel (PRACH). The first request is used to request an uplink resource. After the uplink resource is requested, the terminal device may further send, to the network device based on the foregoing case (1), physical layer control signaling or MAC layer control signaling that includes an identifier of a first beam.

In one embodiment, when the terminal device sends the MAC layer control signaling to the network device, operation 202 may be further implemented in the following manner:

In one embodiment, data (including control plane data and user plane data) in the terminal device has a sending priority. The terminal device performs resource allocation based on the uplink resource and preset sending priorities, and preferably allocates a resource to data with a higher sending priority in descending order of sending priorities. In one embodiment, the preset sending priority may be specified in a protocol in advance, or may be preconfigured by the network device. In one embodiment, at a MAC layer of the terminal device, a resource is preferably allocated to data with a higher sending priority in descending order of sending priorities. In one embodiment, a sending priority of the MAC layer control signaling is greater than a sending priority of a buffer status report (buffer status report, BSR for short). In one embodiment, the sending priority of the MAC layer control signaling is less than a sending priority of control signaling of an identifier of the terminal device.

For example, the preset sending priorities in descending order are successively as follows:

1. control signaling of a C-RNTI or data of a UL-CCCH;
2. control signaling of the identifier of the first beam;
3. control signaling of the BSR; and
4. logical channel data other than the data of the UL-CCCH.

Data of an uplink common control channel (UL-CCCH) is data of an SRB, and may be further understood as RRC layer data, for example, a connection establishment request message or a connection re-establishment request message. A cell radio network temporary identifier (C-RNTI) is the identifier of the terminal device, is used by the network device to identify an identity of the terminal device, and is mainly used in a random access process. The BSR is a buffer status report, is scheduling reference information of the network device, and is used to report to the terminal device on how much data in an uplink buffer currently waits to be transmitted. The network device allocates an uplink transmission resource based on the BSR reported by the terminal device, to avoid a waste of radio resources. The logical channel data other than the data of the UL-CCCH is common user plane data.

Reporting may be performed at a granularity of a logical channel group or a logical channel. The terminal device multiplexes and assembles data to which a resource is allocated, to generate a MAC packet, such as a transport block or a MAC protocol data unit (PDU). The terminal device sends the MAC packet to the network device based on the uplink resource.

It may be understood that the terminal device may perform operations based on some or all of the preset priorities in the foregoing embodiment. These operations are only examples. In this embodiment, another operation or variations of various operations may be performed. It may be unnecessary to perform operations based on all the priorities in the foregoing embodiment. For example, priorities are only 1>2>3, and a priority 4 is not considered.

The following is described with reference to an example.

Figure 14:
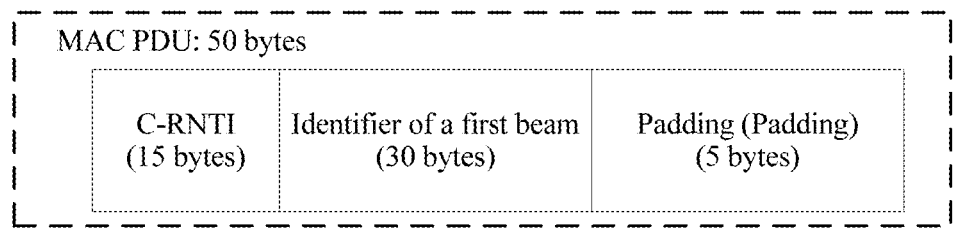
FIG. 14 is a schematic diagram of a MAC PDU according to this application.

It is assumed that a transport block size included in an uplink transmission resource is 50 bytes, that is, the radio transmission resource can transmit a maximum of data of 50 bytes. It is assumed that the C-RNTI requires a resource of 15 bytes, the identifier of the first beam requires a resource of 30 bytes, and the BSR requires a resource of 10 bytes. The transport block size included in the uplink transmission resource allocated by a base station cannot be used to report the C-RNTI, the identifier of the first beam, and the BSR at the same time. In this case, the terminal device preferably allocates a resource to data with a higher priority based on the priorities: the C-RNTI>the identifier of the first beam>the BSR. In one embodiment, a resource of 15 bytes is allocated to the C-RNTI, and then a resource of 30 bytes is allocated to the identifier of the first beam from a remaining resource of 35 bytes. A remaining resource of 5 bytes is not enough to report the BSR. In this case, the BSR is not reported, but some padding data may be reported. In this case, as shown in FIG. 14, a MAC PDU is formed.

In one embodiment, the first request sent by the terminal device to the network device may be implemented in the following manner:

(1) The first request is a random access preamble sequence.

When the first request is a random access preamble sequence, a process includes the following steps.

Operation 1: The terminal device receives random access configuration information sent by the network device.

The configuration information includes N pieces of RACH configuration information (including RACH time-frequency resources, and in one embodiment, further including a preamble group) and identifier information of downlink beams that are associated with the N pieces of RACH configuration information and that are used to send an SS block or a first CSI-RS. The identifier information of the DL beam may be a time index on a PBCH channel.

Operation 2: The terminal device performs beam measurement based on the SS block or the first CSI-RS, to determine an available or best downlink beam.

The terminal device determines, based on an identifier of the available or best downlink beam, an RACH configuration associated with the identifier of the available or best downlink beam, and sends a preamble to the network device by using the RACH configuration.

Operation 3: The terminal device receives, on the downlink beam, a random access response message sent by the network device, where the random access response message includes an uplink grant, an uplink timing advance, and the like.

In one embodiment, when the terminal device sends the random access preamble sequence, the terminal device listens on a PDCCH by using an RA-RNTI in a random access response window, to receive the random access response message that is sent by the network device and that is to the random access preamble sequence. Duration of the random access response window may be specified in advance or preconfigured by a network.

The RA-RNTI may be calculated by using the following formulas:

The RA-RNTI may be obtained by using parameters t_id, f_id, and slot_id together.

The RA-RNTI may be obtained by using parameters t_id, f_id, and symbol_id together.

The RA-RNTI may be obtained by using parameters t_id, f_id, slot_id, and symbol_id together.

In the following:

$$RA\text{-}RNTI = 1 + a^* t\_id + b^* symbol\_id + c^* f\_id + d^* slot\_id,$$

where a, b, c, d are natural numbers or nonnegative integers. The solutions of the embodiments include any combination of the foregoing formulas.

For example, a possible combination form is as follows:

$$RA\text{-}RNTI=1+t\_id+\max\_t*time\_unit\_id+(\max\_t+\max\_t*\max\_time\_unit)*f\_id, \text{ where}$$

t_id is a subframe number of the first subframe in which a PRACH resource is located, and is an integer; max_t is a quantity of subframes of a radio frame; time_unit_id is a time_unit number of the first time_unit of the first subframe in which the PRACH resource is located, and the time_unit may be a slot or a symbol (a slot or a symbol of a reference subcarrier spacing), is a possible future time granularity, and is an integer; max_time_unit is a quantity of time_units of the max_time_unit in a subframe, and is an integer; and f_id is an index of a frequency domain resource in which the PRACH resource is located.

For example, another possible combination form is as follows:

$$RA\text{-}RNTI=1+t\_id+\max\_t*f\_id+(\max\_t+\max\_t*\max\_f)*time\_unit\_id, \text{ where}$$

t_id is a subframe number of the first subframe in which a PRACH resource is located, and is an integer; max_t is a quantity of subframes of a radio frame; time_unit_id is a time_unit number of the first time_unit of the first subframe in which the PRACH resource is located, and the time_unit may be a slot or a symbol, is a possible future time granularity, and is an integer; max_time_unit is a quantity of time_units of the max_time_unit in a subframe, and is an integer; and f_id is an index of a frequency domain resource in which the PRACH resource is located.

In one embodiment, the RAR may further include configuration information of at least one second CSI-RS, and the configuration information is used by the terminal device to perform CSI-RS-based beam measurement. Configuration information of any second CSI-RS may further include identifier information of the second CSI-RS, for example, a CSI-RS index. The RAR may further include an N value, and the N value is used by the terminal device to combine reference signal received power and/or reference signal received quality of N beams into cell-specific reference signal received power and/or cell-specific reference signal received quality. The N value may be further obtained from a system message.

Operation 4: The terminal device sends the identifier of the first beam to the network device based on the uplink grant included in the random access response.

In one embodiment, the identifier of the first beam may be sent by using MAC control signaling, and operation 4 may be further understood as sending a beam report or sending a beam recovery report.

In one embodiment, in an alternative solution of operation 4, the terminal device sends an identifier of a third beam to the network device.

The third beam is some or all beams in at least one beam that is corresponding to an identifier of a second CSI-RS and that meets a second condition. The configuration identifier of the second CSI-RS may be a CSI-RS index, and the second condition is configuration identifiers of N second CSI-RSs whose signal quality or strength obtained through measurement based on the second CSI-RS is relatively good, or configuration identifiers of N second CSI-RSs whose signal quality or strength obtained through measurement based on the second CSI-RS is greater than a threshold.

In one embodiment, the terminal device further sends, to the network device, beam reference signal received power (RSRP) and/or beam reference signal received quality (RSRQ) based on the second CSI-RS. In one embodiment, the terminal device further sends, to the network device, cell-specific reference signal received power (RSRP for short) and/or cell-specific reference signal received quality (RSRQ) based on the second CSI-RS.

Operation 5: The terminal device receives a contention resolution message sent by the network device. The contention resolution message may be downlink control signaling scrambled by using a C-RNTI, for example, a UL grant or a DL assignment. In one embodiment, the contention resolution message may further carry a response message to the identifier of the first beam or the identifier of the second CSI-RS.

In one embodiment, the terminal device receives, on the first beam or a receive beam associated with the second CSI-RS configuration, the contention resolution message sent by the network device.

(2) The first request is physical layer control signaling.

Operation 1: The terminal device sends the first request to the network device by using a physical uplink control channel.

Operation 2: The terminal device receives an uplink grant sent by the network device.

Operation 3: The terminal device sends the identifier of the first beam to the network device based on the uplink grant included in the random access response.

Operation 4: The terminal device receives a response message that is sent by the network device and that is to the identifier of the first beam.

The foregoing describes two possible embodiments in which the terminal device sends the first request to the network device. Certainly, in actual application, no limitation is imposed on the foregoing two embodiments.

In one embodiment, the physical uplink channel may be in the primary cell or the secondary cell.

In one embodiment, after operation 201, if the terminal device determines that there is no available uplink resource, the terminal device does not perform operation 202 to operation 204, but performs the following steps:

Operation 1: The terminal device sends a second request to the network device by using a physical uplink control channel, where the second request message carries an identifier of a first beam.

In one embodiment, the second request is uplink control signaling.

Operation 2: The terminal device receives a response message that is sent by the network device and that is to the identifier of the first beam.

In one embodiment, the terminal device sends the identifier of the first beam to the network device by using the second request, so that the terminal device does not need to further request for an uplink resource, thereby reducing overheads and improving a processing speed.

In one embodiment, the physical uplink channel may be in a primary cell or a secondary cell.

In any one of the foregoing solutions, in one embodiment, when sending, to the terminal device, the response message to the first beam, the network device may further add configuration information of a CSI-RS into the response message, so that the terminal performs CSI-RS-based beam measurement. The terminal device receives the configuration information, performs beam measurement, generates a measurement result, and sends a CSI-RS-based beam measurement result to the network device.

In any one of the foregoing embodiments, if the terminal device cannot receive an identifier of a beam that serves the terminal device, the terminal device sends a connection re-establishment request to the network device. In the following case, the terminal device may consider that the identifier of the beam that serves the terminal device cannot be received. For example, when the terminal device sends the identifier of the first beam to the network device, if the terminal device does not receive the response message to the identifier of the first beam and the terminal device determines that no current beam is available, the terminal device determines that radio link failure occurs, and sends the connection re-establishment request to the network device. In one embodiment, the connection re-establishment request may be a radio resource control (RRC) connection re-establishment request. For another example, when the terminal device sends a first request to the network device, where the first request is used to request an uplink resource, if the terminal device does not receive a response message to the first request within specified duration and the terminal device sends the first request for more than a preset quantity of times, the terminal device determines that radio link failure occurs, and sends the connection re-establishment request to the network device. In one embodiment, the connection re-establishment request may be an RRC connection re-establishment request.

The following is described in detail with reference to an example.

A physical layer of the terminal device indicates out-of-synchronization indication (out of sync) to an RRC layer of the terminal device in any one of the following scenarios:

Case 1: Reference signal received quality or strength of no serving beam exceeds a threshold.

Case 2: Reference signal received quality or strength of no serving beam exceeds a threshold, and there is no another available downlink beam.

Solution 1: When the RRC layer of the terminal device receives N consecutive out-of-synchronization indications of the physical layer, a fourth timer is started. During running of the fourth timer, if an in sync indication of the PHY layer is received, the fourth timer is stopped. N is an integer, and is configured by the network device or specified in a protocol in advance.

When the fourth timer is started, the terminal device determines that radio link failure occurs, and therefore initiates RRC re-establishment.

Solution 2: When the terminal device determines that beam failure occurs, the terminal device starts a third timer. The third timer is used by the terminal device to search for or identify an available downlink beam. When the third timer expires, if there is still no available serving beam and another new available beam is not found, the terminal device determines that radio link failure occurs, and therefore initiates an RRC re-establishment process. When the third timer expires, if the terminal device determines that there is at least one available serving beam, the terminal device sends the identifier of the first beam to the network device. For details, refer to the descriptions in operation 201 to operation 204. It should be noted that "available" may be understood as that reference signal received quality or strength of a beam is greater than or equal to a threshold.

In one embodiment, after the terminal device sends the identifier of the first beam to the network device, if the terminal device does not receive, within a preset time period, a response message that is sent by the network device and that is to the identifier of the first beam or a response message that is sent by the network device and that is to a beam report, the terminal device determines that radio link failure occurs, and initiates RRC re-establishment. In one embodiment, the physical layer or the MAC layer of the terminal device sends a beam failure indication to the RRC layer of the terminal device. The RRC layer of the terminal device determines that radio link failure occurs, and initiates RRC re-establishment.

In one embodiment, when the terminal device sends the first request to the network device for M times, and does not receive the response message that is sent by the network device and that is to the identifier of the first beam, the terminal device determines that radio link failure occurs, and initiates an RRC re-establishment process. M is an integer, and is configured by the network device or specified in a protocol in advance. In one embodiment, the physical layer or the MAC layer of the terminal device sends a beam failure indication to the RRC layer of the terminal device. The RRC layer of the terminal device determines that radio link failure occurs, and initiates RRC re-establishment.

In one embodiment, duration of the third timer and the fourth timer may be specified in a protocol in advance, or may be preconfigured by the network device.

In this application, operation 201 that a terminal device measures a beam of a network device may be, in one embodiment, implemented in the following manner:

In one embodiment, the terminal device further receives a first configuration sent by the network device, where the first configuration includes a window period and window duration. The measuring, by a terminal device, a beam of a network device includes: measuring, by the terminal device, the beam of the network device based on the window period and the window duration. According to the measurement method, the terminal device can be prevented from continuously performing beam measurement, thereby reducing power consumption of the terminal device and saving power.

Figure 15:
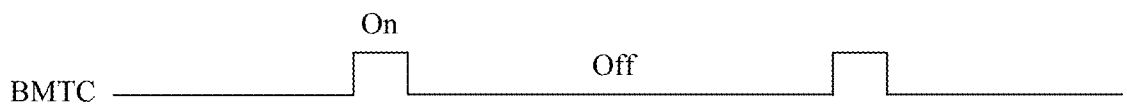
FIG. 15 is a schematic diagram of a window period and window duration of beam measurement according to this application.
Figure 16:
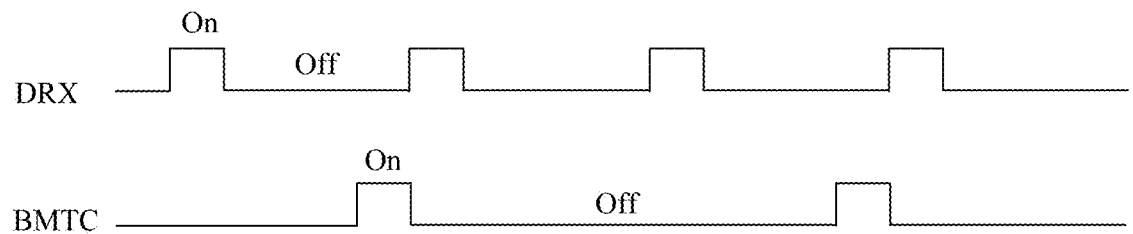
FIG. 16 is a schematic diagram of beam measurement duration according to this application.

In one embodiment, FIG. 15 is a schematic diagram of a window period and window duration of beam measurement. The terminal device periodically performs beam measurement in the window duration based on the first configuration, to determine whether beam failure occurs. For example, as shown in FIG. 15, beam measurement may be performed in an on time period of a beam management timing configuration (BMTC), and the beam measurement may be based on an SS block or a CSI-RS.

In one embodiment, if discontinuous reception (DRX) is further configured for the terminal device, the terminal device may further perform beam measurement in an active (for example, DRX on) time period of discontinuous reception, to determine whether beam failure occurs. When configuring the BMTC, the base station needs to consider DRX on duration. For example, referring to FIG. 16, BMTC on duration may be configured before the DRX on duration, so that the terminal device can determine, in the DRX on time period, whether there is an available downlink beam for receiving downlink control signaling (a downlink assignment or an uplink grant). If there is no available downlink beam for receiving downlink control signaling, the terminal device sends the identifier of the first beam to the network device to initiate a beam recovery process. Otherwise, no beam recovery process is initiated.

The DRX active time period is used to control the terminal device to listen on a PDCCH to obtain downlink control signaling. In one embodiment, the terminal device listens on PDCCHs of all active cells.

For a case in which DRX is configured for the terminal device, in one embodiment, when the terminal device is in a triggering state of a scheduling request, the terminal device determines, within preset duration, whether there is an available downlink serving beam. If there is an available downlink serving beam, the terminal device sends the scheduling request to the network device, and listens on a PDCCH, to obtain a possible UL grant. If there is no available downlink serving beam, the terminal device does not send the scheduling request to the network device, and triggers a beam recovery process. The scheduling request is used by the terminal device to request an uplink transmission resource from the network device. In this manner, when determining that there is no available beam, the terminal device does not send the scheduling request, thereby saving power of the terminal device.

In another embodiment, this application further provides another beam management method that includes the following steps.

Operation A: A terminal device measures a beam of a network device.

In one embodiment, the terminal device may periodically measure the beam or measure the beam based on an instruction of the network device. In one embodiment, the terminal device may obtain, through measurement, a beam on which beam failure occurs. The beam on which beam failure occurs may be a beam on which reference signal received strength RSRP or reference signal received quality RSRQ is lower than a first threshold, or a beam on which reference signal received strength RSRP or reference signal received quality RSRQ is always lower than a first threshold within a preset time period. Alternatively, the beam on which beam failure occurs may be understood as a beam on which reference signal received strength or reference signal received quality is relatively poor. In one embodiment, the terminal device may further obtain, through measurement, a beam that meets a first condition. The beam that meets the first condition may be a beam on which reference signal received strength or reference signal received quality is higher than a second threshold. Alternatively, the beam that meets the first condition may be understood as N beams on which reference signal received strength or reference signal received quality is relatively good. N is greater than or equal to 1.

Operation B: When the terminal device is in a first state (in this application, the first state is also referred to as a triggering state of a beam recovery report), the terminal device determines whether there is an uplink resource.

The uplink resource may include some or all of the following content: a transport block size, a physical time-frequency resource block (for example, a quantity), information indicating new transmission or retransmission, a modulation and coding scheme, a HARQ process ID, and a redundancy version. The uplink resource may be a dynamically scheduled uplink resource, or may be a semi-statically scheduled uplink resource, or may be a contention-based uplink resource (an uplink resource shared by a plurality of terminals, such as a grant free resource). In one embodiment, the uplink resource may be used to indicate an uplink resource of a primary cell or a secondary cell. In one embodiment, the uplink resource is an uplink transmission resource used to report the beam recovery report.

Operation C: If determining that there is an uplink resource, the terminal device generates the beam recovery report based on the uplink resource.

The beam recovery report includes an identifier of a first beam, and the first beam is a beam on which beam failure occurs or a beam that meets the first condition.

The beam recovery report is used to notify the network device of at least one downlink serving beam on which beam failure occurs. In one embodiment, the beam recovery report may be further used to notify the network device of a downlink beam on which reference signal received strength or quality is relatively good. The network device may delete, from a downlink serving beam set based on the beam recovery report, the at least one downlink serving beam on which beam failure occurs, and adds, into the downlink serving beam set, the downlink beam on which reference signal received strength or quality is relatively good.

In one embodiment, the beam recovery report may be sent by using physical layer control signaling or MAC layer control signaling.

Operation D: The terminal device sends the beam recovery report to the network device based on the uplink resource.

The network device determines, based on the beam recovery report, one or more downlink beams that may be used to transmit data with the terminal device, for example, whether to send downlink control signaling by using these downlink beams. If the network device determines that at least one serving beam is no longer used to send downlink control signaling and/or at least one downlink serving beam may be used to send downlink control signaling, the network device generates a response message to the beam recovery report. The terminal device adjusts setting of a receive beam based on the response message to the beam restoration report, to effectively obtain the downlink control signaling.

In operation B, if the terminal device determines that there is no available uplink resource, before operation C, the method further includes the following operation:

Operation E: The terminal device sends a beam recovery request to the network device.

In one embodiment, the beam recovery request may be uplink control signaling or a random access preamble.

In one embodiment, before sending the beam recovery request, the terminal device enters a second state (which may also be referred to as a triggering state of the beam recovery request). The triggering state of the beam recovery request is used to trigger sending of the beam recovery request.

In one embodiment, the beam recovery request may be a random access preamble sequence, and is sent by using a physical random access channel.

In one embodiment, the beam recovery request may alternatively be uplink control signaling, and is sent by using a physical uplink control channel.

In one embodiment, when one or more of the following conditions are met, the terminal device is triggered to enter the first state (the triggering state of the beam recovery report):

Condition 1: A fifth timer expires.

The fifth timer is used to periodically trigger the terminal device to enter the first state.

Condition 2: A sixth timer expires.

The sixth timer is used by the terminal device to enter the first state again when the terminal device does not receive the response message to the beam recovery report.

Condition 3: The terminal determines that beam failure occurs.

In one embodiment, if reference signal received strength or reference signal received quality of a serving beam of the terminal device is lower than the first threshold within preset duration, the terminal device determines that beam failure occurs. In one embodiment, a reference signal of the serving beam may be a reference signal of a control channel and/or a data channel. In one embodiment, if M serving beams are configured for the terminal device and reference signal received strength or quality of N DL beams is lower than a preset threshold within the preset duration, the terminal device determines that beam failure occurs. M is greater than or equal to N, and M and N are integers and may be configured by a network. The reference signal may be at least one of the following: a synchronization signal (PSS/SSS), a CSI-RS, a cell-specific reference signal (CRS), a BRS, and a demodulation reference signal (DMRS).

In one embodiment, when one or more of the following conditions are met, the terminal device is triggered to cancel the first state (the triggering state of the beam recovery report):

Condition 1: The first state is canceled after the beam recovery report is generated based on the uplink resource.

In other words, the first state is canceled after the beam recovery report is generated.

Condition 2: The first state is canceled after the beam recovery report is generated based on the uplink resource, the beam recovery report is sent to the network device, and the response message that is to the beam recovery report and that is sent by the network device is received by the terminal device.

In other words, the first state is canceled after the response message to the beam recovery report is received.

Condition 3: The first state is canceled after the beam recovery report is sent to the network device based on the uplink resource.

In other words, the first state is canceled after the beam recovery report is sent.

Condition 4: The first state is canceled when a generated MAC PDU (protocol data unit) includes the beam recovery report (or includes the identifier of the first beam).

In one embodiment, when one or more of the following conditions are met, the terminal device is triggered to enter the second state (the triggering state of the beam recovery request):

Condition 1: The second state is entered when the terminal device enters the first state and determines that there is no available uplink resource.

In one embodiment, when one or more of the following conditions are met, the terminal device is triggered to cancel the second state (the triggering state of the beam recovery request):

Condition 1: The second state is canceled after the beam recovery report is generated based on the uplink resource.

In other words, the second state is canceled after the beam recovery report is generated.

Condition 2: The second state is canceled after the beam recovery report is generated based on the uplink resource, the beam recovery report is sent to the network device, and the response message that is to the beam recovery report and that is sent by the network device is received by the terminal device.

In other words, the second state is canceled after the response message to the beam recovery report is received.

Condition 3: The second state is canceled after the beam recovery report is sent to the network device based on the uplink resource.

In other words, the second state is canceled after the beam recovery report is sent.

Condition 4: The second state is canceled when a generated MAC PDU includes the beam recovery report (or includes the identifier of the first beam).

Based on the method for triggering the first state/the second state and canceling the first state/the second state provided above, the terminal device may determine, based on a current state, whether the beam recovery report/the beam recovery request may be sent to the network device.

For a method for sending the beam recovery request by the terminal device, refer to the method for sending the first request by the terminal device in the foregoing embodiment of this application. Details are not described herein again.

For a method for measuring a beam by the terminal device, refer to the method for measuring a beam by the terminal device in the foregoing embodiment of this application. Details are not described herein again. In the foregoing embodiments provided in this application, the beam management method provided in the embodiments of this application is described separately from a perspective of each network element and from a perspective of interaction between network elements. It may be understood that, to implement the foregoing functions, each network element such as the terminal device (for example, the UE) or the network device (for example, the base station) includes a corresponding hardware structure and/or software module for performing each function. A person of ordinary skill in the art should be easily aware that, units and algorithms steps in the examples described with reference to the embodiments disclosed in this specification may be implemented in a form of hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 17:
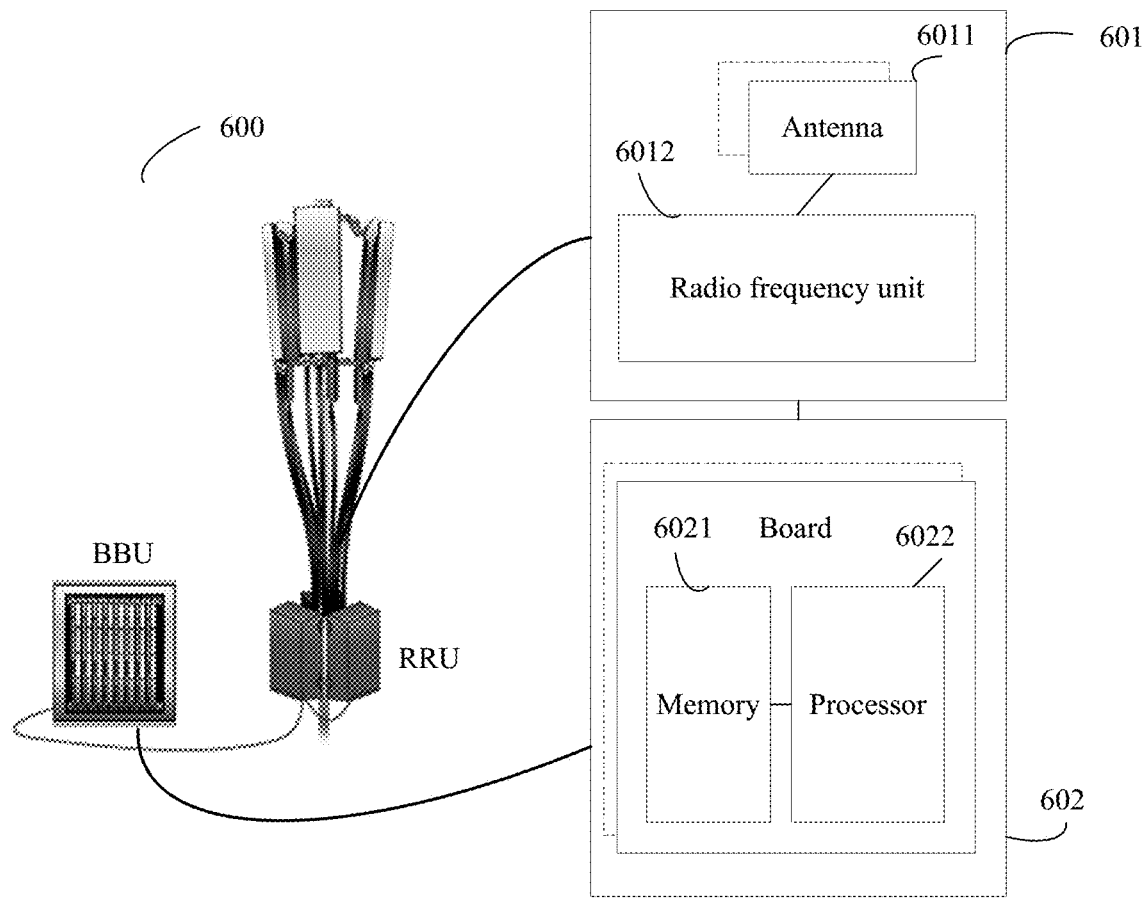
FIG. 17 shows a network device according to this application.

Based on a same concept, an embodiment of this application further provides a network device 600. As shown in FIG. 17, the network device 600 may be used to perform the method by the network device in any one of the foregoing embodiments. The network device 600 includes one or more remote radio units (RRU) 601 and one or more baseband units (BBU) 602. The RRU 601 may be referred to as a transceiver unit, a transceiver, a transceiver circuit, a transceiver, or the like, and may include at least one antenna 6011 and a radio frequency unit 6012. The RRU 601 is mainly configured to: receive/send a radio frequency signal, and perform conversion between a radio frequency signal and a baseband signal. The BBU 602 is mainly configured to: perform baseband processing, control the network device, and the like. The RRU 601 and the BBU 602 may be physically disposed together, or may be physically separated, that is, in a distributed network device.

The BBU 602 is a control center of the network device, may also be referred to as a processing unit, and is mainly configured to complete a baseband processing function such as channel coding, multiplexing, modulation, or spreading. For example, the BBU (the processing unit) may be configured to control the network device to perform the method performed by the network device in any of the foregoing embodiments.

In an example, the BBU 602 may include one or more boards, and a plurality of boards may jointly support a radio access network (such as an LTE network) of a single access standard, or may separately support radio access networks of different access standards. The BBU 602 further includes a memory 6021 and a processor 6022. The memory 6021 is configured to store an instruction and data. The processor 6022 is configured to control the network device to perform an action, for example, configured to control the network device to perform the method performed by the network device in any one of the foregoing embodiments. The memory 6021 and the processor 6022 may serve one or more boards. In other words, a memory and a processor may be disposed on each board. Alternatively, a plurality of boards may use a same memory and processor. In addition, a circuit is further disposed on each board.

In an uplink, an uplink signal (including data or the like) sent by a terminal device is received by using the antenna 6011. In a downlink, a downlink signal (including data and/or control information) is sent to the terminal device by using the antenna 6011. The processor 6022 processes service data and a signaling message. These units perform processing based on a radio access technology (for example, an access technology in LTE, NR, and another evolved system) used by a radio access network. The processor 6022 is further configured to control and manage an action of the network device, and is configured to perform processing performed by the network device in the foregoing embodiments. The processor 6022 is further configured to support the network device in performing the processing processes of the network device in FIG. 13.

It may be understood that FIG. 17 shows only a simplified design of the network device. In actual application, the network device may include any quantity of antennas, memories, processors, radio frequency units, RRUs, BBUs, and the like, and all network devices that can implement this application fall within the protection scope of this application.

In one embodiment, in this application, that the RRU 601 is referred to as a transceiver is used as an example. In this case, the transceiver and the processor in the network device 600 may be configured to perform the following operations.

The transceiver is configured to receive physical layer control signaling or MAC layer control signaling that is sent by a terminal device, where the physical layer control signaling or the MAC layer control signaling includes an identifier of a first beam, and the first beam is a beam on which beam failure occurs or a beam that meets a first condition.

The transceiver is further configured to send, to the terminal device, a response message to the identifier of the first beam, where the response message is used to indicate an identifier of a beam that serves the terminal device.

In one embodiment, the physical layer control signaling or the MAC layer control signaling is sent to the network device when the terminal device determines that beam failure occurs; or the physical layer control signaling or the MAC layer control signaling is sent to the network device when the terminal device determines that a first timer expires; or the physical layer control signaling or the MAC layer control signaling is sent to the network device when the terminal device determines that a second timer expires and does not receive a response to an identifier of a second beam, where the second beam is a beam on which beam failure occurs or a beam that meets the first condition.

In one embodiment, the transceiver is further configured to: receive a first request sent by the terminal device, where the first request is used to request an uplink resource; and send, to the terminal device, second indication information used to indicate the uplink resource, where the uplink resource is used to transmit the physical layer control signaling or the MAC layer control signaling.

In one embodiment, a sending priority of the MAC layer control signaling is greater than a sending priority of a buffer status report.

In one embodiment, the sending priority of the MAC layer control signaling is less than a sending priority of control signaling of an identifier of the terminal device.

In one embodiment, the first request is a random access preamble sequence, and is sent by the terminal device to the network device by using a physical random access channel. Alternatively, the first request is uplink control signaling, and is sent by the terminal device to the network device by using a physical uplink control channel.

In one embodiment, the transceiver is configured to receive a connection re-establishment request sent by the terminal device, where the connection re-establishment request is generated when the terminal device cannot receive the identifier of the beam that serves the terminal device.

In one embodiment, the transceiver is further configured to send a first configuration to the terminal device, where the first configuration includes a window period and window duration. The identifier of the first beam is obtained by the terminal device through measurement based on the window period and the window duration.

Based on a same concept, an embodiment of this application further provides a terminal device 700. As shown in FIG. 18(*a*), for ease of description, FIG. 18(*a*) shows only main components of the terminal device. As shown in FIG. 18(*a*), the terminal device 700 includes a processor, a memory, a control circuit, an antenna, and an input/output apparatus. The processor is mainly configured to: process a communication protocol and communication data, control the entire terminal device, execute a software program, and process data of the software program, for example, is configured to support the terminal device 700 in performing the method performed by the terminal device in any one of the foregoing embodiments. The memory is mainly configured to store a software program and data. The control circuit is mainly configured to: perform conversion between a baseband signal and a radio frequency signal, and process a radio frequency signal. The control circuit, together with the antenna, may also be referred to as a transceiver that is mainly configured to receive/send a radio frequency signal in an electromagnetic wave form. The input/output apparatus, such as a touchscreen, a display screen, or a keyboard, is mainly configured to receive data entered by a user and output data to the user.

After the terminal device is powered on, the processor may read the software program in the memory, interpret and execute an instruction of the software program, and process the data of the software program. When data needs to be sent wirelessly, the processor performs baseband processing on the to-be-sent data, and then outputs the baseband signal to a radio frequency circuit. The radio frequency circuit performs radio frequency processing on the baseband signal, and then sends the radio frequency signal by using the antenna in an electromagnetic wave form. When data is sent to the terminal device 700, the radio frequency circuit receives a radio frequency signal by using the antenna, converts the radio frequency signal into a baseband signal, and outputs the baseband signal to the processor. The processor converts the baseband signal into data, and processes the data.

A person skilled in the art may understand that, for ease of description, FIG. 18(*a*) shows only one memory and only one processor. Actually, the terminal device may have a plurality of processors and a plurality of memories. The memory may also be referred to as a storage medium, a storage device, or the like. This is not limited in this application.

In one embodiment, the processor may include a baseband processor and a central processing unit. The baseband processor is mainly configured to process the communication protocol and the communication data. The central processing unit is mainly configured to: control the entire terminal device 700, execute the software program, and process the data of the software program. Functions of the baseband processor and the central processing unit are integrated into the processor in FIG. 18(a). A person skilled in the art may understand that the baseband processor and the central processing unit each may be an independent processor, and are interconnected by using a technology such as a bus. A person skilled in the art may understand that the terminal device may include a plurality of baseband processors to adapt to different network standards, and the terminal device 700 may include a plurality of central processing units to enhance a processing capability of the terminal device 700. The components of the terminal device 700 may be connected by using various buses. The baseband processor may also be expressed as a baseband processing circuit or a baseband processing chip. The central processing unit may also be expressed as a central processing circuit or a central processing chip. A function of processing the communication protocol and the communication data may be embedded into the processor, or may be stored in the storage unit in a form of a software program, so that the processor executes the software program to implement a baseband processing function.

Figure 18A:
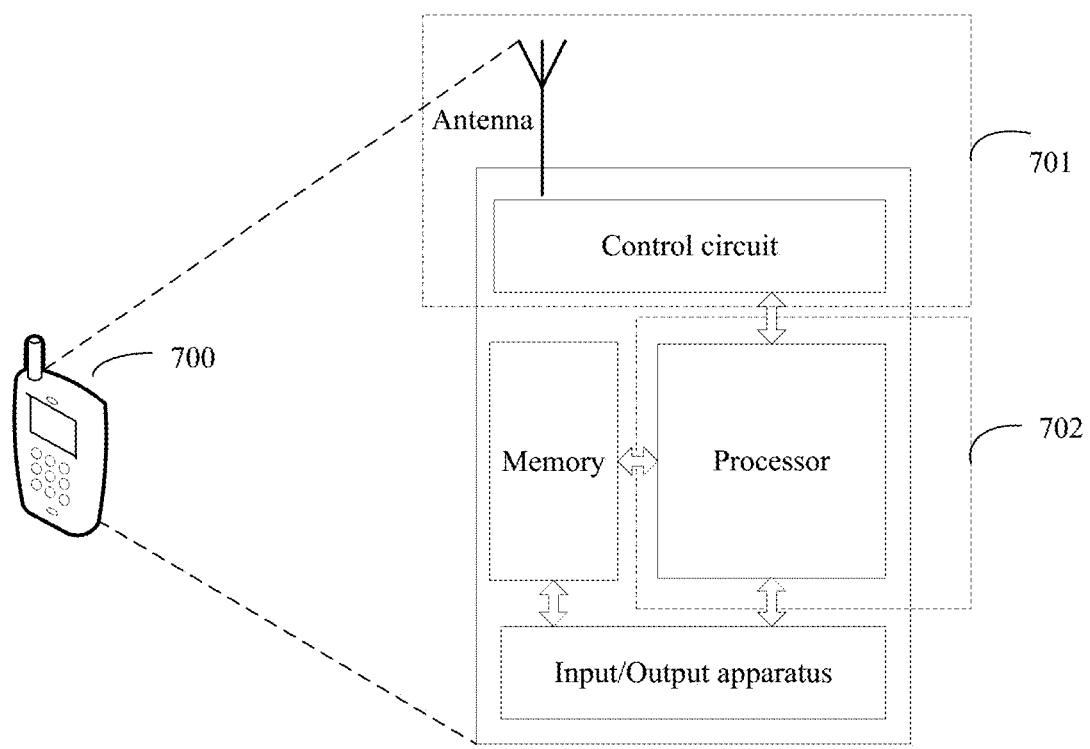
FIG. 18(a) shows a terminal device according to this application.

For example, in this application, the antenna and the control circuit that have receiving and sending functions may be considered as a transceiver unit 701 of the terminal device 700, and the processor having a processing function may be considered as a processing unit 702 of the terminal device 700. As shown in FIG. 18(a), the terminal device 700 includes the transceiver unit 701 and the processing unit 702. The transceiver unit may also be referred to as a transceiver, a transceiver, a transceiver apparatus, or the like. In one embodiment, a component that is in the transceiver unit 701 and is configured to implement the receiving function may be considered as a receiving unit, and a component that is in the transceiver unit 701 and is configured to implement the sending function may be considered as a sending unit, that is, the transceiver unit 701 includes the receiving unit and the sending unit. For example, the receiving unit may also be referred to as a receiver, a receiver, a receiver circuit, or the like, and the sending unit may be referred to as a transmitter, a transmitter, a transmit circuit, or the like.

In a downlink, a downlink signal (including data/or control information) sent by a network device is received by using the antenna. In an uplink, an uplink signal (including data and/or control information) is sent to the network device by using the antenna. The processor processes service data and a signaling message. These units perform processing based on a radio access technology (for example, an access technology in LTE, NR, and another evolved system) used by a radio access network. The processor is further configured to control and manage an action of the terminal device, and is configured to perform processing performed by the terminal device in the foregoing embodiments. The processor is further configured to support the terminal device in performing the processing processes of the terminal device in FIG. 13.

It may be understood that FIG. 18(a) shows only a simplified design of the terminal device. In actual application, the terminal device may include any quantity of antennas, memories, processors, and the like, and all terminal devices that can implement this application fall within the protection scope of this application.

In one embodiment, in this application, that the transceiver unit is referred to as a transceiver and the processing unit is referred to as a processor is used as an example. In this case, the transceiver and the processor in the terminal device 700 may be configured to perform the following operations.

The processor is configured to measure a beam of a network device.

The transceiver is configured to send an identifier of a first beam to the network device by using physical layer control signaling or media access control MAC layer control signaling, where the first beam is a beam on which beam failure occurs or a beam that meets a first condition.

In one embodiment, when beam failure occurs, the transceiver sends the identifier of the first beam to the network device by using the physical layer control signaling or the MAC layer control signaling; or when a first timer expires, the transceiver sends the identifier of the first beam to the network device by using the physical layer control signaling or the MAC layer control signaling; or when a second timer expires and no response to an identifier of a second beam is received, the transceiver sends the identifier of the first beam to the network device by using the physical layer control signaling or the MAC layer control signaling, where the second beam is a beam on which beam failure occurs or a beam that meets the first condition.

In one embodiment, the transceiver is further configured to: send a first request to the network device, where the first request is used to request an uplink resource; and receive, from the network device, second indication information used to indicate the uplink resource, where the uplink resource is used to transmit the physical layer control signaling or the MAC layer control signaling.

In one embodiment, a sending priority of the MAC layer control signaling is greater than a sending priority of a buffer status report.

In one embodiment, the sending priority of the MAC layer control signaling is less than a sending priority of control signaling of an identifier of the terminal device.

In one embodiment, the first request is a random access preamble sequence, and is sent to the network device by using a physical random access channel. Alternatively, the first request is uplink control signaling, and is sent to the network device by using a physical uplink control channel.

In one embodiment, if the transceiver cannot receive an identifier of a beam that serves the terminal device, the transceiver sends a connection re-establishment request to the network device.

In one embodiment, the transceiver receives a first configuration sent by the network device, where the first configuration includes a window period and window duration. The processor is configured to measure the beam of the network device based on the window period and the window duration.

Figure 18B:
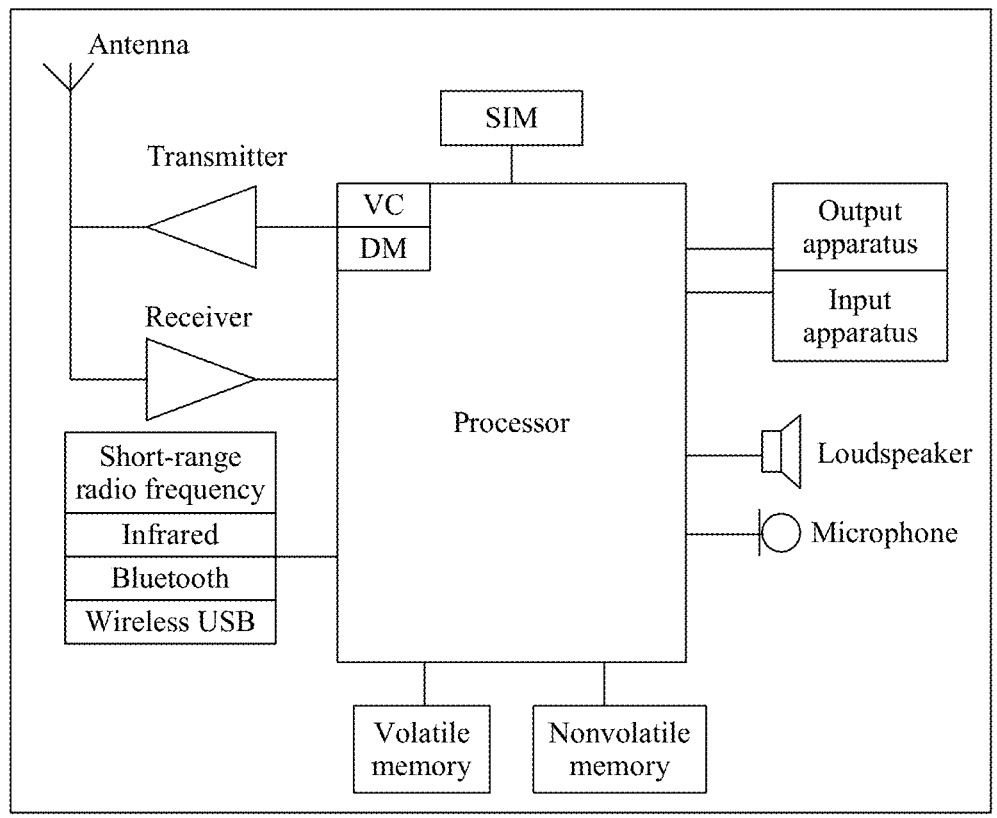
FIG. 18(b) shows a terminal device according to this application.

FIG. 18(b) is a schematic diagram of another terminal device according to this application. A processor may include a circuit used for audio/video and logical functions of the terminal device. For example, the processor may include a digital signal processor device, a microprocessor device, an analog-to-digital converter, and a digital-to-analog converter. Control and signal processing functions of the mobile device may be allocated between these devices based on respective capabilities of the devices. The processor may further include an internal voice coder VC, an internal data modem DM, and the like. In addition, the processor may include functions for operating one or more software programs, and the software programs may be stored in a memory. Usually, the processor and the stored software instruction may be configured to enable the terminal device to perform an action. For example, the processor can operate a connection program.

The terminal device may further include a user interface. The user interface may include, for example, a headset or loudspeaker, a microphone, an output apparatus (for example, a display), and an input apparatus. The user interface is operably coupled to the processor. In this case, the processor may include a user interface circuit, configured to control at least some functions of one or more elements (for example, the loudspeaker, the microphone, and the display) of the user interface. The processor and/or the user interface circuit in the processor may be configured to control one or more functions of the one or more elements of the user interface by using a computer program instruction (for example, software and/or firmware) stored in the memory accessible to the processor. Although not shown, the terminal device may include a battery configured to supply power to various circuits related to the mobile device. The circuit is, for example, a circuit that provides mechanical vibration as detectable output. The input apparatus may include a device that allows the apparatus to receive data, for example, a keypad, a touch display, a joystick, and/or at least one another input device.

The terminal device may further include one or more connection circuit modules configured to share and/or obtain data. For example, the terminal device may include a short-range radio frequency RF transceiver and/or detector, to share data with and/or obtain data from an electronic device based on an RF technology. The terminal device may include other short-range transceivers, such as an infrared IR transceiver, a Bluetooth transceiver, and a wireless universal serial bus USB transceiver. The Bluetooth transceiver can perform an operation based on a low-power or ultra-low-power Bluetooth technology. In this case, the terminal device, and in one embodiment, the short-range transceiver can send data to and/or receive data from an electronic device near the apparatus (for example, within 10 meters). Although not shown, the terminal device can send data to and/or receive data from the electronic device based on various wireless networking technologies, and these technologies include: Wi-Fi, Wi-Fi low power consumption, and a WLAN technology such as an IEEE 802.11 technology, an IEEE 802.15 technology, or an IEEE 802.16 technology.

The terminal device may include a memory that can store an information element related to a mobile user, such as a subscriber identity module SIM. In addition to the SIM, the apparatus may further include another removable and/or fixed memory. The terminal device may include a volatile memory and/or a nonvolatile memory. For example, the volatile memory may include a random access memory RAM, and the RAM includes a dynamic RAM and/or a static RAM, an on-chip and/or off-chip cache, and the like. The nonvolatile memory may be embedded and/or removable. The nonvolatile memory may include, for example, a read-only memory, a flash memory, a magnetic storage device such as a hard disk, a floppy disk drive, or a magnetic tape, an optical disc drive and/or a medium, and a nonvolatile random access memory NVRAM. Similar to the volatile memory, the nonvolatile memory may include a cache area used to temporarily store data. At least a part of the volatile memory and/or the nonvolatile memory may be embedded into the processor. The memory may store one or more software programs, instructions, information blocks, data, and the like. The memory may be used by the terminal device to perform a function of a mobile terminal. For example, the memory may include an identifier that can uniquely identify the terminal device, such as an international mobile equipment identity IMEI code.

Figure 19:
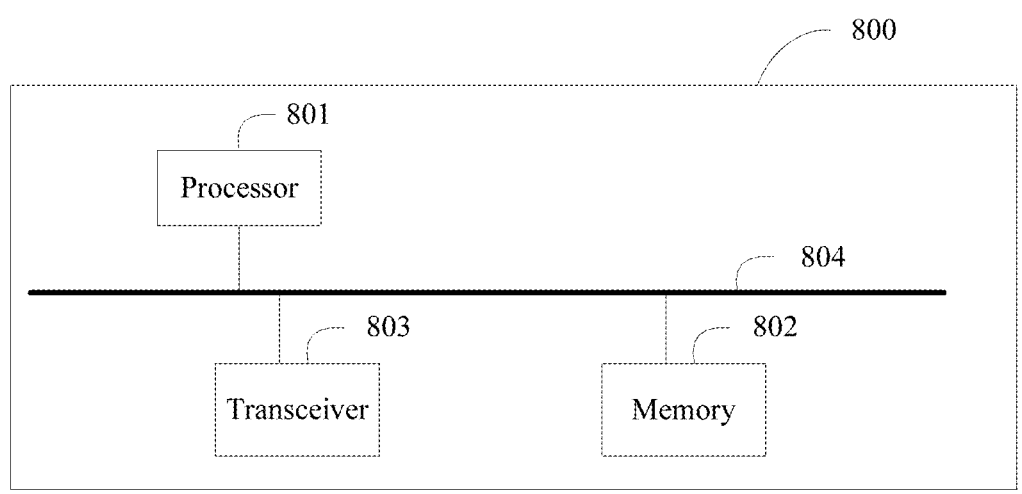
FIG. 19 shows an apparatus according to this application.

Based on a same concept, an embodiment of this application further provides an apparatus 800. The apparatus 800 may be a network device or a terminal device. As shown in FIG. 19, the apparatus 800 includes at least a processor 801 and a memory 802, may further include a transceiver 803, and may further include a bus 804.

The processor 801, the memory 802, and the transceiver 803 are all connected by using the bus 804.

The memory 802 is configured to store a computer executable instruction.

The processor 801 is configured to execute the computer executable instruction stored in the memory 802.

When the apparatus 800 is a network device, the processor 801 executes the computer executable instruction stored in the memory 802, so that the apparatus 800 performs the steps performed by the network device in any one of the foregoing embodiments provided in the embodiments of this application, or the network device deploys function units corresponding to the steps.

When the apparatus 800 is a terminal device, the processor 801 executes the computer executable instruction stored in the memory 802, so that the apparatus 800 performs the steps performed by the terminal device in any one of the foregoing embodiments provided in the embodiments of this application, or the terminal device deploys function units corresponding to the steps.

The processor 801 may include different types of processors 801 or a same type of processor 801. The processor 801 may be any one of the following: a central processing unit (CPU), an ARM processor (Advanced RISC (Reduced Instruction Set Computing) Machine)), a field programmable gate array (FPGA), a dedicated processor, and another device having a computing processing capability. In one embodiment, the processor 801 may be integrated as a many-core processor.

The memory 802 may be any one or any combination of the following: a random access memory (RAM), a read-only memory (ROM), a nonvolatile memory (NVM), a solid state drive (SSD), a mechanical hard disk, a magnetic disk, a disk array, or another storage medium.

The transceiver 803 is used by the apparatus 800 to exchange data with another device. For example, if the apparatus 800 is a network device, the network device may perform the method perform by the network device in any one of the foregoing embodiments. The network device exchanges data with a terminal device by using the transceiver 803. If the apparatus 800 is a terminal device, the terminal may perform the method performed by the terminal device in any one of the foregoing embodiments. The terminal device exchanges data with a network device by using the transceiver 803. The transceiver 803 may be any one or any combination of the following: a network interface (for example, an Ethernet interface), a wireless network interface card, or another device that has a network access function.

The bus 804 may include an address bus, a data bus, a control bus, and the like. For ease of representation, the bus is represented by using a thick line in FIG. 19. The bus 804 may be any one or any combination of the following: an industry standard architecture (ISA) bus, a peripheral component interconnect (PCI) bus, an extended industry standard architecture (EISA) bus, or another component used for wired data transmission.

An embodiment of this application provides a computer readable storage medium. The computer readable storage medium stores a computer executable instruction. A processor of a terminal device executes the computer executable instruction, so that the terminal device performs the steps performed by the terminal device in the beam management method provided in this application, or the terminal device deploys function units corresponding to the steps.

An embodiment of this application provides a computer readable storage medium. The computer readable storage medium stores a computer executable instruction. A processor of a network device executes the computer executable instruction, so that the network device performs the steps performed by the network device in the beam management method provided in this application, or the network device deploys function units corresponding to the steps.

An embodiment of this application provides a computer program product. The computer program product includes a computer executable instruction, and the computer executable instruction is stored in a computer readable storage medium. A processor of a terminal device may read the computer executable instruction from the computer readable storage medium. The processor executes the computer executable instruction, so that the terminal device performs the steps performed by the terminal device in the foregoing method provided in the embodiments of this application, or the terminal device deploys function units corresponding to the steps.

An embodiment of this application provides a computer program product. The computer program product includes a computer executable instruction, and the computer executable instruction is stored in a computer readable storage medium. A processor of a network device may read the computer executable instruction from the computer readable storage medium. The processor executes the computer executable instruction, so that the network device performs the steps performed by the network device in the foregoing method provided in the embodiments of this application, or the network device deploys function units corresponding to the steps.

This application further provides a chip system. The chip system includes a processor that is configured to support a terminal device in implementing functions in the foregoing aspects, for example, generating, receiving, or processing data and/or information in the foregoing methods. In one embodiment, the chip system further includes a memory. The memory may be configured to store a program instruction and data that are for the terminal device. The chip system may include a chip, or may include a chip and another discrete device.

This application further provides a chip system. The chip system includes a processor that is configured to support a network device in implementing functions in the foregoing aspects, for example, generating, receiving, or processing data and/or information in the foregoing methods. In one embodiment, the chip system further includes a memory. The memory is configured to store a program instruction and data that are for the data receiving device. The chip system may include a chip, or may include a chip and another discrete device.

Figure 20:
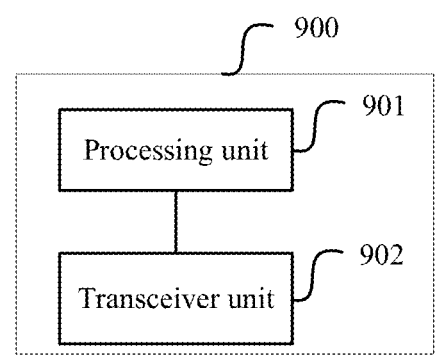
FIG. 20 shows a terminal device according to this application.

Based on a same concept, this application further provides a terminal device 900. As shown in FIG. 20, the terminal device 900 includes a processing unit 901 and a transceiver unit 902, and may be configured to perform the method performed by the terminal device in any one of the foregoing embodiments. In one embodiment, the processing unit 901 and the transceiver unit 902 are configured to perform the following operations.

The processing unit 901 is configured to measure a beam of a network device.

The transceiver unit 902 is configured to send an identifier of a first beam to the network device by using physical layer control signaling or media access control MAC layer control signaling, where the first beam is a beam on which beam failure occurs or a beam that meets a first condition.

In one embodiment, when beam failure occurs, the transceiver unit 900 sends the identifier of the first beam to the network device by using the physical layer control signaling or the MAC layer control signaling; or when a first timer expires, the transceiver unit 902 sends the identifier of the first beam to the network device by using the physical layer control signaling or the MAC layer control signaling; or when a second timer expires and no response to an identifier of a second beam is received, the transceiver unit 902 sends the identifier of the first beam to the network device by using the physical layer control signaling or the MAC layer control signaling, where the second beam is a beam on which beam failure occurs or a beam that meets the first condition.

In one embodiment, the transceiver unit 902 is further configured to: send a first request to the network device, where the first request is used to request an uplink resource; and receive, from the network device, second indication information used to indicate the uplink resource, where the uplink resource is used to transmit the physical layer control signaling or the MAC layer control signaling.

In one embodiment, a sending priority of the MAC layer control signaling is greater than a sending priority of a buffer status report.

In one embodiment, the sending priority of the MAC layer control signaling is less than a sending priority of control signaling of an identifier of the terminal device.

In one embodiment, the first request is a random access preamble sequence, and is sent to the network device by using a physical random access channel. Alternatively, the first request is uplink control signaling, and is sent to the network device by using a physical uplink control channel.

In one embodiment, if the transceiver unit 902 cannot receive an identifier of a beam that serves the terminal device, the transceiver unit 902 sends a connection re-establishment request to the network device.

In one embodiment, the transceiver unit 902 receives a first configuration sent by the network device, where the first configuration includes a window period and window duration. The processing unit 901 is configured to measure the beam of the network device based on the window period and the window duration.

Figure 21:
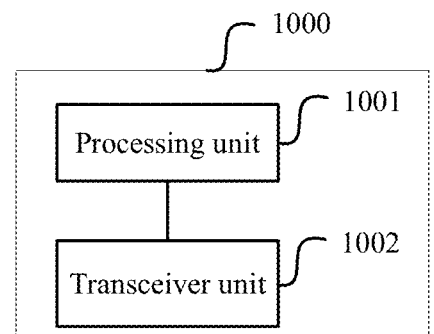
FIG. 21 shows a network device according to this application.

Based on a same concept, this application further provides a network device 1000. As shown in FIG. 21, the network device 1000 includes a processing unit 1001 and a transceiver unit 1002, and may be configured to perform the method performed by the network device in any one of the foregoing embodiments. In one embodiment, the processing unit 1001 and the transceiver unit 1002 are configured to perform the following operations.

The transceiver unit 1002 is configured to receive physical layer control signaling or MAC layer control signaling that is sent by a terminal device, where the physical layer control signaling or the MAC layer control signaling includes an identifier of a first beam, and the first beam is a beam on which beam failure occurs or a beam that meets a first condition.

The transceiver unit 1002 is further configured to send, to the terminal device, a response message to the identifier of the first beam, where the response message is used to indicate an identifier of a beam that serves the terminal device.

In one embodiment, the physical layer control signaling or the MAC layer control signaling is sent to the network device when the terminal device determines that beam failure occurs; or the physical layer control signaling or the MAC layer control signaling is sent to the network device when the terminal device determines that a first timer expires; or the physical layer control signaling or the MAC layer control signaling is sent to the network device when the terminal device determines that a second timer expires and does not receive a response to an identifier of a second beam, where the second beam is a beam on which beam failure occurs or a beam that meets the first condition.

In one embodiment, the transceiver unit 1002 is further configured to: receive a first request sent by the terminal device, where the first request is used to request an uplink resource; and send, to the terminal device, second indication information used to indicate the uplink resource, where the uplink resource is used to transmit the physical layer control signaling or the MAC layer control signaling.

In one embodiment, a sending priority of the MAC layer control signaling is greater than a sending priority of a buffer status report.

In one embodiment, the sending priority of the MAC layer control signaling is less than a sending priority of control signaling of an identifier of the terminal device.

In one embodiment, the first request is a random access preamble sequence, and is sent by the terminal device to the network device by using a physical random access channel. Alternatively, the first request is uplink control signaling, and is sent by the terminal device to the network device by using a physical uplink control channel.

In one embodiment, the transceiver unit 1002 is configured to receive a connection re-establishment request sent by the terminal device, where the connection re-establishment request is generated when the terminal device cannot receive the identifier of the beam that serves the terminal device.

In one embodiment, the transceiver unit 1002 is further configured to send a first configuration to the terminal device, where the first configuration includes a window period and window duration. The identifier of the first beam is obtained by the terminal device through measurement based on the window period and the window duration.

Content of the beam management method, the terminal device, and the network device that are further provided in this application may be combined with content of the communication method, the terminal, and the base station that are provided above. For example, in the content of the beam management method, the terminal device, and the network device, when determining that cell measurement and handover need to be performed, the terminal device may perform cell handover based on the content of the communication method, the terminal, and the base station that are provided above. In addition, in the content of the communication method, the terminal, and the base station that are provided above, when the terminal needs to report a measurement result, reference may be made to a report method in the content of the beam management method, the terminal device, and the network device. For example, the measurement result is sent by using physical layer control signaling or media access control MAC layer control signaling.

All or some of the foregoing embodiments may be implemented by using software, hardware, firmware, or any combination thereof. When software is used to implement the embodiments, the embodiments may be all or partially implemented in a form of a computer program product. The computer program product includes one or more computer instructions. When the computer program instructions are loaded and executed on a computer, the procedure or functions according to this application are all or partially generated. The computer may be a general-purpose computer, a dedicated computer, a computer network, or other programmable apparatuses. The computer instructions may be stored in a computer readable storage medium, or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state drive (SSD)), or the like.

A person skilled in the art may further understand that various illustrative logical blocks (illustrative logic block) and steps (step) that are listed in this application may be implemented by using electronic hardware, computer software, or a combination thereof. Whether the functions are implemented by using hardware or software depends on particular applications and a design requirement of the entire system. A person skilled in the art may use various methods to implement the described functions for each particular application, but it should not be considered that the implementation goes beyond the scope of this application.

Various illustrative logic units and circuits described in this application may implement or operate the described functions by using a general-purpose processor, a digital signal processor, an application-specific integrated circuit (ASIC), a field programmable gate array (FPGA) or another programmable logic apparatus, a discrete gate or transistor logic, a discrete hardware component, or a design of any combination thereof. The general-purpose processor may be a microprocessor. In one embodiment, the general-purpose processor may also be any conventional processor, controller, microcontroller, or state machine. The processor may also be implemented by a combination of computing apparatuses, such as a digital signal processor and a microprocessor, a plurality of microprocessors, one or more microprocessors together with a digital signal processor core, or any other similar configuration.

Steps or operations of the methods or algorithms described in this application may be directly embedded into hardware, a software unit executed by a processor, or a combination thereof. The software unit may be stored in a random access memory (RAM), a flash memory, a read-only memory (ROM), an erasable programmable read only memory (EPROM), a register, a hard disk, a removable disk, a compact disc read-only memory (CD-ROM), or any other form of storage medium in the art. For example, the storage medium may connect to a processor, so that the processor can read information from the storage medium and write information to the storage medium. In one embodiment, the storage medium may be integrated into a processor. The processor and the storage medium may be disposed in an ASIC, and the ASIC may be disposed in a terminal device or a network device. In one embodiment, the processor and the storage medium may be disposed in different components of the terminal device or the network device.

In one or more example designs, the functions described in this application may be implemented by using hardware, software, firmware, or any combination thereof. If the functions are implemented by using software, these functions may be stored in a computer readable medium or are transmitted to the computer readable medium in a form of one or more instructions or code. The computer readable medium includes a computer storage medium and a communications medium that enables a computer program to move from one place to another place. The storage medium may be an available medium that may be accessed by any general-purpose or special computer. For example, such a computer readable medium may include but is not limited to a RAM, a ROM, an EEPROM, a CD-ROM, or another optical disc storage, a disk storage or another magnetic storage apparatus, or any other medium that may be used to bear or store program code, where the program code is in a form of an instruction or a data structure or in a form that can be read by a general-purpose or special computer or a general-purpose or special processor. In addition, any connection may be appropriately defined as a computer-readable medium. For example, if software is transmitted from a website, a server, or another remote resource by using a coaxial cable, an optical fiber computer, a twisted pair, a digital subscriber line (DSL) or in a wireless manner, such as infrared, radio, or microwave, the software is included in a defined computer-readable medium. The disc and the disk include a compressed disk, a laser disk, an optical disc, a digital versatile disc (DVD), a floppy disk, and a Blu-ray disc. The disk generally copies data by a magnetic means, and the disc generally copies data optically by a laser means. The foregoing combination may also be included in the computer-readable medium.

A person skilled in the art should be aware that in the foregoing one or more examples, functions described in this application may be implemented by hardware, software, firmware, or any combination thereof. When the functions are implemented by using software, these functions may be stored in a computer readable medium or transmitted as one or more instructions or code in the computer-readable medium. The computer-readable medium includes a computer storage medium and a communications medium, where the communications medium includes any medium that enables a computer program to be transmitted from one place to another place. The storage medium may be any available medium accessible by a general-purpose or dedicated computer.

The objectives, technical solutions, and beneficial effects of this application are further described in detail in the foregoing implementations. It should be understood that the foregoing descriptions are merely implementations of this application, but are not intended to limit the protection scope of this application. Any modification, equivalent replacement or improvement made based on the technical solutions of this application shall fall within the protection scope of this application. According to the foregoing descriptions of this specification in this application, a person skilled in the art may use or implement the content of this application. Any modification based on the disclosed content shall be considered obvious in the art. The basic principles described in this application may be applied to other variations without departing from the essence and scope of this application. Therefore, the content disclosed in this application is not limited to the described embodiments and designs, but may also be extended to a maximum scope that is consistent with the principles and new features disclosed in this application.

What is claimed is:

1. A communications method comprising:
receiving, by a first base station, from a second base station, an identity of at least one cell and at least one identifier and at least one resource location of at least one channel state information-reference signal (CSI-RS) associated with the at least one cell, wherein a configuration of the at least one CSI-RS is derived by the second base station based on received information of at least one synchronization signal (SS) block;
sending, by the first base station, to a terminal, the identity of the at least one cell and the at least one identifier and the at least one resource location of the at least one CSI-RS associated with the at least one cell;
receiving, by the first base station, from the terminal, identities of some or all cells in the at least one cell, identifiers of SS blocks associated with the some or all cells, and/or identifiers of CSI-RSs associated with the some or all cells;
sending, by the first base station, to the second base station, the identities of the some or all cells in the at least one cell, the identifiers of the SS blocks associated with the some or all cells, and/or the identifiers of the CSI-RSs associated with the some or all cells; and
receiving, by the first base station, from the second base station, an identity of a first cell and at least one beam parameter associated with the first cell, wherein the at least one beam parameter belongs to the identifiers of the associated SS blocks and/or the identifiers of the associated CSI-RSs, and the first cell belongs to the at least one cell.

2. The method according to claim 1, further comprising:
sending, to the terminal, the identity of the first cell and the at least one beam parameter associated with the first cell, wherein the at least one beam parameter belongs to the identifiers of the associated SS blocks and/or the identifiers of the associated CSI-RSs.

3. An apparatus comprising:
a processor; and
a transceiver, wherein, the transceiver is configured to receive, from a first base station, a cell identity of a first cell, at least one beam parameter of the first cell, and a resource associated with the at least one beam parameter, wherein the first cell belongs to a second base station, wherein the at least one beam parameter comprises an identifier of a channel state information-reference signal (CSI-RS), and a configuration of the CSI-RS is derived by the second base station based on received information of at least one synchronization signal (SS) block;
the transceiver is further configured to send information on a resource corresponding to a target beam parameter, wherein the target beam parameter belongs to the at least one beam parameter;
the transceiver is further configured to receive a response to the information by using a receive beam associated with the target beam parameter; and
the transceiver is further configured to receive a first configuration from the first base station, wherein the first configuration comprises a resource location and an identifier of at least one CSI-RS of the second base station;
the processor is configured to measure the at least one CSI-RS; and the transceiver is further configured to send identifiers of some or all CSI-RSs in the at least one CSI-RS to the first base station, wherein the identifiers of the some or all CSI-RSs in the at least one CSI-RS comprise the at least one beam parameter of the first cell, and wherein the identity of the first cell and the at least one beam parameter are associated with the first cell and wherein the at least one beam parameter belongs to the identifiers of the associated SS blocks and/or the identifiers of the associated CSI-RSs, and the first cell belongs to the at least one cell.

4. The apparatus according to claim 3, wherein the transceiver is further configured to send quality and/or power of the some or all CSI-RSs in the at least one CSI-RS to the first base station.

5. The apparatus according to claim 3, wherein the at least one beam parameter of the first cell is selected based on at least one of the identifiers, quality, and/or power of the some or all CSI-RSs.

6. The apparatus according to claim 3, wherein, the transceiver is configured to receive a first configuration from the first base station, wherein the first configuration comprises a resource location of the at least one CSI-RS of the first cell;

the processor is further configured to measure the at least one CSI-RS of the first cell and at least one synchronization signal of the first cell; and the transceiver is configured to send first quality and/or first power of the first cell and second quality and/or second power of the first cell to the first base station, wherein the first quality and/or the first power is obtained based on quality and/or power of some or all CSI-RSs in the at least one CSI-RS of the first cell, and the second quality and/or the second power is obtained based on quality and/or power of some or all synchronization signals in the at least one synchronization signal.

7. The apparatus according to claim 3, wherein,
the transceiver is configured to receive a second instruction from the first base station;
the processor is configured to measure at least one CSI-RS of a serving cell; and
in response to the second instruction, the transceiver is configured to send third quality and/or third power of the serving cell to the first base station, wherein the third quality and/or the third power is obtained based on quality and/or power of some or all CSI-RSs in the at least one CSI-RS of the serving cell.

8. The apparatus according to claim 3, wherein the transceiver is configured to receive a third instruction from the first base station;
the processor is configured to measure at least one synchronization signal of a serving cell; and
in response to the third instruction, the transceiver is configured to send fourth quality and/or fourth power of the serving cell to the first base station, wherein the fourth quality and/or the fourth power is obtained based on quality and/or power of some or all synchronization signals in the at least one synchronization signal of the serving cell.

9. The apparatus according to claim 3, wherein the resource is a random access resource, the information is a preamble sequence, and the response comprises an uplink timing advance.

10. The apparatus according to claim 3, wherein the resource is an uplink resource, the information is uplink data, and the response is a hybrid automatic repeat request (HARQ) feedback.

11. The apparatus according to claim 10, wherein the uplink data comprises a radio resource control (RRC) connection reconfiguration complete message.

* * * * *